(12) United States Patent
Takenaka et al.

(10) Patent No.: US 7,774,098 B2
(45) Date of Patent: Aug. 10, 2010

(54) GAIT GENERATING DEVICE FOR MOVING ROBOT

(75) Inventors: Toru Takenaka, Wako (JP); Takashi Matsumoto, Wako (JP); Takahide Yoshiike, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 1034 days.

(21) Appl. No.: 10/597,933

(22) PCT Filed: Feb. 28, 2005

(86) PCT No.: PCT/JP2005/003346

§ 371 (c)(1),
(2), (4) Date: Aug. 11, 2006

(87) PCT Pub. No.: WO2005/082582

PCT Pub. Date: Sep. 9, 2005

(65) Prior Publication Data

US 2007/0061038 A1   Mar. 15, 2007

(30) Foreign Application Priority Data

Feb. 27, 2004   (JP)   ............................. 2004-052823

(51) Int. Cl.
*G06F 19/00* (2006.01)
(52) U.S. Cl. .................. 700/245; 700/250; 700/253; 700/254; 700/260; 700/261
(58) Field of Classification Search ................. 700/245
See application file for complete search history.

(56) References Cited

U.S. PATENT DOCUMENTS

| 5,936,367 | A  | * | 8/1999  | Takenaka        | 318/568.12 |
| 6,580,969 | B1 | * | 6/2003  | Ishida et al.   | 700/245    |
| 6,832,132 | B2 | * | 12/2004 | Ishida et al.   | 700/245    |
| 6,999,851 | B2 | * | 2/2006  | Kato et al.     | 700/245    |
| 7,054,718 | B2 | * | 5/2006  | Miyamoto et al. | 700/258    |
| 7,236,852 | B2 | * | 6/2007  | Moridaira et al.| 700/245    |

FOREIGN PATENT DOCUMENTS

| EP | 0856457    | 8/1998  |
| EP | 1361027    | 11/2003 |
| JP | 05-305584  | 11/1993 |
| JP | 10-086080  | 4/1998  |
| JP | 10-277969  | 10/1998 |
| JP | 2001-157973| 6/2001  |
| JP | 2002-326173| 11/2002 |
| WO | 02/040224  | 5/2002  |
| WO | 03/057427  | 7/2003  |
| WO | 03/061917  | 7/2003  |

OTHER PUBLICATIONS

Quasi-real Time Control of Biped Humanoid Robots, Application of The Control Method to HRP, Samuel Agus Setiawan et al., pp. 1467-1468, (English abstract included).

* cited by examiner

*Primary Examiner*—Thomas G Black
*Assistant Examiner*—Sze-Hon Kong
(74) *Attorney, Agent, or Firm*—Rankin, Hill & Clark LLP

(57) ABSTRACT

To generate a desired gait of a robot 1 such that a permissible range of a predetermined component (a translational floor reaction force horizontal component or the like) of a floor reaction force acting on the mobile robot 1, a gait generating system for a mobile robot creates a provisional motion, which indicates a provisional value of a desired motion, and repeats processing for correcting the provisional motion by using a first dynamic model and a second dynamic model having a dynamic accuracy that is higher than that of the first dynamic model until a predetermined condition is satisfied, thereby obtaining a final corrected motion as the desired motion. Relative to the provisional motion and a corrected motion at each correction, a difference between a predetermined component of a floor reaction force produced on the second dynamic model and a predetermined component of a floor reaction force produced on the first dynamic model is determined as a floor reaction force error, and a change amount of the error at each correction is also determined. A corrected motion when the change amount has converged to zero is determined as the desired motion.

20 Claims, 20 Drawing Sheets

FIG.12

S024 ENTRY

S200 DETERMINE INITIAL STATES (STATES AT INITIAL TIME Ts) OF FOOT POSITION/POSTURE, BODY POSTURE ANGLE $\theta bs$, AND ARM POSTURES ON THE BASIS OF NORMAL TURNING GAIT PARAMETER.

S202 PROVISIONALLY DETERMINE INITIAL (AT Ts) BODY HORIZONTAL POSITION, VELOCITY, ANGULAR VELOCITY, AND BODY INCLINATION RESTORING MOMENT ZMP-CONVERTED VALUE PEAK VALUE CANDIDATES (Xs, Vxs, $\omega bs$, ZMPrecpeak).

S204 ∞

S206 DETERMINE INITIAL BODY VERTICAL POSITION/VELOCITY (Zs, Vzs).

S208 USING DYNAMIC MODEL, GENERATE GAIT FOR ONE STEP ON THE BASIS OF NORMAL TURNING GAIT PARAMETER INCLUDING ZMPrecpeak, TAKING $\theta bs$, (Xs, Vxs, $\omega bs$), (Zs, Vzs) AS INITIAL STATES OF BODY.

S210 CONVERT TERMINAL BODY HORIZONTAL POSITION, VELOCITY, POSTURE ANGLE, AND ANGULAR VELOCITY OF GENERATED GAIT INTO VALUES OBSERVED FROM SUPPORTING LEG COORDINATE SYSTEM OF NEXT STEP, AND DENOTE THE VALUES BY (Xe, Vxe, $\theta be$, $\omega be$).

S212 BOUNDARY CONDITION ERRORS (errx, errv, err$\theta$, err$\omega$) = (Xs, Vxs, $\theta bs$, $\omega bs$)−(Xe, Vxe, $\theta be$, $\omega be$)

S214 ARE ALL errx, errv, err$\theta b$, AND err$\omega b$ WITHIN PERMISSIBLE RANGES? — yes → LEAVE REPETITION LOOP.

S216 DETERMINE A PLURALITY OF CANDIDATES (Xs+$\Delta$Xs, Vxs, $\omega bs$, ZMPrecpeak), (Xs, Vxs+$\Delta$Vxs, $\omega bs$, ZMPrecpeak), (Xs, Vxs, $\omega bs$+$\Delta \omega bs$, ZMPrecpeak), (Xs, Vxs, $\omega bs$, ZMPrecpeak+$\Delta$ZMPrecpeak) IN THE VICINITY OF (Xs, Vxs, $\omega bs$, ZMPrecpeak), AND BASED ON THEM, DETERMINE BOUNDARY CONDITION ERROR CORRESPONDING TO EACH OF THEM AS DESCRIBED ABOVE.

S218 DETERMINE NEW CANDIDATES (Xs, Vxs, $\omega bs$, ZMPrecpeak) ON THE BASIS OF BOUNDARY CONDITION ERRORS CORRESPONDING TO (Xs, Vxs, $\omega bs$, ZMPrecpeak) AND EACH OF CANDIDATES IN THE VICINITY THEREOF.

S220 DETERMINE INITIAL BODY HORIZONTAL POSITION, VELOCITY, POSTURE ANGLE, AND ANGULAR VELOCITY (X0, Vx0, $\theta b0$, $\omega b0$), INITIAL BODY VERTICAL POSITION AND VELOCITY (Z0, Vz0), AND INITIAL BODY POSTURE ANGLE AND ANGULAR VELOCITY AT ORIGINAL INITIAL TIME 0.

S222 DETERMINE NORMAL TURNING INITIAL DIVERGENCE COMPONENT q[0] ACCORDING TO THE FOLLOWING EXPRESSION.
q[0] = X0 + Vx0/$\omega$0

S224 DETERMINE q", WHICH IS THE VALUE OF NORMAL TURNING INITIAL DIVERGENCE COMPONENT q[0] OBSERVED FROM SUPPORTING LEG COORDINATE SYSTEM OF CURRENT TIME GAIT, AND (Z0", Vz0"), WHICH ARE VALUES OF INITIAL BODY VERTICAL POSITION AND VELOCITY OBSERVED FROM SUPPORTING LEG COORDINATE SYSTEM OF CURRENT TIME GAIT.

RETURN

ENTRY

S400 DETERMINE DESIRED FLOOR REACTION FORCE VERTICAL COMPONENT AT TIME k ON THE BASIS OF GAIT PARAMETER.

S402 DETERMINE DESIRED ZMP AT TIME k ON THE BASIS OF GAIT PARAMETER.

S404 DETERMINE DESIRED POSITIONS/POSTURES OF BOTH FEET, REFERENCE BODY POSTURE, AND DESIRED ARM POSTURE AT TIME k ON THE BASIS OF GAIT PARAMETER.

S406 CALCULATE TOTAL CENTER-OF-GRAVITY VERTICAL POSITION/VELOCITY THAT SATISFY DESIRED FLOOR REACTION FORCE VERTICAL COMPONENT.

S408 CALCULATE BODY VERTICAL POSITION SATISFYING TOTAL CENTER-OF-GRAVITY VERTICAL POSITION.

S410 DETERMINE TRANSLATIONAL FLOOR REACTION FORCE HORIZONTAL COMPONENT PERMISSIBLE RANGE [Fxmin, Fxmax] AT TIME k ON THE BASIS OF GAIT PARAMETER.

S412 DETERMINE BODY HORIZONTAL ACCELERATION AND BODY POSTURE ANGULAR ACCELERATION SUCH THAT $-Merr\_p(k)$ IS PRODUCED ABOUT DESIRED ZMP. DETERMINE, HOWEVER, BODY HORIZONTAL ACCELERATION AND BODY POSTURE ANGULAR ACCELERATION SUCH THAT VALUE OBTAINED BY ADDING $Ferr\_p(k)$ TO TRANSLATIONAL FLOOR REACTION FORCE HORIZONTAL COMPONENT Fx DOES NOT EXCEED [Fxmin, Fxmax] AND THAT BODY POSTURE ANGULAR ACCELERATION BASED ON ZMPrec PATTERN IS PRODUCED DURING BODY INCLINATION ANGLE RESTORING PERIOD.

S414 INTEGRATE BODY HORIZONTAL ACCELERATION AND BODY POSTURE ANGULAR ACCELERATION TO CALCULATE BODY HORIZONTAL VELOCITY AND BODY POSTURE ANGULAR VELOCITY. INTEGRATE THESE FURTHER TO DETERMINE BODY HORIZONTAL POSITION AND BODY POSTURE.

S415 CALCULATE FLOOR REACTION FORCE MOMENT HORIZONTAL COMPONENT Msmpl(k) ABOUT DESIRED ZMP AND TRANSLATIONAL FLOOR REACTION FORCE HORIZONTAL COMPONENT Fsmpl(k) AT TIME k, WHICH ARE GENERATED ON SIMPLIFIED MODEL BY DETERMINED DESIRED MOTION.

S416 CALCULATE FLOOR REACTION FORCE MOMENT HORIZONTAL COMPONENT Msemifull(k) ABOUT DESIRED ZMP AND TRANSLATIONAL FLOOR REACTION FORCE HORIZONTAL COMPONENT Fsemifull(k) AT TIME k, WHICH ARE GENERATED ON SEMI-FULL MODEL BY DETERMINED DESIRED MOTION.

S418
$Merr(k) = Msemifull(k) - Msmpl(k)$
$Ferr(k) = Fsemifull(k) - Fsmpl(k)$

RETURN

BODY INCLINATION RESTORING MOMENT ZMP-CONVERTED VALUE OF NORMAL GAIT (ZMPrec)

BODY INCLINATION RESTORING MOMENT
ZMP-CONVERTED VALUE OF CURRENT TIME GAIT (ZMPrec)

GAIT GENERATING DEVICE FOR MOVING ROBOT

TECHNICAL FIELD

The present invention relates to a device for generating desired gaits of a bipedal mobile robot or the like.

BACKGROUND ART

As technologies for generating desired gaits of a mobile robot, such as a bipedal mobile robot, there have been known technologies in which an error of a floor reaction force moment about a desired ZMP or an error of an actual ZMP from the desired ZMP is observed and a gait is corrected to reduce the error, as disclosed in, for example, Japanese Patent No. 3443077 (patent document 1) or in "Real-time walking stabilization control of a biped humanoid robot—Verifying the validity of a walking control module in HRP—"/3P14/ The 18th Annual Conference of the Robotics Society of Japan (non-patent document 1).

However, these technologies do not consider an error of a translational floor reaction force; therefore, if a gait is to be generated for a robot to walk on a road surface having a low friction coefficient or if a gait having a period during which a translational floor reaction force vertical component becomes zero or substantially zero, such as in running, is to be generated, it will be difficult to generate a gait that restrains the robot from slipping.

Thus, technologies disclosed in, for example, Japanese Unexamined Patent Application Publication No. 2002-326173 (patent document 2) and PCT international publication WO/03/057427/A1 (patent document 3) have been proposed by the present applicant. According to the technologies disclosed in these patent documents 2 and 3, an instantaneous desired gait composed of an instantaneous value of a desired motion (instantaneous desired motion) of a robot and an instantaneous value of a desired floor reaction force (instantaneous desired floor reaction force) is sequentially created using a first dynamic model (simplified model), which represents a relationship between motions of the robot (the positions and postures of individual portions) and floor reaction forces, such that a dynamic balance condition (a condition, such as the one in that a translational force component of a floor reaction force takes a desired value or a floor reaction force moment about a certain point takes a desired value) on the first dynamic model is satisfied. Then, the instantaneous desired gait is input to a second dynamic model (full model) wherein a part of the instantaneous desired motion (desired body position/posture, a desired moment about a desired ZMP, or the like) is corrected so as to generate a final instantaneous desired gait in a time series manner.

According to the technology, using a model having high linearity as the first dynamic model (simplified model) makes it possible to efficiently and promptly create a gait that enables a robot to continue a stable motion, and using a model having relatively high dynamic accuracy as a second dynamic model (full model) makes it possible to bring the dynamic accuracy between a motion of a finally generated gait and a floor reaction force closer to the dynamics of an actual robot.

However, in the technologies disclosed in the aforesaid patent documents 2 and 3, gaits created using the second dynamic model tend to diverge, so that it has been necessary to correct a desired ZMP trajectory or generate a floor reaction force moment about a desired ZMP so as to restrain a desired motion trajectory of a robot from deviating from a gait created using the first dynamic model. And, in this case, the correction amount of the desired ZMP trajectory or the floor reaction force moment about the desired ZMP has occasionally become relatively large, and in such a case, it has become difficult to maintain an ample stability margin from time to time. Conversely, if the correction amount of the desired ZMP trajectory or the permissible range of the floor reaction force moment about the desired ZMP is set to be smaller in order to maintain an ample stability margin, then the likelihood of the divergence of a gait has inconveniently increased.

The present invention has been made with a view of the above background, and it is an object thereof to provide a gait generating system for a mobile robot that is capable of efficiently generating a gait that allows a permissible range of a predetermined component of a floor reaction force set for preventing slippage or the like of a robot to be satisfied and also capable of securing high dynamic accuracy between a motion and a floor reaction force of the gait.

DISCLOSURE OF INVENTION

To fulfill the aforesaid object, according to a first invention of a gait generating system for a mobile robot in accordance with the present invention, there is provided a gait generating system that sets a permissible range of a predetermined floor reaction force component of a floor reaction force generated by a motion of a mobile robot and generates a desired gait that includes at least a desired motion of a mobile robot such that the permissible range is satisfied, comprising:

a provisional desired motion creating means for creating a provisional motion, which indicates a provisional value of the desired motion, by using a predetermined first dynamic model of the mobile robot such that the floor reaction force component satisfies the permissible range;

a floor reaction force component error calculating means for determining, on an arbitrary motion of the mobile robot, by using the first dynamic model and a predetermined second dynamic model having a dynamic accuracy that is higher than that of the first mobile-dynamic model, a floor reaction force component error, which is a difference between the floor reaction force component generated on the second dynamic model by the motion and the floor reaction force component generated on the first dynamic model by the motion;

an evaluating means for evaluating whether a floor reaction force component error determined by the floor reaction force component error calculating means from the created provisional motion falls within a predetermined permissible error range; and a desired motion determining means for determining the provisional motion as the desired motion if a floor reaction force component error associated with the provisional motion in the evaluation of the evaluating means falls within the permissible error range, or for determining the desired motion by correcting the provisional motion at least once or more if a floor reaction force component error associated with the provisional motion deviates from the permissible error range, wherein in a case where a floor reaction force component error associated with the provisional motion deviates from the permissible error range, if a corrected motion determined by the desired motion determining means by an n-th (n: integer satisfying $n \geq 1$) correction of the provisional motion is defined as the motion after the n-th correction, a floor reaction force component error determined by the floor reaction force component error calculating means from the motion after the n-th correction is defined as an n-th floor reaction force component error, the provisional motion is defined as the motion after a 0-th correction, and a floor reaction force component error associated with the provisional motion is defined as a 0-th floor reaction force component error, then the desired motion determining means repeats corrected motion determination processing for determining a motion after an n-th correction such that a result obtained by adding either an (n−1)th floor reaction force component error or a floor reaction force correction amount determined on the basis of at least the (n−1)th floor reaction force component error to the floor reaction force component produced on the first dynamic model by the motion after the n-th correction satisfies the permissible range and convergence discrimination processing for discriminating whether a floor reaction force component error change amount ΔFM defined as either a difference between an n-th floor reaction force component error associated with the determined motion after the n-th correction and an (n−1)th floor reaction force component error associated with a motion after the (n−1)th correction or a difference between the n-th floor reaction force component error and the floor reaction force correction amount determined on the basis of at least the (n−1)th floor reaction force component error has converged to zero or not until the desired motion determining means determines at least that the floor reaction force component error change amount ΔFM has converged to zero, and determines a corrected motion determined by last corrected motion determination processing in the repetitive processing as the desired motion.

In the present invention, the fact that the dynamic accuracy of the second dynamic model is higher than that of the first dynamic model means that a floor reaction force generated on the second dynamic model by an arbitrary desired motion of a robot will be closer to a real floor reaction force (actual floor reaction force) acting on the robot when the actual robot performs the motion on a floor supposed in the motion surface than a floor reaction force generated on the first dynamic model by the motion will be. This applies not only to the first invention but also to a second through a sixteenth inventions, which will be described later.

Further, regarding an arbitrary motion of a robot, satisfying a permissible range of a predetermined floor reaction force component (a translational floor reaction force horizontal component, a floor reaction force moment vertical component, or the like) on an arbitrary dynamic model means that the predetermined floor reaction force component produced on the dynamic model by the motion (a predetermined floor reaction force component in a floor reaction force for which the dynamics of the dynamic model holds relative to the motion) falls within the permissible range. The same applies not only to the first invention but also to the second through the sixteenth inventions, which will be discussed later.

According to the first invention, a provisional motion, which indicates a provisional value of a desired motion, is tentatively generated by the provisional desired motion creating means. This provisional motion is created using the first dynamic model such that the floor reaction force component satisfies the permissible range.

Then, an evaluating means evaluates whether a floor reaction force component error determined by the floor reaction force component error calculating means from the provisional motion falls within a predetermined permissible error range. In this case, the floor reaction force component error associated with the provisional motion is the difference between the floor reaction force component generated on the second dynamic model by the provisional motion and the floor reaction force component generated on the first dynamic model by the provisional motion; therefore, it means the error of the floor reaction force component on the first dynamic model relative to the provisional motion.

And, if the floor reaction force component error associated with the provisional motion falls within the permissible error range in the evaluation by the evaluating means, then the error of the floor reaction force component produced on the first dynamic model by the provisional motion is sufficiently small, so that the provisional motion is determined as the desired motion. If the floor reaction force component error associated with the provisional motion deviates from the permissible error range, then the provisional motion is corrected at least once or more by the desired motion determining means, and a desired motion is obtained by the correction. In correcting the provisional motion, the desired motion determining means repeats the corrected motion determination processing and the convergence discrimination processing until at least it is determined that the floor reaction force component error change amount ΔFM has converged to zero, and determines, as the desired motion, the corrected motion that is determined by last corrected motion determination processing in the repetitive processing.

In this case, the corrected motion determination processing determines a motion after an n-th correction such that the result obtained by adding either an (n−1)th floor reaction force component error calculated in response to a motion after an (n−1)th correction (a motion after a 0-th correction is the provisional motion) or a floor reaction force correction amount determined on the basis of at least the (n−1)th floor reaction force component error to the floor reaction force component produced on the first dynamic model by an n-th correction motion obtained after an n-th correction satisfies the permissible range; therefore, the motion after the n-th correction is highly likely to allow the floor reaction force component produced on the second dynamic model thereby satisfies the permissible range. However, the motion after the n-th correction will not generally be the same as a motion after an (n−1)th correction, so that an (n−1)th floor reaction force component error or a floor reaction force correction amount based thereon that is taken into account when determining the motion after the n-th correction cannot be said to be necessarily appropriate. For this reason, according to the first invention, whether the floor reaction force component error change amount ΔFM has converged to zero is determined by the convergence discrimination processing and the corrected motion determination processing is repeated until at least it is determined that it has converged. At this time, if the ΔFM has converged to zero, then an n-th floor reaction force component error associated with the n-th corrected motion determined at that time will be substantially equivalent to an (n−1)th floor reaction force component error or the floor reaction force correction amount based thereon; hence, the (n−1)th floor reaction force component error or the floor reaction force correction amount based thereon taken into account when determining the n-th corrected motion may be said to be an appropriate (highly reliable) floor reaction force component error. And, the n-th corrected motion at that time is determined as the desired motion.

Thus, a desired gait having a high dynamic accuracy that allows the permissible range of the floor reaction force component to be satisfied on the second dynamic model can be generated on the first dynamic model.

Further, the corrected motion is created on the first dynamic model (this model generally having higher linearity than the second dynamic model), and the second dynamic model is used simply to determine a floor reaction force from the motion after the (n−1)th correction, thus making it possible to efficiently and promptly perform the processing for generating the motion after the n-th correction and the processing for calculating a floor reaction force relative to the motion after the (n−1)th correction. Further, the provisional motion (the motion after the 0-th correction) does not require dynamic accuracy much, so that it can be easily and quickly created using a model having high linearity, such as the first dynamic model.

Hence, according to the first invention, it is possible to efficiently generate a gait that allows the permissible range of a predetermined component of a floor reaction force to be satisfied and also possible to secure high dynamic accuracy between a motion and a floor reaction force of the gait. Further, a desired motion is created using the first dynamic model usually having higher linearity than the second dynamic model, so that the danger of divergence of a gait is minimized and it is possible to efficiently generate a desired motion that allows the floor reaction force component that takes into account a floor reaction force component error or a floor reaction force correction amount based thereon to properly satisfy the permissible range.

To fulfill the aforesaid object, according to a second invention of a gait generating system for a mobile robot in accordance with the present invention, there is provided a gait generating system that sets a permissible range of a predetermined floor reaction force component of a floor reaction force produced by a motion of a mobile robot and generates a desired gait that includes at least a desired motion of a mobile robot such that the permissible range is satisfied, comprising:

a provisional desired motion creating means for creating a provisional motion, which indicates a provisional value of the desired motion;

a floor reaction force component error calculating means for determining, on an arbitrary motion of the mobile robot, by using a predetermined first dynamic model of the mobile robot and a predetermined second dynamic model having a dynamic accuracy that is higher than that of the first dynamic model, a floor reaction force component error, which is a difference between the floor reaction force component generated on the second dynamic model by the motion and the floor reaction force component generated on the first dynamic model by the motion; and a desired motion determining means for determining the desired motion by correcting the provisional motion at least once or more, wherein provided that a corrected motion determined by the desired motion determining means by an n-th (n: integer satisfying n≧1) correction of the provisional motion is defined as a motion after an n-th correction, a floor reaction force component error determined by the floor reaction force component error calculating means from the motion after the n-th correction is defined as an n-th floor reaction force component error, the provisional motion is defined as the motion after a 0-th correction, and a floor reaction force component error determined by the floor reaction force component error calculating means from the provisional motion is defined as a 0-th floor reaction force component error, then the desired motion determining means repeats corrected motion determination processing for determining a motion after an n-th correction such that a result obtained by adding either an (n−1)th floor reaction force component error or a floor reaction force correction amount determined on the basis of at least the (n−1)th floor reaction force component error to the floor reaction force component produced on the first dynamic model by the motion after the n-th correction satisfies the permissible range and convergence discrimination processing for discriminating whether a floor reaction force component error change amount ΔFM defined as either a difference between an n-th floor reaction force component error associated with the determined motion after the n-th correction and an (n−1) th floor reaction force component error associated with a motion after the (n−1)th correction or a difference between the n-th floor reaction force component error and the floor reaction force correction amount determined on the basis of at least the (n−1)th floor reaction force component error has converged to zero or not until the desired motion determining means determines at least that the floor reaction force component error change amount ΔFM has converged to zero, and determines a corrected motion determined by last corrected motion determination processing in the repetitive processing as the desired motion.

The second invention omits the evaluating means in the first invention and carries out the corrected motion determination processing and the convergence discrimination processing at least once or more. In the second invention, the provisional motion may be created using the first dynamic model such that the floor reaction force component satisfies the permissible range as with, for example, the aforesaid first invention; however, it does not necessarily have to be created like this.

In the second invention, the operations and advantages provided by the corrected motion determination processing and the convergence discrimination processing are the same as those in the first invention. Thus, it is possible to generate, on the first dynamic model, a desired gait having a high dynamic accuracy that allows the permissible range of the floor reaction force component to be satisfied on the second dynamic model.

Further, as with the first invention, the corrected motion is created on the first dynamic model, and the second dynamic model is used simply to determine a floor reaction force from a motion after an (n−1)th correction, making it possible to efficiently and promptly perform the processing for generating a motion after an n-th correction and the processing for calculating a floor reaction force relative to the motion after the (n−1)th correction. The provisional motion (a motion after the 0-th correction) does not require dynamic accuracy much, so that it can be easily and quickly created using a dynamic model having high linearity, such as the first dynamic model.

Thus, according to the second invention, as with the first invention, it is possible to efficiently generate a gait that allows a permissible range of a predetermined component of a floor reaction force to be satisfied and also possible to secure high dynamic accuracy between a motion of the gait and a floor reaction force. Further, a desired motion is created using the first dynamic model usually having higher linearity than the second dynamic model, so that the danger of divergence of a gait is minimized and it is possible to efficiently generate a desired motion that allows the floor reaction force component that takes into account a floor reaction force component error or a floor reaction force correction amount based thereon to properly satisfy the permissible range.

Next, according to a third invention of a gait generating system for a mobile robot in accordance with the present invention, there is provided a gait generating system that sets a desired value of a predetermined first floor reaction force component of a floor reaction force generated by a motion of a mobile robot and a permissible range of a predetermined second floor reaction force component, which is different from the first floor reaction force component, and generates a desired gait that includes at least a desired motion of the mobile robot such that the desired value of the first floor reaction force component and the permissible range of the second floor reaction force component are satisfied, comprising:

a provisional desired motion creating means for creating a provisional motion, which indicates a provisional value of the desired motion, by using a predetermined first dynamic model of the mobile robot such that the first floor reaction force component agrees with the desired value and the second floor reaction force component satisfies the permissible range;

a floor reaction force component error calculating means for determining, on an arbitrary motion of the mobile robot, a floor reaction force component error Aerr, which is a difference between the first floor reaction force component generated on the second dynamic model by the motion and the first floor reaction force component generated on the first dynamic model by the motion, by using the first dynamic model and a predetermined second dynamic model having a dynamic accuracy that is higher than that of the first dynamic model, and for determining a floor reaction force component error Berr, which is a difference between the second floor reaction force component generated on the second dynamic model by the motion and the second floor reaction force component generated on the first dynamic model by the motion;

an evaluating means for evaluating whether the floor reaction force component error Aerr out of the floor reaction force component errors Aerr and Berr determined by the floor reaction force component error calculating means from the created provisional motion falls within a predetermined first permissible error range and whether the floor reaction force component error Berr falls within a predetermined second permissible error range; and a desired motion determining means for determining the provisional motion as the desired motion if the floor reaction force component errors Aerr and Berr associated with the provisional motion in the evaluation by the evaluating means both fall within the first permissible error range and the second permissible error range, respectively, associated therewith or for determining the desired motion by correcting the provisional motion at least once or more if at least one of the floor reaction force component errors Aerr and Berr associated with the provisional motion deviates from the first permissible error range or the second permissible error range associated therewith, wherein in case where at least one of the floor reaction force component errors Aerr and Berr associated with the provisional motion deviates from the first permissible error range or the second permissible error range associated therewith, if a corrected motion determined by the desired motion determining means by an n-th (n: integer satisfying n≧1) correction of the provisional motion is defined as the motion after the n-th correction, the floor reaction force component errors Aerr and Berr determined by the floor reaction force component error calculating means from the motion after the n-th correction are respectively defined as n-th floor reaction force component errors Aerr(n) and Berr(n), the provisional motion is defined as the motion after a 0-th correction, and the floor reaction force component errors Aerr and Berr associated with the provisional motion are respectively defined as 0-th floor reaction force component errors Aerr(0) and Berr(0), then the desired motion determining means repeats corrected motion determination processing for determining a motion after an n-th correction such that a result obtained by adding either an (n−1)th floor reaction force component error Aerr(n−1) or a first floor reaction force correction amount determined on the basis of at least the (n−1)th floor reaction force component error Aerr(n−1) to the first floor reaction force component produced on the first dynamic model by the motion after the n-th correction agrees with the desired value, and a result obtained by adding either an (n−1)th floor reaction force component error Berr(n−1) or a second floor reaction force correction amount determined on the basis of at least the (n−1)th floor reaction force component error Berr(n−1) to the second floor reaction force component produced on the first dynamic model by the motion after the n-th correction satisfies the permissible range, and convergence discrimination processing for discriminating whether a floor reaction force component error change amount ΔAerr defined as either a difference between an n-th floor reaction force component error Aerr(n) associated with the determined motion after the n-th correction and an (n−1)th floor reaction force component error Aerr(n−1) associated with a motion after the (n−1)th correction or a difference between the n-th floor reaction force component error Aerr(n) and the first floor reaction force correction amount determined on the basis of at least the (n−1)th floor reaction force component error Aerr(n−1) and a floor reaction force component error change amount ΔBerr defined as either a difference between an n-th floor reaction force component error Berr(n) associated with the determined motion after the n-th correction and an (n−1)th floor reaction force component error Berr(n−1) associated with a motion after the (n−1)th correction or a difference between the n-th floor reaction force component error Berr(n) and the second floor reaction force correction amount determined on the basis of at least the (n−1)th floor reaction force component error Berr(n−1) have respectively converged to zero or not until the desired motion determining means determines at least that the floor reaction force component error change amounts ΔAerr and ΔBerr have both converged to zero, and determines a corrected motion determined by the last corrected motion determination processing in the repetitive processing as the desired motion.

In the third invention, regarding an arbitrary motion of a robot, satisfying a desired value of a predetermined floor reaction force component on an arbitrary dynamic model means that the predetermined floor reaction force component produced on the dynamic model by the motion (a floor reaction force component for which the dynamics of the dynamic model holds relative to the motion) agrees or substantially agrees with a desired value. The same applies not only to the third invention but also to the fourth invention, the sixth invention, the ninth invention, the thirteenth invention, and the fourteenth invention, which will be discussed later.

According to the aforesaid third invention, a desired gait that includes a desired motion is generated such that a desired value of a first floor reaction force component is also satisfied in addition to a permissible range of a second floor reaction force component (this corresponding to a predetermined floor reaction force component in the first invention) in a floor reaction force acting on a mobile robot.

In the third invention, a provisional motion, which indicates a provisional value, of a desired motion is tentatively generated by the provisional desired motion creating means. This provisional motion is created using the first dynamic model such that the first floor reaction force component agrees with the desired value and the second floor reaction force component satisfies the permissible range.

Further, it is evaluated by the evaluating means whether the floor reaction force component errors Aerr and Berr determined by the floor reaction force component error calculating means from the provisional motion fall within the first permissible error range and the second permissible error range. In this case, the floor reaction force component error Aerr associated with the provisional motion indicates the difference between the first floor reaction force component produced on the second dynamic model by the provisional motion and the first floor reaction force component produced on the first dynamic model by the provisional motion, so that it means an error of the first floor reaction force component on the first dynamic model relative to a provisional motion. Similarly, the floor reaction force component error Berr associated with the provisional motion indicates the difference between the second floor reaction force component produced on the second dynamic model by the provisional motion and the second floor reaction force component produced on the first dynamic model by the provisional motion, so that it means an error of the second floor reaction force component on the first dynamic model relative to a provisional motion. Incidentally, the first permissible error range and the second permissible error range may be the same ranges.

And, in the evaluation by the evaluating means, if both floor reaction force component errors Aerr and Berr associated with the provisional motion fall within the first permissible error range and the second permissible error range, respectively, associated with the provisional motion, then the errors of the first floor reaction force component and the second floor reaction force component produced on the first dynamic model by the provisional motion are both sufficiently small, so that the provisional motion is determined as the desired motion. If either the floor reaction force component error Aerr or Berr associated with the provisional motion deviates from the first permissible error range or the second permissible error range associated therewith, then the provisional motion is corrected at least once or more by the desired motion determining means, and a desired motion is obtained by the correction. To correct the provisional motion, the desired motion determining means repeats the corrected motion determination processing and the convergence discrimination processing until it is determined at least that both of the floor reaction force component error change amounts $\Delta$Aerr and $\Delta$Berr have converged to zero, and determines a corrected motion determined by last corrected motion determination processing in the repetitive processing as the desired motion.

In this case, the aforesaid corrected motion determination processing determines a motion after an n-th correction such that the result obtained by adding either an (n−1)th floor reaction force component error Aerr(n−1) calculated in response to a motion after an (n−1)th correction (a motion after a 0-th correction is the provisional motion) or a first floor reaction force correction amount determined on the basis of at least the (n−1)th floor reaction force component error Aerr (n−1) to the first floor reaction force component produced on the first dynamic model by an n-th correction motion obtained after an n-th correction agrees with the aforesaid desired value, and the result obtained by adding either an (n−1)th floor reaction force component error Berr(n−1) calculated in response to a motion after an (n−1)th correction or a second floor reaction force correction amount determined on the basis of at least the (n−1)th floor reaction force component error Berr(n−1) to the second floor reaction force component produced on the first dynamic model by an n-th correction motion satisfies the permissible range. However, the motion after the n-th correction will not generally be the same as a motion after an (n−1)th correction, so that the (n−1)th floor reaction force component errors Aerr(n−1) and Berr(n−1) or the first floor reaction force correction amount and the second floor reaction force correction amount based thereon, which have been taken into account in determining the motion after the n-th correction, cannot be said to be necessarily appropriate. For this reason, according to the third invention, based on the same concept as that of the first invention, whether the floor reaction force component error change amount $\Delta$Aerr and the floor reaction force component error change amount $\Delta$Berr have converged to zero is determined by the convergence discrimination processing and the corrected motion determination processing is repeated until at least it is determined that both $\Delta$Aerr and $\Delta$Berr have converged. At this time, if both $\Delta$Aerr and $\Delta$Berr have converged to zero, then the n-th floor reaction force component errors Aerr(n) and Berr (n) associated with the n-th corrected motion determined at that time will be substantially equivalent to (n−1)th floor reaction force component errors Aerr(n−1) and Berr(n−1), respectively, or the first floor reaction force correction amount and the second floor reaction force correction amount based thereon; hence, the (n−1)th floor reaction force component error Aerr(n−1) or the first floor reaction force correction amount based thereon and the (n−1)th floor reaction force component error Berr(n−1) or the second floor reaction force correction amount based thereon taken into account when determining the n-th corrected motion may both be said to be appropriate (highly reliable) floor reaction force component errors. And, the n-th corrected motion at that time is determined as the desired motion.

Thus, a desired gait having a high dynamic accuracy that allows a desired value of the first floor reaction force component to be satisfied and also allows the permissible range of the second floor reaction force component to be satisfied on the second dynamic model can be generated on the first dynamic model.

Further, the corrected motion is created on the first dynamic model (this model generally having higher linearity than the second dynamic model), and the second dynamic model is used simply to determine a floor reaction force from the motion after the (n−1)th correction, thus making it possible to efficiently and promptly perform the processing for generating the motion after the n-th correction and the processing for calculating a floor reaction force relative to the motion after the (n−1)th correction. Further, the provisional motion (the motion after the 0-th correction) does not require dynamic accuracy much, so that it can be easily and quickly created using a model having high linearity, such as the first dynamic model.

Hence, according to the third invention, it is possible to efficiently generate a gait that allows a desired value of the first floor reaction force component and the permissible range of a second floor reaction force component to be satisfied and also possible to secure high dynamic accuracy between a motion of the gait and a floor reaction force. Further, a desired motion is created using the first dynamic model usually having higher linearity than the second dynamic model, so that the danger of divergence of a gait is minimized and it is possible to efficiently generate a desired motion that allows the first floor reaction force component that takes into account the floor reaction force component error Aerr or the first floor reaction force correction amount based thereon to properly satisfy the desired value and also allows the second floor reaction force component that takes into account the floor reaction force component error Berr or the second floor reaction force correction amount based thereon to properly satisfy the permissible range.

Further, according to a fourth invention of a gait generating system for a mobile robot in accordance with the present invention, in order to fulfill the aforesaid object, there is provided a gait generating system that sets a desired value of a predetermined first floor reaction force component of a floor reaction force generated by a motion of a mobile robot and a permissible range of a predetermined second floor reaction force component, which is different from the first floor reaction force component, and generates a desired gait that includes at least a desired motion of the mobile robot such that the desired value of the first floor reaction force component and the permissible range of the second floor reaction force component are satisfied, comprising:

a provisional desired motion creating means for creating a provisional motion, which indicates a provisional value of the desired motion;

a floor reaction force component error calculating means for determining, on an arbitrary motion of the mobile robot, a floor reaction force component error Aerr, which is the difference between the first floor reaction force component generated on the second dynamic model by the motion and the first floor reaction force component generated on the first dynamic model by the motion, by using a predetermined first dynamic model of the mobile robot and a predetermined second dynamic model having a dynamic accuracy that is higher than that of the first dynamic model, and for determining a floor reaction force component error Berr, which is the difference between the second floor reaction force component generated on the second dynamic model by the motion and the second floor reaction force component generated on the first dynamic model by the motion; and a desired motion determining means for determining the desired motion by correcting the provisional motion at least once or more, wherein provided that a corrected motion determined by the desired motion determining means by an n-th (n: integer satisfying $n \geq 1$) correction of the provisional motion is defined as the motion after the n-th correction, the floor reaction force component errors Aerr and Berr determined by the floor reaction force component error calculating means from the motion after the n-th correction are respectively defined as n-th floor reaction force component errors Aerr(n) and Berr(n), the provisional motion is defined as a motion after a 0-th correction, and the floor reaction force component errors Aerr and Berr determined by the floor reaction force component error calculating means from the provisional motion are defined as 0-th floor reaction force component errors Aerr(0) and Berr(0), respectively, then the desired motion determining means repeats corrected motion determination processing for determining a motion after an n-th correction such that a result obtained by adding either an (n−1)th floor reaction force component error Aerr(n−1) or a first floor reaction force correction amount determined on the basis of at least the (n−1)th floor reaction force component error Aerr(n−1) to the first floor reaction force component produced on the first dynamic model by the motion after the n-th correction agrees with the desired value, and a result obtained by adding either an (n−1)th floor reaction force component error Berr(n−1) or a second floor reaction force correction amount determined on the basis of at least the (n−1)th floor reaction force component error Berr(n−1) to the second floor reaction force component produced on the first dynamic model by the motion after the n-th correction satisfies the permissible range, and convergence discrimination processing for discriminating whether a floor reaction force component error change amount $\Delta$Aerr defined as either a difference between an n-th floor reaction force component error Aerr(n) associated with the determined motion after the n-th correction and an (n−1)th floor reaction force component error Aerr(n−1) associated with a motion after the (n−1)th correction or a difference between the n-th floor reaction force component error Aerr(n) and the first floor reaction force correction amount determined on the basis of at least the (n−1)th floor reaction force component error Aerr(n−1) and a floor reaction force component error change amount $\Delta$Berr defined as either a difference between an n-th floor reaction force component error Berr(n) associated with the determined motion after the n-th correction and an (n−1)th floor reaction force component error Berr(n−1) associated with a motion after the (n−1)th correction or a difference between the n-th floor reaction force component error Berr(n) and the second floor reaction force correction amount determined on the basis of at least the (n−1)th floor reaction force component error Berr(n−1) have respectively converged to zero or not until the desired motion determining means determines at least that the floor reaction force component error change amounts $\Delta$Aerr and $\Delta$Berr have both converged to zero, and a corrected motion determined by the last corrected motion determination processing in the repetitive processing is determined as the desired motion.

The fourth invention omits the evaluating means in the third invention and carries out the corrected motion determination processing and the convergence discrimination processing at least once or more. In the fourth invention, the provisional motion may be created using the first dynamic model such that the first floor reaction force component agrees with the desired value and the second floor reaction force component satisfies the permissible range as with, for example, the aforesaid third invention; however, it does not necessarily have to be created like this.

In the fourth invention, the operations and advantages provided by the corrected motion determination processing and the convergence discrimination processing are the same as those in the third invention. Thus, it is possible to generate, on the first dynamic model, a desired gait having a high dynamic accuracy that allows a desired value of the first floor reaction force component to be satisfied and the permissible range of the second floor reaction force component to be satisfied on the second dynamic model.

Further, as with the third invention, the corrected motion is created on the first dynamic model, and the second dynamic model is used simply to determine a floor reaction force from a motion after an (n−1)th correction, making it possible to efficiently and promptly perform the processing for generating a motion after an n-th correction and the processing for calculating a floor reaction force relative to the motion after the (n−1)th correction. The provisional motion (a motion after the 0-th correction) does not require dynamic accuracy much, so that it can be easily and quickly created using a dynamic model having high linearity, such as the first dynamic model.

Thus, according to the fourth invention, as with the third invention, it is possible to efficiently generate a gait that allows a desired value of a first floor reaction force component and a permissible range of a second floor reaction force component to be satisfied and also possible to secure high dynamic accuracy between a motion of the gait and a floor reaction force. Further, a desired motion is created using the first dynamic model usually having higher linearity than the second dynamic model, so that the danger of divergence of a gait is minimized and it is possible to efficiently generate a desired motion that allows the first floor reaction force component that takes into account a floor reaction force component error Aerr to properly satisfy the desired value and the second floor reaction force component that takes into account a floor reaction force component error Berr to properly satisfy the permissible range.

In the first invention or the second invention described above, the floor reaction force component is preferably a translational floor reaction force horizontal component of a floor reaction force acting on the mobile robot (a fifth invention). According to this, a desired gait that allows a translational floor reaction force horizontal component to properly satisfy a permissible range (fall within a permissible range), thus making it possible to properly generate a desired gait that minimizes the danger of a slippage of a robot.

Further, in the third invention or the fourth invention described above, preferably, the first floor reaction force component is a floor reaction force moment horizontal component about a predetermined point of action (e.g., a desired ZMP) of a floor reaction force acting on the mobile robot, and the second floor reaction force component is a translational floor reaction force horizontal component acting on the mobile robot (a sixth invention).

According to this, it is possible to generate a desired gait in which a floor reaction force moment horizontal component about a predetermined point of action satisfies a desired value thereof and a translational floor reaction force horizontal component satisfies a permissible range thereof (falls within a permissible range); hence, a desired gait that minimizes the danger of a slippage of a robot can be properly generated while satisfying a dynamic balance condition.

Next, according to a seventh invention of a gait generating system for a mobile robot in accordance with the present invention, in order to fulfill the aforesaid object, there is provided a gait generating system that sets a desired ZMP of a mobile robot and a permissible range of a translational floor reaction force horizontal component produced by a motion of the mobile robot, and generates a desired gait that includes at least a desired motion of the mobile robot such that the desired ZMP and the permissible range of the translational floor reaction force horizontal component are satisfied, comprising:

a provisional desired motion creating means for creating a provisional motion, which indicates a provisional value of the desired motion, by using a predetermined first dynamic model of the mobile robot such that the desired ZMP is satisfied and the translational floor reaction force horizontal component satisfies the permissible range;

an error calculating means for determining, on an arbitrary motion of the mobile robot, by using the first dynamic model and a predetermined second dynamic model having a dynamic accuracy that is higher than that of the first dynamic model, a ZMP error ZMPerr, which is the difference between a ZMP calculated on the second dynamic model in response to the motion and a ZMP calculated on the first dynamic model in response to the motion, and for determining a translational floor reaction force horizontal component error Ferr, which is the difference between the translational floor reaction force horizontal component generated on the second dynamic model by the motion and the translational floor reaction force horizontal component generated on the first dynamic model by the motion;

an evaluating means for evaluating whether a ZMP error ZMPerr determined by the error calculating means from the created provisional motion and a ZMP error ZMPerr out of a translational floor reaction force horizontal component error Ferr fall within a predetermined first permissible error range and for evaluating whether the translational floor reaction force horizontal component error Ferr falls within a predetermined second permissible error range; and a desired motion determining means for determining, in the evaluation by the evaluating means, the provisional motion as the desired motion if both ZMP error ZMPerr and translational floor reaction force horizontal component error Ferr associated with the provisional motion respectively fall within the first permissible error range and the second permissible error range associated therewith, or for determining the desired motion by correcting the provisional motion at least once or more if at least either the ZMP error ZMPerr or the translational floor reaction force horizontal component error Ferr associated with the provisional motion deviates from the first permissible error range or the second permissible error range associated therewith, wherein in a case where at least either the ZMP error ZMPerr or the translational floor reaction force horizontal component error Ferr associated with the provisional motion deviates from the first permissible error range or the second permissible error range associated therewith, if a corrected motion determined by the desired motion determining means by an n-th (n: integer satisfying n≧1) correction of the provisional motion is defined as the motion after the n-th correction, a ZMP error ZMPerr and a translational floor reaction force horizontal component error Ferr determined by the floor reaction force component error calculating means from the motion after the n-th correction are defined as an n-th ZMP error ZMPerr(n) and an n-th translational floor reaction force horizontal component error Ferr(n), respectively, the provisional motion is defined as the motion after a 0-th correction, and the ZMP error ZMPerr and the translational floor reaction force horizontal component error Ferr associated with the provisional motion are defined as a 0-th ZMP error ZMPerr(0) and a 0-th translational floor reaction force horizontal component error Ferr(0), respectively, then the desired motion determining means repeats corrected motion determination processing for determining a motion after an n-th correction such that a result obtained by adding either an (n−1)th ZMP error ZMPerr(n−1) or a ZMP correction amount determined on the basis of at least the (n−1)th ZMP error ZMPerr(n−1) to a ZMP calculated on the first dynamic model by the motion after the n-th correction agrees with the desired ZMP, and the result obtained by adding either an (n−1)th translational floor reaction force horizontal component error Ferr(n−1) or a floor reaction force correction amount determined on the basis of at least the (n−1)th translational floor reaction force horizontal component error Ferr(n−1) to the translational floor reaction force horizontal component produced on the first dynamic model by the motion after the n-th correction satisfies the permissible range, and convergence discrimination processing for discriminating whether a ZMP error change amount ΔZMPerr defined as either a difference between an n-th ZMP error ZMPerr(n) associated with the determined motion after the n-th correction and an (n−1)th ZMP error ZMPerr(n−1) associated with a motion after an (n−1)th correction or a difference between the n-th ZMP error ZMPerr(n) and the ZMP correction amount determined on the basis of at least the (n−1)th ZMP error ZMPerr(n−1), and a translational floor reaction force horizontal component error change amount ΔFerr defined as either a difference between an n-th translational floor reaction force horizontal component error Ferr(n) associated with the determined motion after the n-th correction and an (n−1)th translational floor reaction force horizontal component error Ferr(n−1) associated with a motion after an (n−1)th correction or a difference between the n-th translational floor reaction force horizontal component error Ferr(n) and the floor reaction force correction amount determined on the basis of at least the (n−1)th translational floor reaction force horizontal component error Ferr(n−1) have respectively converged to zero until the desired motion determining means determines at least that both the ZMP error change amount ΔZMPerr and the translational floor reaction force horizontal component error change amount ΔFerr have converged to zero, and determines, as the desired motion, a corrected motion determined by last corrected motion determination processing in the repetitive processing.

In the seventh invention, a desired ZMP being satisfied on an arbitrary motion of a robot on an arbitrary dynamic model means that the horizontal component of a moment (or the floor reaction force moment horizontal component balancing out the moment) produced about the desired ZMP by the resultant force of an inertial force of the robot generated on the dynamic model by the motion and the gravity acting on the robot becomes zero or substantially zero. The same will apply to an eighth invention, a tenth invention, a fifteenth invention, and a sixteenth invention, which will be discussed later.

According to the seventh invention, a provisional motion, which indicates a provisional value of a desired motion, is tentatively generated by the provisional desired motion creating means. The provisional motion is created using the first dynamic model such that the desired ZMP is satisfied and the translational floor reaction force horizontal component satisfies the permissible range.

Then, the evaluating means evaluates whether the ZMP error ZMPerr and the translational floor reaction force horizontal component error Ferr determined by the error calculating means from the provisional motion fall within a first permissible error range and a second permissible error range, respectively. In this case, the ZMP error ZMPerr associated with the provisional motion indicates the difference between a ZMP calculated on the second dynamic model in response to the provisional motion and a ZMP calculated on the first dynamic model in response to the provisional motion, so that it means an error of a ZMP on the first dynamic model relative to the provisional motion. Similarly, the translational floor reaction force horizontal component error Berr associated with the provisional motion indicates the difference between a translational floor reaction force horizontal component generated on the second dynamic model by the provisional motion and a translational floor reaction force horizontal component generated on the first dynamic model by the provisional motion, so that it means an error of a translational floor reaction force horizontal component on the first dynamic model relative to the provisional motion.

And, if both the ZMP error ZMPerr and the translational floor reaction force horizontal component error Ferr associated with the provisional motion fall within the first permissible error range and the second permissible error range respectively associated therewith in the evaluation by the evaluating means, then the error of the ZMP calculated on the first dynamic model by the provisional motion is sufficiently small and the error of the translational floor reaction force horizontal component generated on the first dynamic model by the provisional motion is also sufficiently small, so that the provisional motion is determined as the desired motion. If either the ZMP error ZMPerr or the translational floor reaction force horizontal component error Ferr associated with the provisional motion deviates from the first permissible error range or the second permissible error range associated therewith, then the provisional motion is corrected at least once or more by the desired motion determining means, and a desired motion is obtained by the correction. In a case where the provisional motion is corrected, the desired motion determination means repeats the corrected motion determination processing and the convergence discrimination processing until at least it is determined that both the ZMP error change amount $\Delta$ZMPerr and the translational floor reaction force horizontal component error change amount $\Delta$Ferr have converged to zero, and determines, as the desired motion, the corrected motion that is determined by last corrected motion determination processing in the repetitive processing.

In this case, the corrected motion determination processing determines a motion after an n-th correction such that the result obtained by adding either an (n−1)th ZMP error ZMPerr(n−1) calculated in response to a motion after an (n−1)th correction (a motion after a 0-th correction is the provisional motion) or a ZMP correction amount determined on the basis of at least the (n−1)th ZMP error ZMPerr(n−1) to a ZMP calculated on the first dynamic model by an n-th correction motion obtained after an n-th correction agrees with the desired ZMP, and the result obtained by adding either an (n−1)th translational floor reaction force horizontal component error Ferr(n−1) calculated in response to a motion after an (n−1)th correction or a floor reaction force correction amount determined on the basis of at least the (n−1)th translational floor reaction force horizontal component error Ferr (n−1) to a translational floor reaction force horizontal component produced on the first dynamic model by a motion after an n-th correction satisfies the permissible range. However, a motion after the n-th correction will not generally be the same as a motion after an (n−1)th correction, so that the (n−1)th ZMP error ZMPerr(n−1) and the (n−1)th translational floor reaction force horizontal component error Ferr(n−1) or a ZMP correction amount and a floor reaction force correction amount based thereon, which have been taken into account in determining the motion after the n-th correction, cannot be said to be necessarily appropriate. For this reason, according to the seventh invention, based on the same concept as that of the first invention, whether the ZMP error change amount $\Delta$ZMPerr and the translational floor reaction force horizontal component error change amount $\Delta$Ferr have respectively converged to zero is determined by the convergence discrimination processing, and the corrected motion determination processing is repeated until at least it is determined that both $\Delta$ZMPerr and $\Delta$Ferr have converged. At this time, if both $\Delta$ZMPerr and $\Delta$Ferr have converged to zero, then the n-th ZMP error ZMPerr(n) and the n-th translational floor reaction force horizontal component error Ferr(n) associated with the motion after the n-th correction determined at that time will be substantially equivalent to an (n−1)th ZMP error ZMPerr (n−1) and an (n−1)th translational floor reaction force horizontal component error Ferr(n−1), respectively, or a ZMP correction amount and a floor reaction force correction amount based thereon; hence, both the (n−1)th ZMP error ZMPerr(N−1) or the ZMP correction amount based thereon and the (n−1)th translational floor reaction force horizontal component error Ferr(n−1) or the floor reaction force correction amount based thereon taken into account when determining the n-th corrected motion may be said to be appropriate (highly reliable) floor reaction force component errors. And, the motion after the n-th correction at that time is determined as the desired motion.

Thus, a desired gait having a high dynamic accuracy that allows a desired ZMP to be satisfied and also allows the permissible range of a translational floor reaction force horizontal component to be satisfied on the second dynamic model can be generated on the first dynamic model.

Further, the corrected motion is created on the first dynamic model (this model generally having higher linearity than the second dynamic model), and the second dynamic model is used simply to determine a ZMP or a floor reaction force from the motion after the (n−1)th correction, thus making it possible to efficiently and promptly perform the processing for generating the motion after the n-th correction and the processing for calculating a ZMP or a floor reaction force relative to the motion after the (n−1)th correction. Further, the provisional motion (the motion after the 0-th correction) does not require dynamic accuracy much, so that it can be easily and quickly created using a dynamic model having high linearity, such as the first dynamic model.

Hence, according to the seventh invention, it is possible to efficiently generate a gait that allows a desired ZMP and the permissible range of a translational floor reaction force horizontal component to be satisfied and also possible to secure high dynamic accuracy between a motion of the gait and a floor reaction force. Further, a desired motion is created using the first dynamic model usually having higher linearity than the second dynamic model, so that the danger of divergence of a gait is minimized and it is possible to efficiently generate a desired motion that allows a ZMP that takes into account the ZMP error ZMPerr or a ZMP correction amount based thereon to properly satisfy the desired ZMP and also allows a translational floor reaction force horizontal component that takes into account the translational floor reaction force horizontal component error Ferr or a floor reaction force correction amount based thereon to properly satisfy the permissible range.

Further, according to an eighth invention of a gait generating system for a mobile robot in accordance with the present invention, in order to fulfill the aforesaid object, there is provided a gait generating system that sets a desired ZMP of a mobile robot and a permissible range of a translational floor reaction force horizontal component produced by a motion of the mobile robot, and generates a desired gait that includes at least a desired motion of the mobile robot such that the desired ZMP and the permissible range of the translational floor reaction force horizontal component are satisfied, comprising:

a provisional desired motion creating means for creating a provisional motion, which indicates a provisional value of the desired motion;

an error calculating means for determining, on an arbitrary motion of the mobile robot, a ZMP error ZMPerr, which is the difference between a ZMP calculated on the second dynamic model in response to the motion and a ZMP calculated on the first dynamic model in response to the motion, and for determining a translational floor reaction force horizontal component error Ferr, which is the difference between the translational floor reaction force horizontal component generated on the second dynamic model by the motion and the translational floor reaction force horizontal component generated on the first dynamic model by the motion, by using a predetermined first dynamic model of the mobile robot and a predetermined second dynamic model having a dynamic accuracy that is higher than that of the first dynamic model; and a desired motion determining means for determining the desired motion by correcting the provisional motion at least once or more, wherein provided that a corrected motion determined by the desired motion determining means by an n-th (n: integer satisfying $n \geq 1$) correction of the provisional motion is defined as the motion after the n-th correction, a ZMP error ZMPerr and a translational floor reaction force horizontal component error Ferr determined by the floor reaction force component error calculating means from the motion after the n-th correction are defined as an n-th ZMP error ZMPerr(n) and an n-th translational floor reaction force horizontal component error Ferr(n), respectively, the provisional motion is defined as the motion after a 0-th correction, and the ZMP error ZMPerr and the translational floor reaction force horizontal component error Ferr determined by the floor reaction force component error calculating means from the provisional motion are defined as a 0-th ZMP error ZMPerr(0) and a 0-th translational floor reaction force horizontal component error Ferr(0), respectively, then the desired motion determining means repeats corrected motion determination processing for determining a motion after an n-th correction such that a result obtained by adding either an (n−1)th ZMP error ZMPerr(n−1) or a ZMP correction amount determined on the basis of at least the (n−1)th ZMP error ZMPerr(n−1) to a ZMP calculated on the first dynamic model by the motion after the n-th correction agrees with the desired ZMP, and the result obtained by adding either an (n−1)th transational floor reaction force horizontal component error Ferr(n−1) or a floor reaction force correction amount determined on the basis of at least the (n−1)th translational floor reaction force horizontal component error Ferr(n−1) to the translational floor reaction force horizontal component produced on the first dynamic model by the motion after the n-th correction satisfies the permissible range, and convergence discrimination processing for discriminating whether a ZMP error change amount ΔZMPerr defined as either a difference between an n-th ZMP error ZMPerr(n) associated with the determined motion after the n-th correction and an (n−1)th ZMP error ZMPerr(n−1) associated with a motion after an (n−1)th correction or a difference between the n-th ZMP error ZMPerr(n) and the ZMP correction amount determined on the basis of at least the (n−1)th ZMP error ZMPerr(n−1), and a translational floor reaction force horizontal component error change amount ΔFerr defined as either a difference between an n-th translational floor reaction force horizontal component error Ferr(n) associated with the determined motion after the n-th correction and an (n−1)th translational floor reaction force horizontal component error Ferr(n−1) associated with a motion after an (n−1)th correction or a difference between the n-th translational floor reaction force horizontal component error Ferr(n) and the floor reaction force correction amount determined on the basis of at least the (n−1)th translational floor reaction force horizontal component error Ferr(n−1) have respectively converged to zero until the desired motion determining means determines at least that both the ZMP error change amount ΔZMPerr and the translational floor reaction force horizontal component error change amount ΔFerr have both converged to zero, and determines, as the desired motion, a corrected motion determined by last corrected motion determination processing in the repetitive processing.

The eighth invention omits the evaluating means in the seventh invention and carries out the corrected motion determination processing and the convergence discrimination processing at least once or more. In the eighth invention, the provisional motion may be created using, for example, the first dynamic model such that the desired ZMP is satisfied and the translational floor reaction force horizontal component satisfies the permissible range; however, it does not necessarily have to be created like this.

In the eighth invention, the operations and advantages provided by the corrected motion determination processing and the convergence discrimination processing are the same as those in the seventh invention. Thus, it is possible to generate, on the first dynamic model, a desired gait having a high dynamic accuracy that allows the desired ZMP and the permissible range of the translational floor reaction force horizontal component to be satisfied on the second dynamic model.

Moreover, as with the seventh invention, the corrected motion is created on the first dynamic model (this model generally having higher linearity than the second dynamic model) and the second dynamic model is used simply to determine a ZMP or a floor reaction force from a motion after an (n−1)th correction, making it possible to efficiently and promptly perform the processing for generating a motion after an n-th correction and the processing for calculating a ZMP and a floor reaction force relative to the motion after the (n−1)th correction. The provisional motion (a motion after the 0-th correction) does not require dynamic accuracy much, so that it can be easily and quickly created using a dynamic model having high linearity, such as the first dynamic model.

Thus, according to the eighth invention, as with the seventh invention, it is possible to efficiently generate a gait that allows a desired ZMP and a permissible range of a translational floor reaction force horizontal component to be satisfied and also possible to secure high dynamic accuracy between a motion of the gait and a floor reaction force. Further, a desired motion is created using the first dynamic model usually having higher linearity than the second dynamic model, so that the danger of divergence of a gait is minimized and it is possible to efficiently generate a desired motion that allows a ZMP that takes into account the ZMP error ZMPerr or a ZMP correction amount based thereon to properly satisfy the desired ZMP and the translational floor reaction force horizontal component that takes into account a translational floor reaction force horizontal component error Ferr or a floor reaction force correction amount based thereon to properly satisfy the permissible range.

Incidentally, in the aforesaid third invention (or the sixth invention using the third invention as an element thereof), a first floor reaction force component produced on the first dynamic model by the provisional motion agrees or substantially agrees with the desired value. Further, the motion after the n-th correction is determined such that a result obtained by adding either an (n−1)th floor reaction force component error Aerr(n−1) or the value obtained by multiplying the (n−1)th floor reaction force component error Aerr(n−1) by a predetermined first coefficient to a first floor reaction force horizontal component produced on the first dynamic model by the motion after the n-th correction agrees with the desired value. Hence, the first floor reaction force horizontal component produced on the first dynamic model by the motion after the n-th correction agrees or substantially agrees with a value obtained by subtracting either the (n−1)th floor reaction force component error Aerr(n−1) or a value obtained by multiplying (n−1)th floor reaction force component error Aerr(n−1) by a predetermined first coefficient from the desired value. This applies also to a case where the provisional motion is created such that the desired value of the first floor reaction force component is satisfied on the first dynamic model in the aforesaid fourth invention (or the sixth invention using the fourth invention as an element thereof).

In the third invention (or the sixth invention) described above, the floor reaction force component error calculating means may calculate, relative to the provisional motion, the floor reaction force component error Aerr associated with the provisional motion by using the desired value as the first floor reaction force component produced on the first dynamic model by the provisional motion, while the floor reaction force component error calculating means may calculate, relative to a motion after an n-th correction other than the provisional motion, the floor reaction force component error Aerr associated with the motion after the n-th correction by using a result obtained by subtracting either the (n−1)th floor reaction force component error Aerr(n−1) or the first floor reaction force correction amount determined on the basis of at least the (n−1)th floor reaction force component error Aerr(n−1) from the desired value, as the first floor reaction force component produced on the first dynamic model by the motion after the n-th correction (a ninth invention).

Similarly, in the fourth invention (or the sixth invention) described above, if the provisional motion creating means is a means for creating the provisional motion such that at least a desired value of the first floor reaction force component is satisfied on the first dynamic model, then the floor reaction force component error calculating means may calculate, relative to the provisional motion, the floor reaction force component error Aerr associated with the provisional motion as the first floor reaction force component, which is produced on the first dynamic model by the provisional motion, by using the desired value, while the floor reaction force component error calculating means may calculate, relative to a motion after an n-th correction other than the provisional motion, the floor reaction force component error Aerr associated with the motion after the n-th correction as the first floor reaction force component produced on the first dynamic model by the motion after the n-th correction, by using a result obtained by subtracting either the (n−1)th floor reaction force component error Aerr(n−1) or the first floor reaction force correction amount determined on the basis of at least the (n−1)th floor reaction force component error Aerr(n−1) from the desired value (a tenth invention).

According to the ninth invention or the tenth invention, the floor reaction force component errors associated with these motions can be easily determined without calculating a first floor reaction force component directly by the first dynamic model from a motion after an n-th correction.

Based on the same concept of the ninth invention or the tenth invention, according to the aforesaid seventh invention, the floor reaction force component error calculating means may calculate, relative to the provisional motion, the ZMP error ZMPerr associated with the provisional motion as the ZMP, which is calculated on the first dynamic model in response to the provisional motion, by using the desired ZMP, while the floor reaction force component error calculating means may calculate, relative to a motion after an n-th correction other than the provisional motion, a ZMP error ZMPerr associated with the motion after the n-th correction as the ZMP calculated on the first dynamic model in response to the motion after the n-th correction, by using a result obtained by subtracting either the (n−1)th ZMP error ZMPerr(n−1) or the ZMP correction amount determined on the basis of at least the (n−1)th ZMP error ZMPerr(n−1) from the desired ZMP (an eleventh invention).

Similarly, in the eighth invention, if the provisional motion creating means is a means for creating the provisional motion such that at least a desired ZMP is satisfied on the first dynamic model, then the floor reaction force component error calculating means may calculate, relative to the provisional motion, the ZMP error ZMPerr associated with the provisional motion as the ZMP, which is calculated on the first dynamic model in response to the provisional motion, by using the desired ZMP, while the floor reaction force component error calculating means may calculate, relative to a motion after an n-th correction other than the provisional motion, a ZMP error ZMPerr associated with the motion after the n-th correction as the ZMP calculated on the first dynamic model in response to the motion after the n-th correction, by using a result obtained by subtracting either the (n−1)th ZMP error ZMPerr(n−1) or the ZMP correction amount determined on the basis of at least the (n−1)th ZMP error ZMPerr(n−1) from the desired ZMP (a twelfth invention).

According to the eleventh invention or the twelfth invention, the ZMP errors associated with these motions can be easily determined without calculating a ZMP directly by the first dynamic model from a provisional motion or a motion after an n-th correction.

Further, in the first to the twelfth inventions described above, to enhance the reliability of the aforesaid errors, it is preferred to use a time series of the instantaneous values of errors in a certain period of a gait of a robot and to carry out the evaluation processing by the evaluating means or the convergence discrimination processing on the entire time series.

Hence, in the first invention (or the fifth invention using this as an element thereof) described above, preferably, the desired motion, the provisional motion, and the corrected motion mentioned above are composed of time series of the instantaneous values of motions of the mobile robot during a predetermined period; an m-th floor reaction force component error (m: integer satisfying $m \geq 0$) determined by the floor reaction force component error calculating means is composed of a time series of the difference in the predetermined period between an instantaneous value of the floor reaction force component produced on the second dynamic model at each time of a motion after an m-th correction by the motion after the m-th correction and an instantaneous value of the floor reaction force component produced on the first dynamic model at the time by the motion after the m-th correction; the predetermined permissible error range of the evaluating means is a permissible error range for a predetermined first characteristic amount in a pattern of the time series constituting the 0-th floor reaction force component error; the corrected motion determination processing by the desired motion determining means is the processing for determining, at each time t of the motion after the n-th correction, an instantaneous value of a motion after an n-th correction at the time t such that a result obtained by adding either a value at the time t of the (n−1)th floor reaction force component error or a value of a floor reaction force correction amount determined on the basis of at least the value to an instantaneous value FM(t) of the floor reaction force component produced on the first dynamic model at time t by the motion after the n-th correction satisfies the permissible range at the time t; the floor reaction force component error change amount $\Delta FM$ is composed of a time series in the predetermined period of a difference between a value of the n-th floor reaction force component error at each time and a value of an (n−1)th floor reaction force component error at the time or a difference between a value of the n-th floor reaction force component error at each time and a value of the floor reaction force correction amount determined on the basis of at least a value of the (n−1)th floor reaction force component error at the time; and the convergence discrimination processing of the desired motion determining means is the processing for determining that the floor reaction force component error change amount $\Delta FM$ has converged to zero when a predetermined second characteristic amount in a pattern of the time series constituting the floor reaction force component error change amount $\Delta FM$ falls within a predetermined permissible change amount range (a thirteenth invention).

Incidentally, in the thirteenth invention, types of the first characteristic amount and the second characteristic amount include, for example, a maximum value of absolute values of a time series (the absolute values of individual values of a time series) or the total sum of the absolute values, or an effective value of a pattern of the time series, or a difference between a maximum value and a minimum value of the time series. The types of these first characteristic amount and second characteristic amount do not have to be the same, but they may be the same.

According to the thirteenth invention, the evaluating means evaluates whether the first characteristic amount of a pattern of a time series constituting the 0-th floor reaction force component error (i.e., the floor reaction force component error associated with the provisional motion) falls within the permissible error range, making it possible to evaluate whether the time series of the 0-th floor reaction force component error is sufficiently small or not. As a result, it is possible to properly evaluate whether the entire time series of instantaneous values of a provisional motion is suited or not as a time series of a desired motion. Furthermore, in the convergence discrimination processing, it is determined that the floor reaction force component error change amount $\Delta FM$ has converged to zero when a predetermined second characteristic amount in a pattern of a time series constituting the floor reaction force component error change amount $\Delta FM$ falls within a predetermined permissible change amount range, thus making it possible to determine whether a time series of an (n−1)th floor reaction force component error associated with a motion after the (n−1)th correction or a time series of the floor reaction force correction amount associated with a motion after the (n−1)th correction and a time series of an n-th floor reaction force component error associated with a motion after an n-th correction exhibit substantially the same pattern as a whole. As a result, it can be properly determined whether the aforesaid determined time series of an instantaneous value of the motion after the n-th correction has been determined by taking into account a highly reliable floor reaction force component error or a highly reliable floor reaction force correction amount. This eventually makes it possible to improve the reliability of the dynamic accuracy of a desired gait including a desired motion that has been lastly determined.

Based on the same concept as that of the aforesaid eleventh invention, in the second invention (or the fifth invention using this as an element thereof), preferably, the desired motion, the provisional motion, and the corrected motion mentioned above are composed of time series of the instantaneous values of motions of the mobile robot during a predetermined period; the m-th floor reaction force component error (m: integer satisfying $m \geq 0$) determined by the floor reaction force component error calculating means is composed of a time series of the difference in the predetermined period between an instantaneous value of the floor reaction force component produced on the second dynamic model at each time of a motion after an m-th correction by the motion after the m-th correction and an instantaneous value of the floor reaction force component produced on the first dynamic model at the time by the motion after the m-th correction; the corrected motion determination processing by the desired motion determining means is the processing for determining, at each time t of the motion after the n-th correction, an instantaneous value of a motion after an n-th correction at the time t such that a result obtained by adding either a value at the time t of the (n−1)th floor reaction force component error or a value of the floor reaction force correction amount determined on the basis of at least the value to an instantaneous value FM(t) of the floor reaction force component produced on the first dynamic model at time t by the motion after the n-th correction satisfies the permissible range at the time t; the floor reaction force component error change amount $\Delta FM$ is composed of a time series in the predetermined period of either a difference between a value of the n-th floor reaction force component error at each time and a value of an (n−1)th floor reaction force component error at the time or a difference between a value of the n-th floor reaction force component error at each time and a value of the floor reaction force correction amount determined on the basis of at least a value of the (n−1)th floor reaction force component error at the time; and the convergence discrimination processing of the desired motion determining means is the processing for determining that the floor reaction force component error change amount ΔFM has converged to zero when a predetermined characteristic amount in a pattern of the time series constituting the floor reaction force component error change amount ΔFM has fallen within a predetermined permissible change amount range (a fourteenth invention).

Incidentally, in the fourteenth invention, types of the characteristic amounts may include those exemplified in relation to the aforesaid thirteenth invention.

According to the fourteenth invention, in the convergence discrimination processing, it is determined that the floor reaction force component error change amount ΔFM has converged to zero when a predetermined characteristic amount in a pattern of a time series constituting the floor reaction force component error change amount ΔFM falls within a predetermined permissible change amount range, thus making it possible to properly determine whether the time series of instantaneous values of the motion after the n-th correction determined above has been determined by taking into account a highly reliable floor reaction force component error or a highly reliable floor reaction force correction amount. This eventually makes it possible to improve the reliability of the dynamic accuracy of a desired gait that includes a desired motion that has been lastly determined.

Further, based on the same concept as that of the thirteenth invention, in the third invention (or the sixth invention or the ninth invention using this as an element thereof) described above, preferably, the desired motion, the provisional motion, and the corrected motion described above are composed of time series of the instantaneous values of motions of the mobile robot during a predetermined period, an m-th floor reaction force component error Aerr out of the m-th floor reaction force component errors Aerr and Berr (m: integer satisfying m≧0) determined by the floor reaction force component error calculating means is composed of a time series of the difference in the predetermined period between an instantaneous value of the first floor reaction force component produced on the second dynamic model at each time of a motion after an m-th correction by the motion after the m-th correction and an instantaneous value of the first floor reaction force component produced on the first dynamic model at the time by the motion after the m-th correction; the m-th floor reaction force component error Berr is composed of a time series of the difference in the predetermined period between an instantaneous value of the second floor reaction force component produced on the second dynamic model at each time of a motion after an m-th correction and an instantaneous value of the second floor reaction force component produced on the first dynamic model at the time by the motion after the m-th correction; the predetermined first permissible error range of the evaluating means is a permissible error range for a predetermined first characteristic amount out of a time series pattern constituting the 0-th floor reaction force component error Aerr(0) and the predetermined second permissible error range is a permissible error range for a predetermined second characteristic amount out of a time series pattern constituting the 0-th floor reaction force component error Berr(0); the corrected motion determination processing by the desired motion determining means is the processing for determining, at each time t of the motion after the n-th correction, an instantaneous value of a motion after an n-th correction at the time t such that a result obtained by adding either a value of the (n−1)th floor reaction force component error Aerr(n−1) at the time t or a value of the first floor reaction force correction amount determined on the basis of at least the value to an instantaneous value of the first floor reaction force component produced on the first dynamic model at time t by the motion after the n-th correction satisfies the desired value at the time t, and a result obtained by adding either a value of the (n−1)th floor reaction force component error Berr(n−1) at the time t or a value of the second floor reaction force correction amount determined on the basis of at least the value to an instantaneous value of the second floor reaction force component produced on the first dynamic model at the time t by the motion after the n-th correction satisfies the permissible range at the time t; the floor reaction force component error change amount ΔAerr is composed of a time series, in the predetermined period, of either a difference between a value of the n-th floor reaction force component error Aerr(n) at each time and a value of an (n−1)th floor reaction force component error Aerr(n−1) at the time or a difference between a value of the n-th floor reaction force component error Aerr(n) at each time and a value of the first floor reaction force correction amount determined on the basis of at least a value of the (n−1)th floor reaction force component error Aerr(n−1) at the time; the floor reaction force component error change amount ΔBerr is composed of a time series, in the predetermined period, of either a difference between a value of the n-th floor reaction force component error Berr(n) at each time and a value of an (n−1)th floor reaction force component error Berr(n−1) at the time or a difference between a value of the n-th floor reaction force component error Berr(n) at each time and a value of the second floor reaction force correction amount determined on the basis of at least a value of the (n−1)th floor reaction force component error Berr(n−1) at the time; and the convergence discrimination processing of the desired motion determining means is the processing for determining that the floor reaction force component error change amount ΔAerr has converged to zero when a predetermined third characteristic amount in a pattern of the time series constituting the floor reaction force component error change amount ΔAerr has fallen within a predetermined permissible change amount range for the third characteristic amount and also for determining that the floor reaction force component error change amount ΔBerr has converged to zero when the a fourth characteristic amount in a pattern of the time series constituting the floor reaction force component error change amount ΔBerr has fallen within a predetermined permissible change amount range for the fourth characteristic amount (a fifteenth invention).

Incidentally, in the fifteenth invention, types of the first to the fourth characteristic amounts mentioned above may include those exemplified in relation to the aforesaid thirteenth invention. In this case, the types of the first to the fourth characteristic amounts mentioned above do not have to be the same, but they may be the same.

According to the fifteenth invention, the evaluating means evaluates whether the first characteristic amount of a pattern of a time series constituting the 0-th floor reaction force component error Aerr(0) (i.e., the floor reaction force component error Aerr associated with the provisional motion) and the second characteristic amount of a pattern of a time series constituting the 0-th floor reaction force component error Aerr(0) (i.e., the floor reaction force component error Berr associated with the provisional motion) fall within the first permissible error range and the second permissible error range respectively associated therewith, thus making it possible to evaluate whether the time series are sufficiently small or not on Aerr(0) and Berr(0), respectively. As a result, it is possible to properly evaluate whether the entire time series of instantaneous values of a provisional motion is suited or not as a time series of a desired motion. Furthermore, in the convergence discrimination processing, it is determined that the floor reaction force component error change amount ΔAerr has converged to zero when a predetermined third characteristic amount in a pattern of a time series constituting the ΔAerr has fallen within a permissible change amount range associated therewith and that the floor reaction force component error change amount ΔBerr has converged to zero when a predetermined fourth characteristic amount in a pattern of a time series constituting the ΔBerr has fallen within a permissible change amount range associated therewith, thus making it possible to determine whether the time series of (n−1)th floor reaction force component errors Aerr(n−1) and Berr(n−1) associated with the motion after the (n−1)th correction, or the time series of the first floor reaction force correction amount and the second floor reaction force correction amount associated with these Aerr(n−1) and Berr(n−1), and time series Aerr(n) and Berr(n−1) of the n-th floor reaction force component error associated with the motion after the n-th correction exhibit substantially the same pattern as a whole. As a result, it can be properly determined whether the aforesaid determined time series of an instantaneous value of the motion after the n-th correction has been determined by taking into account highly reliable floor reaction force component errors Aerr and Berr or highly reliable first floor reaction force correction amount and second floor reaction force correction amount. This eventually makes it possible to improve the reliability of the dynamic accuracy of a desired gait including a desired motion that has been lastly determined.

Similarly, in the fourth invention (or the sixth invention or the tenth invention using this as an element thereof) described above, preferably, the desired motion, the provisional motion, and the corrected motion described above are composed of time series of the instantaneous values of motions of the mobile robot during a predetermined period; an m-th floor reaction force component error Aerr out of the m-th floor reaction force component errors Aerr and Berr (m: integer satisfying m≧0) determined by the floor reaction force component error calculating means is composed of a time series of the difference, in the predetermined period, between an instantaneous value of the first floor reaction force component produced on the second dynamic model at each time of a motion after an m-th correction by the motion after the m-th correction and an instantaneous value of the first floor reaction force component produced on the first dynamic model at the time by the motion after the m-th correction; the m-th floor reaction force component error Berr is composed of a time series of the difference, in the predetermined period, between an instantaneous value of the second floor reaction force component produced on the second dynamic model at each time of a motion after an m-th correction and an instantaneous value of the second floor reaction force component produced on the first dynamic model at the time by the motion after the m-th correction; the corrected motion determination processing of the desired motion determining means is the processing for determining, at each time t of the motion after the n-th correction, an instantaneous value of a motion after an n-th correction at the time t such that a result obtained by adding either a value of the (n−1)th floor reaction force component error Aerr(n−1) at the time t or a value of the first floor reaction force correction amount determined on the basis of at least the value to an instantaneous value of the first floor reaction force component produced on the first dynamic model at time t by the motion after the n-th correction satisfies the desired value at the time t, and a result obtained by adding either a value of the (n−1)th floor reaction force component error Berr(n−1) at the time t or a value of the second floor reaction force correction amount determined on the basis of at least the value to an instantaneous value of the second floor reaction force component produced on the first dynamic model at the time t by the motion after the n-th correction satisfies the permissible range at the time t; the floor reaction force component error change amount ΔAerr is composed of a time series, in the predetermined period, of either a difference between a value of the n-th floor reaction force component error Aerr(n) at each time and a value of an (n−1)th floor reaction force component error Aerr(n−1) at the time or a difference between a value of the n-th floor reaction force component error Aerr(n) at each time and a value of the first floor reaction force correction amount determined on the basis of at least a value of the (n−1)th floor reaction force component error Aerr(n−1) at the time; the floor reaction force component error change amount ΔBerr is composed of a time series, in the predetermined period, of either a difference between a value of the n-th floor reaction force component error Berr(n) at each time and a value of an (n−1)th floor reaction force component error Berr(n−1) at the time or a difference between a value of the n-th floor reaction force component error Berr(n) at each time and a value of the second floor reaction force correction amount determined on the basis of at least a value of the (n−1)th floor reaction force component error Berr(n−1) at the time; and the convergence discrimination processing of the desired motion determining means is the processing for determining that the floor reaction force component error change amount ΔAerr has converged to zero when a predetermined third characteristic amount in a pattern of the time series constituting the floor reaction force component error change amount ΔAerr falls within a predetermined permissible change amount range for the third characteristic amount and also for determining that the floor reaction force component error change amount ΔBerr has converged to zero when the fourth characteristic amount in a pattern of the time series constituting the floor reaction force component error change amount ΔBerr falls within a predetermined permissible change amount range for the fourth characteristic amount (a sixteenth invention).

Incidentally, in the sixteenth invention, types of the third characteristic amount and the fourth characteristic amount mentioned above include those exemplified in relation to the aforesaid thirteenth invention. In this case, the types of the third and the fourth characteristic amounts mentioned above do not have to be the same, but they may be the same.

According to the sixteenth invention, in the convergence discrimination processing, it is determined that the floor reaction force component error change amount ΔAerr has converged to zero when a predetermined third characteristic amount in a pattern of a time series constituting the ΔAerr falls within a permissible change amount range associated therewith and that the floor reaction force component error change amount ΔBerr has converged to zero when a predetermined fourth characteristic amount in a pattern of a time series constituting the ΔBerr falls within a permissible change amount range associated therewith, thus making it possible to properly determine whether the time series of the aforesaid determined instantaneous value of the motion after the n-th correction has been determined by taking into account highly reliable floor reaction force component errors Aerr and Berr or highly reliable first floor reaction force correction amount and second floor reaction force correction amount, as in the case of the aforesaid thirteenth invention. This eventually makes it possible to improve the reliability of the dynamic accuracy of a desired gait including a desired motion that has been lastly determined.

Similarly, in the seventh invention (or the eleventh invention using this as an element thereof) described above, preferably, the desired motion, the provisional motion, and the corrected motion described above are composed of time series of the instantaneous values of motions of the mobile robot during a predetermined period; out of the m-th ZMP error ZMPerr and a translational floor reaction force horizontal component error Ferr (m: integer satisfying m≧0) determined by the floor reaction force component error calculating means, the m-th ZMP error ZMPerr is composed of a time series of the difference, in the predetermined period, between an instantaneous value of a ZMP calculated on the second dynamic model at each time of a motion after the m-th correction in response to the motion after the m-th correction and an instantaneous value of a ZMP calculated on the first dynamic model at the time in response to the motion after the m-th correction; the m-th translational floor reaction force horizontal component error Berr is composed of a time series of the difference, in the predetermined period, between an instantaneous value of the translational floor reaction force component produced on the second dynamic model at each time of a motion after an m-th correction and an instantaneous value of the translational floor reaction force horizontal component produced on the first dynamic model at the time by the motion after the m-th correction; the predetermined first permissible error range of the evaluating means is a permissible error range for a predetermined first characteristic amount in a pattern of a time series constituting the 0-th ZMP error ZMPerr(0) and the predetermined second permissible error range is a permissible error range for a predetermined second characteristic amount in a pattern of a time series constituting the 0-th translational floor reaction force horizontal component error Ferr(0); the corrected motion determination processing of the desired motion determining means is the processing for determining, at each time t of the motion after the n-th correction, an instantaneous value of a motion after an n-th correction at the time t such that a result obtained by adding either a value of the (n−1)th ZMP error ZMPerr(n−1) at time t or a value of the ZMP correction amount determined on the basis of at least the value to an instantaneous value of the ZMP calculated on the first dynamic model at time t in response to the motion after the n-th correction satisfies the desired ZMP at the time t, and a result obtained by adding either a value of the (n−1)th translational floor reaction force horizontal component error Ferr(n−1) at the time t or a value of the floor reaction force correction amount determined on the basis of at least the value to an instantaneous value of a translational floor reaction force horizontal component produced on the first dynamic model at the time t by the motion after the n-th correction satisfies the permissible range at the time t; the ZMP error change amount ΔZMPerr is composed of a time series, in the predetermined period, of either a difference between a value of the n-th ZMP error ZMPerr(n) at each time and a value of an (n−1)th ZMP error ZMPerr(n−1) at the time or a difference between a value of the n-th ZMP error ZMPerr(n) at each time and a value of the ZMP correction amount determined on the basis of at least a value of the (n−1)th ZMP error ZMPerr(n−1) at the time; the translational floor reaction force horizontal component error change amount ΔFerr is composed of a time series, in the predetermined period, of either a difference between a value of the n-th translational floor reaction force horizontal component error Ferr(n) at each time and a value of an (n−1)th translational floor reaction force horizontal component error Ferr(n−1) at the time or a difference between a value of the n-th translational floor reaction force horizontal component error Ferr(n) at each time and a value of the floor reaction force correction amount determined on the basis of at least the value of the (n−1)th translational floor reaction force horizontal component error Ferr(n−1) at the time; and the convergence discrimination processing of the desired motion determining means is the processing for determining that the ZMP component error change amount ΔZMPerr has converged to zero when a predetermined third characteristic amount in a pattern of the time series constituting the ZMP error change amount ΔZMPerr falls within a predetermined permissible change amount range for the third characteristic amount and also for determining that the translational floor reaction force horizontal component error change amount ΔFerr has converged to zero when a predetermined fourth characteristic amount in a pattern of the time series constituting the translational floor reaction force horizontal component error change amount ΔFerr falls within a predetermined permissible change amount range for the fourth characteristic amount (a seventeenth invention).

Incidentally, in the seventeenth invention, the types of the first to the fourth characteristic amounts mentioned above include those exemplified in relation to the aforesaid thirteenth invention. In this case, the types of the first to the fourth characteristic amounts do not have to be the same; however, they may be the same.

According to the seventeenth invention, the evaluating means evaluates whether a first characteristic amount of a pattern of a time series constituting the 0-th ZMP error ZMPerr(0) (i.e., the ZMP error ZMPerr associated with the provisional motion) and a second characteristic amount of a pattern of a time series constituting the 0-th translational floor reaction force horizontal component error Ferr(0) (i.e., the translational floor reaction force horizontal component error Ferr associated with the provisional motion) fall within a first permissible error range and a second permissible error range, respectively, associated therewith, making it possible to evaluate whether the time series of each of the ZMPerr(0) and Ferr(0) is sufficiently small or not as a whole. As a result, it is possible to properly evaluate whether the entire time series of instantaneous values of a provisional motion is suited or not as a time series of a desired motion. Furthermore, in the convergence discrimination processing, it is determined that the ZMP error change amount ΔZMPerr has converged to zero when a predetermined third characteristic amount in a pattern of a time series constituting the ΔZMPerr falls within a permissible change amount range associated therewith and that the translational floor reaction force horizontal component error change amount ΔFerr has converged to zero when a predetermined fourth characteristic amount in a pattern of a time series constituting the ΔFerr falls within a permissible change amount range associated therewith, thus making it possible to determine whether a time series of an (n−1)th ZMP error ZMPerr(n−1) and an (n−1)th translational floor reaction force horizontal component error Berr(n−1) associated with a motion after the (n−1)th correction or each of the time series of the ZMP correction amount and the floor reaction force correction amount mentioned above associated therewith and each of the time series ZMPerr(n) of an n-th ZMP error associated with a motion after an n-th correction and an n-th translational floor reaction force horizontal component error Ferr(n−1) exhibit substantially the same pattern as a whole. As a result, it can be properly determined whether the aforesaid determined time series of an instantaneous value of the motion after the n-th correction has been determined by taking into account highly reliable ZMP error ZMPerr and translational floor reaction force horizontal component error Ferr or highly reliable ZMP correction amount and floor reaction force correction amount. This eventually makes it possible to improve the reliability of the dynamic accuracy of a desired gait including a desired motion that has been lastly determined.

Similarly, in the ninth invention (or the twelfth invention using this as an element thereof) described above, preferably, the desired motion, the provisional motion, and the corrected motion described above are composed of time series of the instantaneous values of motions of the mobile robot during a predetermined period; out of the m-th ZMP error ZMPerr and a translational floor reaction force horizontal component error Ferr (m: integer satisfying m≧0) determined by the floor reaction force component error calculating means, the m-th ZMP error ZMPerr is composed of a time series of the difference, in the predetermined period, between an instantaneous value of a ZMP calculated on the second dynamic model at each time of a motion after the m-th correction in response to the motion after the m-th correction and an instantaneous value of a ZMP calculated on the first dynamic model at the time in response to the motion after the m-th correction; the m-th translational floor reaction force horizontal component error Berr is composed of a time series of the difference, in the predetermined period, between an instantaneous value of the translational floor reaction force horizontal component produced on the second dynamic model at each time of a motion after an m-th correction and an instantaneous value of the translational floor reaction force horizontal component produced on the first dynamic model at the time by the motion after the m-th correction; the corrected motion determination processing of the desired motion determining means is the processing for determining, at each time t of the motion after the n-th correction, an instantaneous value of a motion after an n-th correction at the time t such that a result obtained by adding either a value of the (n−1)th ZMP error ZMPerr(n−1) at time t or a value of the ZMP correction amount determined on the basis of at least the value to an instantaneous value of the ZMP calculated on the first dynamic model at time t in response to the motion after the n-th correction satisfies the desired ZMP at the time t, and a result obtained by adding either a value of the (n−1)th translational floor reaction force horizontal component error Ferr(n−1) at time t or a value of the floor reaction force correction amount determined on the basis of at least the value to an instantaneous value of a translational floor reaction force horizontal component produced on the first dynamic model at the time t by the motion after the n-th correction satisfies the permissible range at the time t; the ZMP error change amount ΔZMPerr is composed of a time series, in the predetermined period, of either a difference between a value of the n-th ZMP error ZMPerr(n) at each time and a value of an (n−1)th ZMP error ZMPerr(n−1) at the time or a difference between a value of the n-th ZMP error ZMPerr(n) at each time and a value of the ZMP correction amount determined on the basis of at least a value of the (n−1)th ZMP error ZMPerr(n−1) at the time; the translational floor reaction force horizontal component error change amount ΔFerr is composed of a time series, in the predetermined period, of either a difference between a value of the n-th translational floor reaction force horizontal component error Ferr(n) at each time and a value of an (n−1)th translational floor reaction force horizontal component error Ferr(n−1) at the time or a difference between a value of the n-th translational floor reaction force horizontal component error Ferr(n) at each time and a value of the floor reaction force correction amount determined on the basis of at least the value of the (n−1)th translational floor reaction force horizontal component error Ferr(n−1) at the time; and the convergence discrimination processing of the desired motion determining means is the processing for determining that the ZMP component error change amount ΔZMPerr has converged to zero when a predetermined third characteristic amount in a pattern of the time series constituting the ZMP error change amount ΔZMPerr falls within a predetermined permissible change amount range for the third characteristic amount and also for determining that the translational floor reaction force horizontal component error change amount ΔFerr has converged to zero when a predetermined fourth characteristic amount in a pattern of the time series constituting the translational floor reaction force horizontal component error change amount ΔFerr falls within a predetermined permissible change amount range for the fourth characteristic amount (an eighteenth invention).

Incidentally, in the eighteenth invention, the types of the third characteristic amount and the fourth characteristic amount mentioned above include those exemplified in relation to the aforesaid thirteenth invention. In this case, the types of the third and the fourth characteristic amounts do not have to be the same, but they may be the same.

According to the eighteenth invention, in the convergence discrimination processing, it is determined that the ZMP error change amount ΔZMPerr has converged to zero when a predetermined third characteristic amount in a pattern of a time series constituting the ΔZMPerr falls within a permissible change amount range associated therewith and that the translational floor reaction force horizontal component error change amount ΔFerr has converged to zero when a predetermined fourth characteristic amount in a pattern of a time series constituting the ΔFerr falls within a permissible change amount range associated therewith, thus making it possible to properly determine whether the time series of the aforesaid determined instantaneous value of the motion after the n-th correction has been determined by taking into account highly reliable ZMP error ZMPerr and translational floor reaction force horizontal component error Ferr or highly reliable ZMP correction amount and floor reaction force correction amount, as in the case of the aforesaid seventeenth invention. This eventually makes it possible to improve the reliability of the dynamic accuracy of a desired gait including a desired motion that has been lastly determined.

In the first to the eighth inventions described above, repeating the aforesaid corrected motion determination processing a certain number of times (a plurality of times) usually causes the error change amount to converge to zero. Hence, in the aforesaid convergence discrimination processing, it may be determined that the error change amount has converged to zero (if there are two types of error change amounts, then both of them have converged) when, for example, the number of repetitions (the number of executions) of the corrected motion determination processing has reached a predetermined number of times. Alternatively, the convergence of the error change amount to zero may be determined on the basis of a difference between a motion after an n-th correction and a motion after an (n−1)th correction.

Furthermore, in the first to the sixteenth inventions explained above, a desired gait may include not only a desired motion but a desired floor reaction force also.

In this case, in the first invention and the second invention or the fifth invention, the thirteenth invention, and the fourteenth invention that use them as elements thereof, the result obtained by adding either an (n−1)th floor reaction force component error or a floor reaction force correction amount based thereon to a floor reaction force component produced on the first dynamic model by a motion after an n-th correction that has been lastly determined as a desired motion may be defined as a desired value of the floor reaction force component. Alternatively, a floor reaction force component produced on the second dynamic model by a motion after an n-th correction that has been lastly determined as a desired motion may be defined as a desired value of the floor reaction force component. If the provisional motion is determined as a desired motion, then a floor reaction force component produced on the first dynamic model by the provisional motion may be defined as a desired value.

In the aforesaid third invention and the fourth invention, or the sixth invention, the ninth invention, the tenth invention, the fifteenth invention, and the sixteenth invention that use them as elements thereof, a result obtained by adding either an (n−1)th floor reaction force component error Aerr(n−1) or a first floor reaction force correction amount based thereon to a first floor reaction force component produced on the first dynamic model by a motion after an n-th correction that has been lastly determined as a desired motion may be defined as a desired value of the first floor reaction force component, and a result obtained by adding either an (n−1)th floor reaction force component error Berr(n−1) or a second floor reaction force correction amount based thereon to a second floor reaction force component produced on the first dynamic model by a motion after an n-th correction may be defined as a desired value of the second floor reaction force component. Alternatively, a first floor reaction force component and a second floor reaction force component produced on the second dynamic model by a motion after an n-th correction that has been lastly determined as desired motions may be defined as respective desired values thereof. If the provisional motion is determined as a desired motion, then a first floor reaction force component and a second floor reaction force component produced on the first dynamic model by the provisional motion may be defined as respective desired values.

In the seventh invention and the eighth invention or the eleventh invention, the twelfth invention, the seventeenth invention, and the eighteenth invention that use them as elements thereof, a result obtained by adding either an (n−1) th translational floor reaction force horizontal component error Ferr(n−1) or a floor reaction force correction amount based thereon to a translational floor reaction force horizontal component produced on the first dynamic model by a motion after an n-th correction that has been lastly determined as a desired motion may be defined as a desired value of a translational floor reaction force horizontal component. A desired ZMP may retain an original value thereof. Alternatively, a translational floor reaction force horizontal component produced on the second dynamic model by a motion after an n-th correction that has been lastly determined as a desired motion may be defined as a desired value thereof. If the provisional motion is determined as a desired motion, then a translational floor reaction force horizontal component produced on the first dynamic model by the provisional motion may be defined as a desired value.

Further, in the first to the sixteenth inventions, a desired gait generated thereby may be further corrected using a full model (a third dynamic model), as described in the aforesaid patent documents 2 and 3. In this case, the desired gaits generated in the first to the twelfth inventions have high dynamic accuracy, so that the danger of divergence of a gait in a full model can be minimized. This makes it possible to prevent a correction amount of a desired ZMP trajectory or a floor reaction force moment about a desired ZMP from becoming excessive, thus permitting high stability allowance of a robot to be maintained.

BEST MODE FOR CARRYING OUT THE INVENTION

The following will explain an embodiment of the present invention with reference to the accompanying drawings. In the embodiments in the present description bipedal mobile robots will be used as mobile robots.

FIG. 1 is a schematic diagram showing the outline of the entire construction of a bipedal mobile robot to which an embodiment of the present invention is applied.

As shown in the figure, a bipedal mobile robot (hereinafter referred to as "the robot") 1 is equipped with a pair of right and left leg bodies (leg links) 2, 2 extended downward from a body (a base body of the robot 1) 3. The two leg bodies 2, 2 share the same construction, each having six joints. The six joints are comprised of, in the following order from the body 3 side, joints 10R, 10L for turning (rotating) a hip (waist) (for rotation in a yaw direction relative to the body 3), joints 12R, 12L for rotating the hip (waist) in a roll direction (about an X axis), joints 14R, 14L for rotating the hip (waist) in a pitch direction (about a Y axis), joints 16R, 16L for rotating knees in the pitch direction, joints 18R, 18L for rotating ankles in the pitch direction, and joints 20R, 20L for rotating the ankles in the roll direction. In the present description, the symbols R and L mean that they correspond to the right side and the left side, respectively, of the robot 1.

A foot (foot portion) 22R(L) constituting a distal portion of each leg body 2 is attached to the bottoms of the two joints 18R(L) and 20R(L) of the ankle of each leg body 2. The aforesaid body 3 is installed at the uppermost top of the two leg bodies 2, 2 through the intermediary of the three joints 10R(L), 12R(L) and 14R(L) of the hip of each leg body 2. A control unit 60 and the like, which will be discussed in detail hereinafter, is housed in the body 3. For convenience of illustration, the control unit 60 is shown outside the body 3 in FIG. 1.

In each leg body 2 having the aforesaid construction, a hip joint (or a waist joint) is formed of the joints 10R(L), 12R(L) and 14R(L), the knee joint is formed of the joint 16R(L), and the ankle joint is formed of the joints 18R(L) and 20R(L). The hip joint and the knee joint are connected by a thigh link 24R(L), and the knee joint and the ankle joint are connected by a crus link 26R(L).

A pair of right and left arm bodies 5, 5 is attached to both sides of an upper portion of the body 3, and a head 4 is disposed at a top end of the body 3. Each arm 5 is provided with a shoulder joint composed of three joints 30R(L), 32R(L), and 34R(L), an elbow joint composed of a joint 36 R(L), a wrist joint composed of a joint 38R(L), and a hand 40R(L) connected to the wrist joint. Rigid links connect shoulder joint and the elbow joint, and the elbow joint and the wrist joint, respectively.

The construction of the robot 1 described above imparts six degrees of freedom to the foot 22R(L) of each leg body 2 relative to the body 3. During a travel, such as walking, of the robot 1, desired motions of the two feet 22R and 22L can be accomplished by driving 6*2=12 joints of the two leg bodies 2, 2 together ("*" in this description denotes multiplication as scalar calculation, while it denotes an outer product in vector calculation) at appropriate angles. This arrangement enables the robot 1 to arbitrarily move in a three-dimensional space. Furthermore, each arm body 5 is capable of performing a motion, such as arm swinging, by rotating the shoulder joint, the elbow joint, and the wrist joint thereof.

As shown in FIG. 1, a publicly known six-axis force sensor 50 is provided under the ankle joints 18R(L), 20R(L) and between the ankle joints and the foot 22R(L) of each leg body 2. The six-axis force sensor 50 detects primarily whether the foot 22R(L) of each leg body 2 is in contact with the ground and also a floor reaction force (ground contact load) acting on each leg body 2, and it outputs detection signals of three-direction components Fx, Fy and Fz of a translational force of the floor reaction force and three-direction components Mx, My and Mz of a moment to the control unit 60. Furthermore, the body 3 is equipped with a posture sensor 54 for detecting an inclination angle of the body 3 relative to a Z-axis (vertical direction (gravitational direction)) and an angular velocity thereof, detection signals thereof being output from the posture sensor 54 to the control unit 60. The posture sensor 54 is provided with an accelerometer and a gyro sensor, which are not shown, and the detection signals of these sensors are used to detect posture angles (inclination angles) of the body 3 and angular velocities thereof. Although detailed structures are not shown, each joint of the robot 1 is provided with an electric motor 64 (refer to FIG. 3) for driving the joint and an encoder (rotary encoder) 65 (refer to FIG. 3) for detecting a rotational amount of the electric motor 64 (a rotational angle of each joint). Detection signals of the encoder 65 are output from the encoder 65 to the control unit 60.

Furthermore, although not shown in FIG. 1, a joystick (operating device) 73 (refer to FIG. 3) for manipulating the robot 1 is provided outside the robot 1. The joystick 73 is constructed in such a manner that a request or a restrictive condition on a gait of the robot 1, such as turning the robot 1 that is traveling straight, specifying the moving direction of the robot 1, or specifying the motion mode of the robot 1, e.g., walking or running, or the frictional condition of a floor surface (road surface condition), is input to the control unit 60 as necessary by operating the joystick 73. Communication between the joystick 73 and the control unit 60 is effected by a wire or wireless means.

FIG. 2 schematically shows the basic construction of the distal portion (including each foot 22R(L)) of each leg body 2 in the present embodiment. As shown in the figure, a spring mechanism 70 is installed between each foot 22R(L) and the aforesaid six-axis force sensor 50, and a foot sole elastic member 71 made of rubber or the like is bonded to a foot sole (the bottom surface of each foot 22R,L). These spring mechanism 70 and the foot sole elastic member 71 constitute a compliance mechanism 72. Although no detailed illustration is given, the spring mechanism 70 is constructed of a square guide member (not shown), which is installed on the upper surface of the foot 22R(L), and a piston-shaped member (not shown) that is installed adjacently to the ankle joint 18R(L) (the ankle joint 20R(L) being omitted in FIG. 2) and the six-axis force sensor 50 and housed in the guide member through the intermediary of an elastic member (rubber or spring) so that it is free to move extremely slightly.

The foot 22R(L) indicated by a solid line in FIG. 2 is in a state wherein it is being subjected to no floor reaction force. When each leg body 2 is subjected to a floor reaction force, the spring mechanism 70 and the foot sole elastic member 71 of the compliance mechanism 72 flex, causing the foot 22R (L) to shift to the position/posture illustrated by a dashed line in the figure. The structure of the compliance mechanism 72 is important not only to ease a landing impact but also to enhance controllability. The details thereof have been explained in, for example, Japanese Unexamined Patent Publication Application No. 5-305584 previously proposed by the present applicant, so that no further explanation will be given in the present description.

FIG. 3 is a block diagram showing a construction of the control unit 60. The control unit 60 is comprised of a microcomputer, and it includes a first calculator 90 and a second calculator 92 formed of CPUs, an A/D converter 80, a counter 86, a D/A converter 96, a RAM 84, a ROM 94, and a bus line 82 for transferring data among them. In the control unit 60, output signals of the six-axis force sensor 50 of each leg body 2, the posture sensor 54 (an accelerometer and a rate gyro sensor), the joystick 73, etc. are converted into digital values by the A/D converter 80 and sent to the RAM 84 via the bus line 82. Outputs of the encoder 65 (rotary encoder) of each joint of the robot 1 are input to the RAM 84 via the counter 86.

As will be discussed hereinafter, the first calculator 90 generates desired gaits, calculates a joint angle displacement command (a command value of a displacement angle of each joint or a rotational angle of each electric motor 64), and sends the calculation result to the RAM 84. The second calculator 92 reads the joint angle displacement command and an actual measurement value of a joint angle detected on the basis of an output signal of the encoder 65 from the RAM 84 to calculate a manipulated variable required for driving each joint and outputs the manipulated variable to the electric motor 64 for driving each joint through the intermediary of the D/A converter 96 and a servo amplifier 64a.

FIG. 4 is a block diagram showing major functional construction of the control unit 60 of the robot 1 in an embodiment in the present description. A portion except the "actual robot" in FIG. 4 is constituted of processing functions implemented by the control unit 60 (primarily the functions of the first calculator 90 and the second calculator 92). The processing function is implemented by programs or the like installed in the control unit 60. In the following explanation, the aforesaid symbols R and L will be omitted as long as it is not particularly necessary to discriminate right and left of each part of the robot 1 (the leg bodies 2, the arm bodies 5, etc.).

An explanation will now be given. The control unit 60 is equipped with a gait generating device 100 that generates and outputs desired gaits freely in real time, as it will be discussed later. The gait generating device 100 implements an embodiment of the present invention by its functions. A desired gait output by the gait generating device 100 is constituted of a corrected desired body posture trajectory (the trajectory of desired postures of the body 3), a corrected desired body position trajectory (the trajectory of desired positions of the body 3), a desired foot position/posture trajectory (the trajectories of desired positions and desired postures of each foot 22), a desired arm posture trajectory (the trajectory of desired postures of each arm body), a desired ZMP (desired total floor reaction force central point) trajectory, the trajectory of corrected desired floor reaction force moments about a desired ZMP, and a desired total floor reaction force trajectory. If a part (a head or the like) that can be moved relative to the body 3 is provided in addition to the leg bodies 2 and the arm bodies 5, then a desired position/posture trajectory of the movable part is added to a desired gait.

Here, the definitions and the like of basic terms related to gaits in the present description will be explained. The term "trajectory" in a gait means a temporal change pattern (time series pattern) and it may be referred to as "pattern" in place of "trajectory." Furthermore, a "posture" means a spatial orientation. For example, a body posture is represented by an inclination angle (posture angle) of the body 3 in the roll direction (about the X-axis) relative to the Z-axis (vertical axis) and an inclination angle (posture angle) of the body 3 in the pitch direction (about the Y-axis), and a foot posture is represented by means of a two-axis spatial azimuth fixedly set on each foot 22. In the present description, a body posture may be referred to as a body posture angle. A desired arm posture related to the arm bodies 5 is represented by means of a relative posture with respect to the body 3 in the embodiments of the present description.

The position of the body means the position of a predetermined representative point of the body 3 (a certain fixed point on a local coordinate system arbitrarily and fixedly set relative to the body 3). Similarly, the position of a foot means the position of a predetermined representative point of each foot 22 (a fixed point on a local coordinate system arbitrarily and fixedly set relative to each foot 22). For example, the representative point of each foot 22 is set on the bottom surface of each foot 22 (more specifically, for example, a point at which a perpendicular line from the center of the ankle joint of each leg body 2 to the bottom surface of each foot 22 intersects with the bottom surface).

The aforesaid corrected desired body posture and corrected desired body position related to the body 3 are obtained by correcting a desired body posture (provisional desired body posture) and a desired body position (provisional desired body position) that provide certain references. In the embodiments in the present description, the desired body position/posture determined by a simplified model gait generator, which will be discussed later (the desired body position/posture determined in S032 of FIG. 10, which will be discussed later) correspond to the desired body position/posture that provide the references.

In the explanation hereinafter, the term "desired" will be frequently omitted if there is no danger of misunderstanding.

In a gait, the constituent elements except the constituent elements related to a floor reaction force, namely, the constituent elements related to the position/posture of each part of the robot 1, such as foot position/posture and body position/posture, are referred generically to "motions." Further, a floor reaction force acting on each foot 22 (a floor reaction force composed of a translational force and a moment) is referred to as "the floor reaction force of each foot," and the resultant force of "the floor reaction forces of individual feet" related to all (two) feet 22R and 22L of the robot 1 is referred to as "the total floor reaction force." However, in the following explanation, the floor reaction force of each foot will be hardly referred to, so that "the floor reaction force" will be handled as synonymous with "the total floor reaction force" unless otherwise specified.

A desired floor reaction force is generally represented in terms of a point of action and a translational force and moment acting on the point. The point of action can be set anywhere, so that innumerable expressions are conceivable for the same desired floor reaction force; if, however, a desired floor reaction force is represented using, in particular, a desired floor reaction force central point (the desired position of the central point of a total floor reaction force) as the point of action, then the moment component of the desired floor reaction force except for a vertical component (the moment component about a vertical axis (Z-axis)) will be zero. In other words, a horizontal component (the moment about horizontal axes (X-axis and Y-axis)) of the moment of the desired floor reaction force about the desired floor reaction force central point will be zero.

In a gait that satisfies a dynamic balance condition, the ZMP calculated from a desired motion trajectory of the robot 1 (the point at which a moment excluding its vertical component becomes zero, the moment acting about the point due to the resultant force of the inertial force calculated from the desired motion trajectory and the gravity) coincides with the desired floor reaction force central point. This is, therefore, equivalent to providing a desired ZMP trajectory in place of a desired floor reaction force central point trajectory.

Here, when walking of the robot 1 is performed, the vertical component of a translational floor reaction force is subordinately determined as the vertical position of the body 3 (body height) of the robot 1 is determined by the technique for determining a body height previously proposed in, for example, Japanese Unexamined Patent Application Publication No. 10-86080 by the present applicant. Furthermore, the horizontal component of the translational floor reaction force is also subordinately determined as the body horizontal position trajectory (or the positional trajectory of the total center-of-gravity) of the robot 1 is determined such that the horizontal component of the moment generated about a desired ZMP by the resultant force of an inertial force attributable to a motion of a desired gait and gravity becomes zero. For this reason, when performing the walking of the robot 1, only the desired ZMP may be set as the physical amount to be explicitly set in relation to the floor reaction force of the desired gait.

Meanwhile, if a travel of the robot 1, e.g., running of the robot 1, is performed with a gait that includes a period during which the floor reaction force becomes zero or substantially zero, then a translational floor reaction force vertical component is also important in controlling the operation of the robot 1. Hence, it is preferred to explicitly set the desired trajectory of the translational floor reaction force vertical component and then to determine the trajectory of a desired body vertical position or the like of the robot 1. Also, when the walking of the robot 1 is performed, if the robot 1 is to travel on a floor surface with a low friction coefficient (on a low-μ road), it is preferred to explicitly set the desired trajectory of the translational floor reaction force vertical component to prevent slippage or the like of the robot 1, because the translational floor reaction force vertical component (more precisely, the component of the translational floor reaction force that is perpendicular to the floor surface) influences a frictional force. Furthermore, according to the embodiment of the present invention, in a desired gait finally output by the gait generating device 100, a corrected desired floor reaction force moment (a moment whose horizontal component is not necessarily zero) is generated about a desired ZMP.

Thus, in the embodiments in the present description, the constituent elements related to the floor reaction forces of desired gaits output from the gait generating device 100 include a corrected desired floor reaction force moment about a desired ZMP and a desired translational floor reaction force vertical component in addition to a desired ZMP trajectory.

And, in the present description, a desired gait output by the gait generating device 100 is used to mean "a set of a desired motion trajectory and a desired floor reaction force trajectory in the period of one step or a plurality of steps" in a broad sense, and to mean "a set of a desired motion trajectory and a desired floor reaction force trajectory that includes a desired ZMP, a corrected desired floor reaction force moment and a desired translational floor reaction force vertical component in the period of one step" in a narrow sense.

However, according to the embodiments in the present description, in a desired gait (provisional desired gait) created in the process before a final desired gait (a desired gait output from the gait generating device 100) is determined, a gait obtained by removing a corrected desired floor reaction force moment from the desired gait in the aforesaid narrow sense is used to mean a desired gait. Supplementally, according to the embodiments in the present description, a desired gait (a provisional desired gait) created in the process before a final desired gait (a desired gait output by the gait generating device 100) is closely associated with the present invention. Hence, the majority of a desired gait appearing in the following explanation will be used to mean a gait obtained by removing a corrected desired floor reaction force moment from a desired gait in the aforesaid narrow sense.

In the following explanation, "a floor reaction force vertical component" will mean "a translational floor reaction force vertical component," and the vertical component (a component about a vertical axis) of the moment in a floor reaction force will use the term "moment" to distinguish it from "a floor reaction force vertical component." Similarly, "a floor reaction force horizontal component" will mean "a translational floor reaction force horizontal component." A translational floor reaction force may be referred to as a floor reaction force translational force component.

"One step" of a desired gait will be used to mean a period from the instant one leg body 2 of the robot 1 lands to the instant the other leg body 2 lands.

A two-leg supporting period in a gait refers to a period during which the robot 1 supports its own weight by the two leg bodies 2, 2, a one-leg supporting period refers to a period during which the robot 1 supports its own weight only by one leg body 2, and a floating period refers to a period during which both leg bodies 2, 2 are apart from a floor (floating in the air). In the one-leg supporting period, the leg body 2 not supporting the self-weight of the robot 1 is referred to as a free leg. A running gait of the robot 1, in which the one-leg supporting period and the floating period are alternately repeated, does not have the two-leg supporting period. In this case, during the floating period, both leg bodies 2, 2 do not support the self-weight of the robot 1; however, for the sake of convenience, the leg body 2 that was a free leg and the leg body 2 that was a supporting leg during a one-leg supporting period immediately before the floating period will be referred to as a free leg and a supporting leg, respectively, even in the floating period.

The trajectory of a desired gait is described using a global coordinate system (a coordinate system fixed to a floor). As a global coordinate system, a supporting leg coordinate system defined, for example, on the basis of landing position/posture of the supporting leg foot 22 is used. This supporting leg coordinate system is, for example, a coordinate system in which the point at which a perpendicular line extended to a floor surface from the center of the ankle joint to which the foot 22 is connected intersects with the floor, while substantially the entire bottom surface of the supporting leg foot 22 is in contact with the floor, is defined as the origin, and when the supporting leg foot 22 is projected onto a horizontal plane that passes the origin, the longitudinal direction of the foot 22 is defined as the X-axis direction and the lateral direction thereof is defined as the Y-axis direction (the Z-axis direction being the vertical direction). In the following explanation, the X, Y, Z coordinates will mean the coordinates in this supporting leg coordinate system unless otherwise specified.

FIG. 5 is a block diagram showing the details of the gait generating device 100. Referring to this FIG. 5, more specific overview of the processing of the gait generating device 100 will be explained below.

As illustrated, the gait generating device 100 is equipped with a gait parameter determiner 100a. The gait parameter determiner 100a determines the values of gait parameters or a time series table that defines a desired gait.

According to the embodiment in the present description, a gait parameter determined by the gait parameter determiner 100a includes the parameters that define a desired foot position/posture trajectory, a desired arm posture trajectory, a desired ZMP trajectory, and a desired floor reaction force vertical component trajectory, respectively, of a desired gait.

When the gait generating device 100 generates a desired gait, estimated landing position/posture and estimated landing time of the free leg foot 22, or basic required values (required parameters) for generating a gait, such as the length of a step and moving velocity, are supplied to the gait generating device 100 from the aforesaid joystick 73 or an action planner (a device for preparing action plans of the robot 1), which is not shown. Alternatively, the gait generating device 100 reads the required parameters from a storage medium in which the aforesaid required parameters have been stored beforehand and retained. Then, the gait parameter determiner 100a of the gait generating device 100 determines a gait parameter on the basis of the required parameters.

In the embodiment in the present description, the gait parameter determined by the gait parameter determiner 100a also includes parameters that define a reference body posture trajectory, a ZMP permissible range, and a floor reaction force horizontal component permissible range, respectively.

Although the aforesaid reference body posture trajectory is not the one finally output from the gait generating device 100, it is referred to when determining a desired gait. The reference body posture trajectory is supplied in relation to the body posture of the robot 1 from the joystick 73 or the action planner, or it is a body posture trajectory generated directly on the basis of a requirement (a requirement for retaining a body posture at a vertical posture, or the like) that has been set in advance. A desired body posture (hereinafter, "body posture" with no "reference" attached thereto will indicate a desired body posture) is generated such that it follows or coincides with a reference body posture for a long time.

To add a supplemental explanation regarding the aforesaid ZMP permissible range, in the embodiments in the present description, a desired gait is corrected so as to generate a corrected desired floor reaction force moment (this generally being not zero) about a desired ZMP. Therefore, the desired ZMP will be a point having a different definition from an original definition (the definition in that it is a point at which a floor reaction force moment horizontal component is zero), and a ZMP that satisfies the original definition (hereinafter referred to as a true ZMP) moves to a position shifted from the desired ZMP by a value obtained by dividing the corrected desired floor reaction force moment by a desired floor reaction force vertical component.

The true ZMP of a corrected gait (the desired gait finally output from the gait generating device 100) must fall within at least a range wherein a ZMP can exist (a so-called supporting polygon: a range wherein a floor reaction force point of action (ZMP) can exist when it is assumed that no adhesive force acts between a floor and the bottom surface of the foot 22). Further, in order to secure a sufficient stability margin of the robot 1, the true ZMP of a corrected gait preferably falls within a range near the center in the range wherein the ZMP can exist. Hence, in the embodiments in the present description, a permissible range wherein a true ZMP of a corrected gait can exist is set. This range is called a ZMP permissible range. The ZMP permissible range is set to coincide with a range wherein a ZMP can exist or to be included in a range wherein a ZMP can exist.

As described above, the value obtained by dividing a corrected desired floor reaction force moment about a desired ZMP by a desired floor reaction force vertical component indicates the amount of positional deviation of a true ZMP from the desired ZMP; therefore, the amount of positional deviation of the true ZMP from the desired ZMP (a ZMP-converted value of a corrected desired floor reaction force moment) may be set instead of setting the corrected desired floor reaction force moment about the desired ZMP. Moreover, a ZMP permissible range can be converted into a permissible range of a corrected desired floor reaction force moment by multiplying the position of its boundary by a desired floor reaction force vertical component, and the permissible range of the corrected desired floor reaction force moment may be set in place of a ZMP permissible range.

The aforesaid floor reaction force horizontal component permissible range is the permissible range of a floor reaction force horizontal component that makes it possible to generate a frictional force having a magnitude that prevents the foot 22 from slipping on the surface of foot 22 of the robot 1 that is in contact with a floor. According to the embodiment in the present description, at least a motion (a desired motion) of a desired gait finally output from the gait generating device 100 is generated such that a floor reaction force horizontal component balancing out the horizontal component of an inertial force of the robot 1 that is produced thereby falls within a floor reaction force horizontal component permissible range (such that a floor reaction force horizontal component permissible range is satisfied).

The floor reaction force horizontal component permissible range set in the embodiment in the present description comes in one for normal gaits set by the processing of S022 to be discussed hereinafter, one for basic gaits set by the processing of S026, and one for gait corrections (for full-model corrections) set in S030. However, these floor reaction force horizontal component permissible ranges do not necessarily have to differ from each other; they may be the same. Meanwhile, the ZMP permissible range is only the one for gait corrections (for full-model corrections) set by the processing of S030.

Supplementally, a gait parameter for generating a desired gait includes parameters in addition to the aforesaid parameters. They are determined in the gait parameter determiner 100a such that they satisfy predetermined boundary conditions.

The gait parameter determined by the gait parameter determiner 100a is input to a desired instantaneous value generator 100b. Based on the input gait parameter, the desired instantaneous value generator 100b sequentially calculates (generates) the instantaneous values (values for each predetermined control processing cycle of the aforesaid control unit 60) of some elements (except for desired body position/posture) of a desired gait, such as a reference body posture, desired foot position/posture, a desired ZMP, a desired floor reaction force vertical component, a ZMP permissible range, and a floor reaction force horizontal component permissible range. The desired instantaneous value generator 100b also outputs a translational floor reaction force (a translational force component of a floor reaction force) error trajectory (to be specific, the time series of instantaneous values of errors of a translational floor reaction force horizontal component) and a floor reaction force moment error trajectory (to be specific, a time series of instantaneous values of errors of the horizontal component of a floor reaction force moment about a desired ZMP). These error trajectories correspond to the time series patterns of errors of floor reaction forces produced on a simplified model (a first dynamic model), which will be discussed later, relative to floor reaction forces produced on a semi-full model (a second dynamic model), which will be discussed later, by a motion of a gait.

The desired instantaneous values calculated by the desired instantaneous value generator 100b are input to a simplified model gait generator 100c. Based on the input desired instantaneous values, the simplified model gait generator 100c calculates the instantaneous values of desired body position/posture (provisional desired body position/posture for a full-model corrector, which will be discussed hereinafter) by using a simplified model (the first dynamic model) and a semi-full model (a second dynamic model), which will be discussed hereinafter, as the dynamic models approximately expressing a relationship between a motion of the robot 1 and a floor reaction force. The simplified model used here is the same as that used by the desired instantaneous value generator 100b. The simplified model gait generator 100c calculates the instantaneous values of the desired body position/posture such that a predetermined dynamic condition related to a floor reaction force moment about a desired ZMP and a translational floor reaction force is satisfied. The dynamic condition is a condition that a floor reaction force moment horizontal component obtained by correcting a floor reaction force moment horizontal component about a desired ZMP that is generated on the simplified model by a motion of a gait on the basis of a floor reaction force moment error agrees or substantially agrees with a desired floor reaction force moment horizontal component(=0), which is an original desired value of the floor reaction force moment horizontal component about the desired ZMP, and a translational floor reaction force horizontal component obtained by correcting a translational floor reaction force horizontal component generated on the simplified model by the motion of the gait on the basis of the translational floor reaction force error satisfies a floor reaction force horizontal component permissible range. Supplementally, in the embodiment of the present description, a desired floor reaction force vertical component trajectory is explicitly set, so that the instantaneous values of desired body position/posture are determined such that a dynamic condition in that the translational force vertical component of the resultant force of an inertial force produced by a desired motion and gravity (in other words, the resultant force of an inertial force and gravity involved in a translational motion in the vertical direction of the total center-of-gravity of the robot 1) balances out a desired floor reaction force vertical component is also satisfied.

The calculation processing of the simplified model gait generator 100c sequentially determines the instantaneous values of a desired gait (provisional desired gait) including desired body position/posture. Hereinafter, a desired gait having the desired body position/posture determined in the simplified model gait generator 100c as constituent elements will be referred to as a simplified model gait.

The simplified model gait including the desired body position/posture determined by the simplified model gait generator 100c is input to a full-model corrector 100d. The full-model corrector 100d calculates a corrected desired body position/posture obtained by correcting the desired body position/posture of the simplified model gait by using a full model as a dynamic model having high dynamic accuracy, and also calculates a corrected desired floor reaction force moment, which is a desired value of a floor reaction force moment horizontal component about a desired ZMP.

More generally, the full-model corrector 100d carries out processing of E1 or E2 to satisfy the following conditions D1 to D3. Specifically, the full-model corrector 100d:

E1) corrects the body position/posture of a simplified model gait, or

E2) corrects the body position/posture of the simplified model gait and also outputs a corrected desired floor reaction force moment about a desired ZMP (corrects a desired floor reaction force) in order to satisfy the following conditions:

D1) A dynamic balance condition is satisfied with accuracy that is higher than a gait obtained by correcting a gait generated by using a simplified model (a simplified model gait) by using a displacement-dimension correction model (hereinafter referred to as a displacement-dimension corrected gait);

D2) A true ZMP (a ZMP satisfying the original definition that has been corrected by generating a corrected desired floor reaction force moment about a desired ZMP) falls within a ZMP permissible range (a permissible range that allows a sufficient stability margin to be maintained); and D3) A floor reaction force horizontal component falls within a floor reaction force horizontal component permissible range.

In the embodiment in the present description, the processing of E2 is carried out to satisfy the conditions D1 to D3. The processing by the full-model corrector 100d in the embodiment in the present description is the same as that explained in detail in, for example, PCT international publication WO/03/057427/A1 previously proposed by the present applicant (specifically, the processing of S038 shown in FIG. 13 of the publication). Hence, detailed explanation of the processing by the full-model corrector 100d will be omitted in the present description.

Further, in the embodiment in the present description, a correction is made by the full-model corrector 100d. Alternatively, however, such a correction may be omitted, and the instantaneous value of a simplified model gait may be directly output from the gait generating device 100.

Supplementally, in the embodiment in the present description, the gait parameter determiner 100a, the desired instantaneous value generator 100b, and the simplified model gait generator 100c carry out the processing related to the core of the present invention.

Referring back to FIG. 4, the instantaneous values of a desired gait, including the instantaneous values of corrected desired body position/posture, a corrected desired floor reaction force moment about a desired ZMP, and desired foot position/posture determined as described above, are supplied to a composite-compliance control unit 101 (the portion enclosed by the dashed line in FIG. 4). The composite-compliance control unit 101 controls a joint actuator (an electric motor 64) so as to follow a desired gait, while maintaining the balance of the robot 1. More specific processing of the composite-compliance control unit 101 will be discussed later.

The embodiment of the present invention will now be explained further specifically. According to the present embodiment, for each control processing cycle of the control unit 60, the gait generating device 100 determines instantaneous values of a desired gait by using a simplified model as the first dynamic model and a semi-full model as a second dynamic model, which will be explained in detail below.

A body motion mode and dynamic models used for generating gaits in the present embodiment will now be explained.

In a gait that includes a floating period, such as a running gait, or walking on a low-friction floor surface, there are cases where a dynamic balance condition cannot be satisfied while the floor reaction force horizontal component of a desired gait being within a permissible range (or within friction limits) simply by adjusting a body horizontal acceleration. Hence, in the present embodiment, two motion modes (a body translation mode and a body rotational mode) of the body 3 explained below are compositively generated so as to satisfy the dynamic balance condition while the floor reaction force horizontal component of a desired gait being within a permissible range (or within friction limits).

As shown in FIG. 6(a), if only a body horizontal acceleration is perturbed from a certain motion state, then the total center-of-gravity horizontal acceleration and the angular momentum about the total center-of-gravity are perturbed. More specifically, in the perturbation of the body horizontal acceleration, the floor reaction force moment about a desired ZMP (excluding a component about a vertical axis) and a floor reaction force horizontal component (to be precise, a translational floor reaction force horizontal component) are perturbed without perturbing a floor reaction force vertical component (that dynamically balances out the resultant force of the inertial force generated thereby and gravity). This motion mode is referred to as the body translation mode.

In other words, a motion in which the horizontal component of a floor reaction force moment about a desired ZMP and a floor reaction force horizontal component (translational floor reaction force horizontal component) are changed without changing a floor reaction force vertical component is referred to as the body translation mode.

A change in the floor reaction force moment component per unit acceleration at that time is denoted by $\Delta Mp$ and a change in the floor reaction force horizontal component per unit acceleration is denoted by $\Delta Fp$. If the body 3 in the state shown in FIG. 6(a) is horizontally accelerated forward, then $\Delta Mp$ and $\Delta Fp$ act in the directions of the arrows shown in FIG. 6(a).

For the ease of sensory perception, a floor reaction force balancing out the resultant force of an inertial force generated by a motion and gravity has been used for the expression; however, an expression using the resultant force of the inertial force and gravity is theoretically accurate. Incidentally, the aforesaid resultant force and floor reaction force have the same magnitude but are in the opposite directions.

Meanwhile, if a body posture angular acceleration is perturbed about a certain point Pr from a certain motion state as shown in FIG. 6(b), then the angular momentum about the total center-of-gravity is perturbed without the total center-of-gravity being perturbed. This means that the body posture angular acceleration perturbation about the point Pr perturbs a horizontal component of a floor reaction force moment about a desired ZMP without causing a floor reaction force vertical component and a floor reaction force horizontal component (strictly speaking, a translational floor reaction force vertical component and a translational floor reaction force horizontal component) to be perturbed. This motion mode is referred to as the body rotational mode.

In other words, the motion for changing a horizontal component of a floor reaction force moment about a desired ZMP without causing a change in a floor reaction force vertical component and a floor reaction force horizontal component is referred to as the body rotational mode.

A change in the floor reaction force moment component per unit angular acceleration at that time is denoted by $\Delta Mr$ and a change in the floor reaction force horizontal component per unit angular acceleration is denoted by $\Delta Fr$. $\Delta Fr$ is zero. If an angular acceleration is applied such that the body inclines forward in the state shown in FIG. 6(b), then $\Delta Mr$ acts in the direction of an arrow shown in FIG. 6(b).

The motions of the body 3 include a body vertical movement mode in addition to the body translation mode and the body rotational mode. This is a motion for moving the body 3 in the vertical direction.

In the present embodiment, the simplified model gait generator 100c uses a simplified model and the processing of the gait parameter determiner 100a and the desired instantaneous value generator 100b uses a simplified model and a semi-full model. The following will explain these dynamic models.

FIG. 7 shows an example of the structure of the simplified model. As illustrated, the simplified model is a model composed of a total of three mass points, namely, two mass points (foot mass points) 2m, 2m corresponding to the individual leg bodies 2 of the robot 1 and a mass point corresponding to the body 3 (body mass point) 24m, and a flywheel FH that has inertia but no mass. This simplified model is a dynamic model illustrated in, for example, PCT international publication WO/03/057427/A1 previously proposed by the present applicant. Hence, detailed explanation will be omitted in the present description. The dynamics of the simplified model is represented by expressions 1a to 1c when variables are defined as follows. Here, for easy understanding of the present description, only the dynamic equations (kinetic equations) on a sagittal plane (plane including a longitudinal axis (X axis) and a vertical axis (Z axis)) will be described, and the dynamic equations on a lateral plane (plane including a lateral axis (Y axis) and the vertical axis (Z axis)) will be omitted.

Zsup: Vertical position of supporting leg mass point; Zswg: Vertical position of free leg mass point; Zb: Vertical position of body mass point; ZGtotal: Vertical position of the total center-of-gravity; Xsup: Horizontal position of supporting leg mass point; Xswg: Horizontal position of free leg mass point; Xb: Horizontal position of body mass point; XGtotal: Horizontal position of total center-of-gravity; θby: Body posture angle about Y-axis relative to vertical direction (inclination angle); mb: Mass of body mass point; msup: Mass of supporting leg mass point; mswg: Mass of free leg mass point; mtotal: Total mass of robot (=mb+msup+mswg); J: Body inertial moment (Equivalent inertial moment in the body rotational mode); Fx: Floor reaction force horizontal component (specifically, a component in the longitudinal direction (X axis) of a translational floor reaction force); Fz: Floor reaction force vertical component (specifically, a component in the vertical direction (Z axis) of a translational floor reaction force); My: Floor reaction force moment about a desired ZMP (specifically, a component about a lateral axis (Y axis) of a floor reaction force moment); and g: Gravitational acceleration. For an arbitrary variable X, d2X/dt2 means a second-order differential value of X.

$$Fz = mb*(g + d\,2Zb/dt2) + \\ msup*(g + d2Zsup/dt2) + mswg*(g + d2Zswg/dt2)$$ Expression 1a $$Fx = mb*d2Xb/dt2 + \\ msup*d\,2Xsup/dt2 + mswg*d2Xswg/dt2$$ Expression 1b $$My = -mb*(Xb - Xzmp) + \\ (g + d2Zb/dt2) + mb*(Zb - Zzmp)*d2Xb/dt2 - \\ msup*(Xsup - Xzmp)*(g + d2Zsup/dt2) + \\ msup*(Zsup - Zzmp)*d2Xsup/dt2 - \\ mswg*(Xswg - Xzmp)*(g + d2Zswg/dt2) + \\ mswg*(Zswg - Zzmp)*(d2Xswg/dt2) + \\ J*d2\theta by/dt2$$ Expression 1c The following relational expression holds for the position of the total center-of-gravity of a robot:

$ZGtotal=(mb*Zb+msup*Zsup+mswg*Zswg)/mtotal$  Expression 1d $XGtotal=(mb*Xb+msup*Xsup+mswg*Xswg)/mtotal$  Expression 1e The simplified model is constructed such that the dynamics of the leg bodies 2, 2 (the dynamics of the mass points 2m, 2m) and the dynamics of the body 3 (the dynamics of the mass point 24m and the flywheel FH) do not interfere with each other, the dynamics of the entire robot 1 being expressed by the linear combinations thereof. Further, the relationship between the motions of the body 3 and floor reaction forces is divided into the relationship between translational motions of the body 3 (the body translation mode) and floor reaction forces and the relationship between rotational motions of the body 3 (the body rotational mode) and floor reaction forces. To be specific, a floor reaction force generated by a horizontal motion of the body mass point 24m corresponds to a floor reaction force generated by a horizontal translational motion of the body 3 (the body translation mode), and a floor reaction force generated by a rotational motion of the flywheel corresponds to a floor reaction force generated by a rotational motion of the body 3 (the body rotational mode), that is, a posture changing motion of the body 3.

The mass of the arm bodies of the robot 1 is included in the body mass point 24m, and the body mass point 24m has the mass that includes the mass of the arm bodies. In the present embodiment, as it will be discussed later, the motions of the arm bodies (arm swinging motion) in a desired gait are performed such that the relative position of the total center-of-gravity of both arm bodies in relation to the body 3 remains unchanged while canceling the moment of an inertial force about the vertical axis that is generated in the robot 1 by a motion other than the arm swinging of the robot 1; therefore, the influences exerted on a floor reaction force moment and the influences exerted on a floor reaction force horizontal component by the arm swinging motions of the arm bodies (excluding a component about the vertical axis) are ignored.

FIG. 8 illustrates a structure of a semi-full model. As shown in the figure, the semi-full model is a model that has corresponding mass points in the body 3, each foot 22, and in the portion near the knee joint of each leg body 2 (the portion adjacent to the knee joint of a thigh link), respectively, the body 3 having an inertia (inertial moment) Ib about the body mass point. In the semi-full model, the relationship between the motions of the robot 1 and floor reaction forces is described as the relationship between the translational motions of the mass points and the posture changing motions of the body 3 and floor reaction forces (the translational floor reaction forces and the floor reaction force moments about desired ZMPs), as with the aforesaid simplified model, although the dynamic equations will be omitted. The semi-full model has dynamic accuracy that is higher than that of the aforesaid simplified model. To be more specific, the fact that the dynamic accuracy of the semi-full model is higher than that of the simplified model means that a floor reaction force generated on the semi-full model by an arbitrary desired motion of the robot 1 will agree more closely with an actual floor reaction force that actually acts on the robot 1 when the actual robot 1 carries out the desired motion on a supposed floor surface than a floor reaction force generated on the simplified model by the desired motion will.

The full model used in the full-model corrector 100d is a multi-mass-point model having a mass point in each link of the robot 1, as shown in, for example, FIG. 9. In this case, the each link of the robot 1 may have inertia about the mass point corresponding thereto.

Supplementally, the semi-full model may have the same structure as that of the full model.

Next, regarding the present embodiment, the processing of the gait generating device 100 will be explained in more detail.

The gait generating device 100 in the present embodiment defines, as the unit, the desired gait (the desired gait in the aforesaid narrow sense) for the period of one step from the moment one leg body 2 of the robot 1 lands to the moment the other leg body 2 lands, and generates desired gaits for the period of the one step in order. Here, the desired gait to be newly generated is referred to as "the current time's gait," the next desired gait is referred to as "the next time's gait," and the further next desired gait is referred to as "the next but one time's gait." Further, the desired gait generated immediately before "the current time's gait" is referred to as "the last time gait."

When the gait generating device 100 newly generates a current time's gait, the expected landing positions/postures and the required values (requests) of the expected landing time of the foot 22 of a free leg of the robot 1 for two steps ahead are input as required parameters for the gait to the gait generating device 100 (or the gait generating device 100 reads the required parameters from storage). Based on these required parameters, the gait generating device 100 generates a corrected desired body position/posture trajectory, a desired foot position/posture trajectory, a desired ZMP trajectory, a desired floor reaction force vertical component trajectory, a desired arm posture trajectory, a corrected desired floor reaction force moment trajectory, and the like.

The details of the gait generation processing of the gait generating device 100 will be given below with reference to FIG. 10 to FIG. 21. FIG. 10 is a flowchart (structured flowchart) showing the main routine of the gait generation processing executed by the gait generating device 100. The procedure of the main routine processing itself is the same as that in, for example, the aforesaid PCT international publication WO/03/057427A1 (hereinafter referred to as "publication document 1") by the present applicant except for subroutine processing, which is a part thereof.

First, in S010, various types of initializations are performed, including the initialization of time t to zero. This processing is performed when the gait generating device 100 is started up or the like. Subsequently, the procedure advances to S014 via S012, and the gait generating device 100 waits for a timer interrupt for each control cycle (the calculation processing cycle in the flowchart in FIG. 10). The control cycle is denoted by $\Delta t$.

Subsequently, the procedure proceeds to S016 wherein it is determined whether the gait is changing, and if the gait is changing, then the procedure proceeds to S018, or if the gait is not changing, then the procedure proceeds to S030. Here, the aforesaid "the change of a gait" means the timing at which the generation of a current time's gait is begun after the generation of the last time gait has been completed. For example, a control cycle following the control cycle in which the generation of the last time gait has been completed is the timing of a gait change.

When the procedure proceeds to S018, time t is initialized to zero, then it proceeds to S020 wherein a next time's gait supporting leg coordinate system, a next but one gait supporting leg coordinate system, a current time's gait cycle, and a next time's gait cycle are read. These supporting leg coordinate systems and gait cycles are decided by the aforesaid required parameters. More specifically, in the present embodiment, the required parameters supplied from a joystick 44 or the like to the gait generating device 100 include the required values of the expected landing positions/postures of the foot 22 of a free leg (the foot positions/postures in a state wherein, after landing, the foot 22 is rotated without a slippage such that substantially the entire sole thereof is in contact with a floor surface) for two steps ahead and expected landing time. The required value of the first step and the required value of the second step are supplied as the ones corresponding to the current time's gait and the next time's gait, respectively, to the gait generating device 100 before the generation of the current time's gait begins (at the gait change timing of the aforesaid S016). Incidentally, these required values can be changed in the middle of the generation of the current time's gait.

Then, the next time's gait supporting leg coordinate system is decided on the basis of the required values of the expected landing position/posture of the first-step foot 22 of the free leg (the foot 22 of the free leg in the current time's gait) in the aforesaid required parameters. Further, the next but one time's gait supporting leg coordinate system is decided on the basis of the required values of the expected landing positions/postures of the foot 22 of the second-step free leg. Further, the current time's gait cycle is defined as the time from the expected landing time (required value) of the foot 22 of the supporting leg of the current time's gait to the expected landing time (required value) of the foot 22 of the free leg of the first step (the current time's gait), and the next time's gait cycle is defined as the time from the expected landing time (required value) of the first-step foot 22 of the free leg to the expected landing time (required value) of the second-step foot 22 of the free leg.

The processing of S020 is the same as the processing of S020 of FIG. 13 in the aforesaid publication document 1, so that no further explanation will be given in the present description.

Subsequently, the procedure proceeds to S022 wherein the gait generating device 100 determines the gait parameter of a normal gait (normal gait parameter) as a virtual cyclic gait that follows the current time's gait. As the gait parameter determined here, there are a foot trajectory parameter that defines a desired foot position/posture trajectory in the normal gait, a reference body posture trajectory parameter that defines the body posture trajectory providing a reference, an arm posture trajectory parameter that defines a desired arm posture trajectory, a ZMP trajectory parameter that defines a desired ZMP trajectory, a floor reaction force vertical component trajectory parameter that defines a desired floor reaction force vertical component trajectory, and a parameter that defines a desired floor reaction force horizontal component permissible range.

The "normal gait" in the present description is used to mean a cyclic gait that does not develop discontinuity in the motion states (the states of foot position/posture, body position/posture, and the like) of the robot 1 at the boundaries of gaits when the gait is repeated. The "normal gait" includes, of course, a cyclic gait for making the robot 1 advance straight and also includes a cyclic gait for making the robot 1 turn. In this case, setting the turning rate to zero means advancing straight; therefore, "turning" includes advancing straight in a broad sense. For this reason, the "normal gait" may be frequently referred to as "normal turning gait" in the embodiment in the present description.

The normal turning gait is explained in detail in, for example, the aforesaid publication document 1 and PCT International Publication WO/02/040224/A1, so that detailed explanation thereof in the present description will be omitted. The outline thereof is given below.

In the present embodiment, the normal turning gait, which is a cyclic gait, is a gait for two steps of the robot 1. In other words, a gait composed of a first turning gait following the current time's gait and a second turning gait following the first turning gait is defined as the gait for one cycle of the normal turning gait, and the gait for one cycle is repeated. If the current time's gait to be generated is, for example, a running gait for the robot 1 to run (a gait having a one-leg supporting period and a floating period), then the first turning gait and the second turning gait of the normal turning gait are also running gaits, while if it is a walking gait for the robot 1 to walk (a gait having a one-leg supporting period and a two-leg supporting period), then the first turning gait and the second turning gait of the normal turning gait are also walking gait. This means that the basic gait mode of the first turning gait and the second turning gait are the same as that of the current time's gait.

In the following explanation, unless otherwise specified, running gaits will be taken as examples of the gaits to be generated.

Normal turning gaits are provisionally prepared to determine motion states of the robot 1, such as a divergence component, body vertical position/velocity, a body posture angle and the angular velocity thereof, at the terminating end of the current time's gait in the gait generating device 100, and they are not directly output from the gait generating device 100.

Incidentally, "divergence" means that the position of the body 3 of the robot 1 is undesirably shifted to a position that is far apart from the positions of both feet 22 and 22. The value of a divergence component is a numeric value that indicates how far the position of the body 3 of the robot 1 is apart from the positions of both feet 22 and 22 (more specifically, the origin of the global coordinate system (supporting leg coordinate system) set on the ground contact surface of the foot 22 of a supporting leg). For instance, in the embodiment in the present description, a divergence component relative to each dynamic model described above is determined by the following expression.

Divergence component=Body mass point horizontal position+Body mass point horizontal velocity/$\omega 0$     Expression 2

$\omega 0$ in this expression 2 denotes a predetermined value. In the present embodiment, a divergence component in a gait is determined using a body horizontal position and a body horizontal velocity in place of the body mass point horizontal position and the body mass point horizontal velocity in expression 2.

In the embodiment in the present description, gaits (current time's gaits) are generated using divergence components as indicators such that desired gaits are continuously generated without causing the aforesaid divergence. More specifically, a current time's gait is generated such that a normal gait (more precisely, a normal gait parameter) following a current time's gait to be generated is set on the basis of the required parameters or the like related to the aforesaid current time's gait, an initial divergence component of the normal gait is determined, and then the terminal divergence component of the current time's gait is made to agree with the initial divergence component of the normal gait (more generally, the current time's gait is made to continuously follow or approach the normal gait).

Returning to the main subject, in S022, a gait parameter of a normal gait (a parameter that defines a normal gait) is determined according to the flowchart of the subroutine processing shown in FIG. 11. More specifically, the foot trajectory parameter, the reference body posture trajectory parameter, the arm trajectory parameter, the ZMP trajectory parameter, the floor reaction force vertical component trajectory parameter, and the parameter defining the desired floor reaction force horizontal component permissible range related to the normal gait described above are individually determined by the processing of S100 to S110. Then, in S112, initial time Ts of the normal gait and a one-step period (the time for one cycle of the normal gait) Tcyc are redefined. The processing is the same as the processing of the flowchart of FIG. 15 in the aforesaid publication document 1, so that detailed explanation thereof will be omitted. The parameters of the normal gait determined in S100 to S110 are the parameters that are determined such that the requirements related to the gait, which are represented primarily by the required parameters described above, are satisfied while the trajectories specified by the individual parameters satisfy the periodicity of the normal gait at the same time. For example, as explained in conjunction with the flowchart of FIG. 15 in the aforesaid publication document 1, the foot trajectory parameter of the normal gait is determined such that the expected landing position/posture of the foot 22 of a free leg of the first turning gait following the current time's gait (the expected landing position/posture observed in the aforesaid next time's gait supporting leg coordinate system) agrees with the expected landing position/posture (required values) of the second step described above, and the expected landing position/posture of the foot 22 of the free leg of the second turning gait (the expected landing position/posture observed in the aforesaid next but one time's gait supporting leg coordinate system) agrees with the expected landing position/posture (required values) of the foot 22 of the free leg of the current time's gait. The ZMP trajectory parameter is determined on the basis of a foot trajectory parameter such that a desired ZMP is positioned substantially near the center of the ground contact surface of the foot 22 of a supporting leg and continuously changes over the entire period of the normal gait.

The initial time Ts of the normal gait redefined in S112 of FIG. 13 means the time of the start point when creating gaits for one cycle of the normal gait, as will be described later (this differs from the time of the terminating end of the current time's gait in the present embodiment), and it is the time immediately before the start of the floating period (the timing when a desired floor reaction force vertical component becomes zero) of the first turning gait. Further, the one-step period Tcyc of the normal gait is the period of the total time of the first turning gait and the second turning gait of the normal gait. The normal gait is a gait whose state at arbitrary time Tx (the state of the position/posture of each portion of the robot 1 and the changing velocities thereof) becomes the same as the state at time Tx+Tcyc due to the periodicity thereof. The normal gait is a cyclic gait having the gait for two steps as one cycle; therefore, in the present description, the total time of the one-cycle period (the first turning gait and the second turning gait) is regarded as one-step period of the normal gait.

Supplementally, the parameters of the normal gait determined by the processing of S100 to S110 are not all the parameters specifying the normal gait parameter. In the present embodiment, the gait parameter defining the normal gait (normal gait parameter) includes the position and velocity of the body 3 and the posture angle of the body 3 and the angular velocity thereof at the starting end (the start time of the period) or the terminating end (the end time of the period) of the one-cycle period of the normal gait and the peak value of a body inclination restoring moment ZMP-converted value, which will be discussed hereinafter, in addition to the parameters determined in S022. Of these parameters, the horizontal position and horizontal velocity of the body 3, the angular velocity of a posture angle of the body 3, and the peak value of the body inclination restoring moment ZMP-converted value are determined in an exploratory manner by the processing of S024, which will be discussed later. The normal gait parameter is a gait parameter that allows a normal gait to be uniquely generated using the values of the parameters constituting the normal gait parameter and the aforesaid simplified model.

Subsequently, the procedure proceeds to S024 wherein the initial state of the normal gait is calculated. The initial state to be calculated here includes the initial body horizontal position/velocity (the initial body position and the initial body velocity in the horizontal direction), the initial body vertical position/velocity (the initial body position and the initial body velocity in the vertical direction), the initial divergence component, and the initial body posture angle and its angular velocity of the normal gait. The calculation of the initial state is performed using the simplified model and the semi-full model according to the flowchart of the subroutine processing of FIG. 12.

The processing shown in FIG. 12 will be schematically explained. Taking the initial body horizontal position, the initial body horizontal velocity, the initial body posture angular velocity, and the body inclination restoring moment ZMP-converted value peak value of the robot 1 at time Ts (the initial time of the normal gait) as search objects, and the initial state of the normal gait including these search objects is provisionally determined. From this initial state, gaits up to the terminating end of the normal gait (time Ts+Tcyc) are generated using dynamic models (the simplified model and the semi-full model). Then, it is determined whether the generated normal gaits satisfy a boundary condition (the states at the initial end and the terminating end (the body horizontal position, the body horizontal velocity, the body posture angle, and the body posture angular velocity in the present embodiment) agree with each other), and if they do not satisfy the boundary condition, then the values of the search objects are changed. This is repeated so as to eventually determine an initial state that allows the boundary condition to be satisfied.

Supplementally, the basic concept (approach) of the processing shown in FIG. 12 is the same as the processing shown in FIG. 20 of the aforesaid publication document 1. However, in the embodiment of the present description, the search objects include a body posture angular velocity and the peak value of a body inclination restoring moment ZMP-converted value, which makes the embodiment different from the processing shown in FIG. 20 of the publication document 1. In addition, a part of detailed processing (subroutine processing) of the processing of S208 differs from that in the publication document 1.

A body inclination restoring moment ZMP-converted value peak value ZMPrecpeak determined in the processing of the flowchart shown in FIG. 12 indicates the peak value of a ZMP-converted value ZMPrec of a floor reaction force moment required for a body posture to approach a reference body posture (the amount of deviation from a desired ZMP providing a reference (a desired ZMP defined by a ZMP trajectory parameter determined in S022)) in a one-leg supporting period of the robot 1 (more specifically, the period from the moment immediately after the start of the one-leg supporting period to the moment immediately before the end thereof; hereinafter, it will be referred to as "the body inclination angle restoring period"), an example thereof being shown in FIG. 19. ZMPrec takes a trapezoidal pattern, as shown in the figure, the peak value thereof (the height of the trapezoid) being denoted by ZMPrecpeak.

The following will specifically explain the processing shown in FIG. 12. First, in S200, foot position/posture, a body posture angle θbs and the initial state of an arm posture (the state at initial time Ts of a normal turning gait) are determined on the basis of the normal gait parameter (the parameter determined in S022). Incidentally, these initial states are the states observed in the supporting leg coordinate system of a first turning gait (the aforesaid next time's gait supporting leg coordinate system). In this processing, the initial states of the foot position/posture are determined to be the positions/postures of the individual feet 22 at time Ts in the foot position/posture trajectories calculated using a finite-duration setting filter on the basis of the foot trajectory parameters determined in the aforesaid S022. The finite-duration setting filter is explained in the aforesaid publication document 1 and the like, so that an explanation thereof will be omitted. Furthermore, the initial state of the body posture angle θbs is determined to be the same as a reference body posture angle at time Ts determined on the basis of the reference body posture trajectory parameter determined in S022, and the initial state of an arm posture is determined to be the same as the state at time Ts determined on the basis of the arm posture trajectory parameters determined in S022.

Subsequently, in S202, an initial (time Ts) body horizontal position, an initial body horizontal velocity, an initial body posture angular velocity, and the peak value of a body inclination restoring moment ZMP-converted value on the simplified model are taken as search objects, and the candidates (Xs, Vx, ωbs, ZMPrecpeak) of these search objects are provisionally determined (the initial values of candidate values of the search objects are determined). In this case, the provisionally determined candidate values may be basically arbitrary, and they may be determined on the basis of, for example, the initial states of a normal gait determined when the last time gait was generated. Incidentally, these values provisionally determined are the values observed in the supporting leg coordinate system of the first turning gait (the aforesaid next time's gait supporting leg coordinate system).

Subsequently, the loop processing of S206 to S218 is carried out. To schematically explain the processing, a gait from the starting end (time Ts) to the terminating end (time Ts+Tcyc) of a normal gait is generated using the normal gait parameter including the search objects provisionally determined as described above and the simplified model. Then, it is determined whether the generated normal gait satisfies the boundary condition (the condition in that the states (a body horizontal position, a body horizontal velocity, a body posture angle, and a body posture angular velocity in the present embodiment) at the beginning end and the terminating end substantially agree with each other), and if it does not satisfy the boundary condition, then the values of the search objects are changed. This is repeated so as to finally determine the initial states of the normal gait that can satisfy the boundary condition of the normal gait on the simplified model.

The following will explain the processing of S206 to S218 more specifically. In S206, the body vertical position and the body vertical velocity (Zs, Vzs) at the beginning (time Ts) of a normal gait on the simplified model are determined. In this case, they are determined such that the resultant force of the inertial force in the vertical direction of the total center-of-gravity of the robot 1 and gravity on the simplified model balances out a desired floor reaction force vertical component, and the vertical position of the total center-of-gravity satisfies the boundary condition of the normal gait. This processing is carried out in the same manner as that of the processing of S206 shown in FIG. 20 in the aforesaid publication document 1. Incidentally, (Zs, Vzs) depend upon the values (candidate values) of Xsl, Vxsl, θbsl, and ωsl determined or provisionally determined as described above.

Subsequently, in S208, a gait (a provisional normal gait) is generated using the simplified model up to the time Ts+Tcyc (the terminating end of the normal gait) on the basis of the normal gait parameter that includes the candidate values of current search objects, the vertical position and the vertical velocity of the body 3, and ZMPrecpeak. This processing will be described hereinafter.

Subsequently, in S210, the body horizontal position, the body horizontal velocity, and the body posture angle and its angular velocity at the terminating end of the gait generated in S208 are converted into the values observed from the supporting leg coordinate system of the next one step of the gait (the supporting leg coordinate system of the first turning gait following the second turning gait of the normal gait generated in S208), and the obtained values are denoted by (Xe, Vxe, θbe, ωbe).

Then, in S212, the differences between the values of the current (Xs, Vxs, θbs, ωbs) and the values of (Xe1, Vxe1, θbe1, ωbe1) are determined as boundary condition errors (errx, errv, errθ, errω) of the normal gait (the provisional normal gait generated in S208). To satisfy the boundary condition of the normal gait, the boundary condition errors must be substantially zero. The boundary condition errors indicate the degree of deviation of the gait created in S208 from the boundary condition.

Subsequently, in S214, it is determined whether all of errx, errv, errθ, and errω fall within a sufficiently small (in the vicinity of zero) predetermined permissible range, and if the determination result is YES, then the procedure terminates the loop processing of S206 to S218 and proceeds to S220. In this case, it means that the gait generated in S208 satisfies the boundary condition of a normal gait, so that the gait will be an original normal gait to be in connection with the current time's gait.

Meanwhile, if the determination result of S214 is NO, then the candidates of a plurality of (four in the present embodiment) search objects obtained by changing the values of Xs, Vx, ωbs, and ZMPrecpeak by predetermined extremely small amounts ΔXs, ΔVx, Δωbs, and ΔZMPrecpeak are determined in the vicinity of the candidate values of the current search objects (Xs, Vx, ωbs, ZMPrecpeak), and the same processing as that of S208 to S212 is carried out to determine the boundary condition errors corresponding to the candidates of the individual search objects on the basis of the normal gait parameter that includes the candidates of the individual search objects (the normal gait parameter having the search objects of the normal gait parameter corrected to the newly determined candidates).

Subsequently, in S218, the new candidates of the search objects (Xs, Vx, ωbs, ZMPrecpeak) are determined by an exploratory technique, such as the steepest descent method or the simplex method, on the basis of the current (Xs, Vx, ωbs, ZMPrecpeak) and the boundary condition errors corresponding to the individual candidates of the search objects in the vicinity thereof. Then, the processing from S206 is repeated again.

In S220 after completing the loop processing of S206 to S218, on the basis of the normal gait lastly generated in S208 of the loop processing (the gait that satisfies the boundary condition of the normal gait), an initial body horizontal position X0, an initial body horizontal velocity Vx0, an initial body posture angle θb0 and an angular velocity thereof ωb0, an initial body vertical position Z0, and an initial body vertical velocity Vz0, which indicate a motion state of the body 3 of the normal gait at an original initial time 0 (the terminating time of the current time's gait), are determined. Further, in S222, according to the definitional expression of the initial divergence component q mentioned above, a normal turning initial divergence component q[0], which is a divergence component of the normal turning gait at the original initial time 0, is determined. The value determined in S222 is the value observed in the supporting leg coordinate system of the first turning gait of the normal turning gait that follows the current time's gait. Then, in S224, q", which denotes the value indicating the normal turning initial divergence component q[0] observed from the supporting leg coordinate system of the current time's gait, and (Z0", Vz0"), which denote the initial (time 0) body vertical position and velocity observed from the supporting leg coordinate system of the current time's gait, are determined.

As described above, the values of (Xs, Vx, ωbs, ZMPrecpeak), which are the search objects, are determined such that the boundary condition of the normal gait is satisfied, and the values of the search objects are used to determine the initial state (including an initial divergence component), which is a state (the motion state of the body 3) at the original initial time (time 0).

The processing of S208 in the processing shown in FIG. 12, the explanation of which has been deferred, is carried out by the subroutine processing shown by the flowchart of FIG. 13, and the processing of S306 and S322 of this FIG. 13 is carried out by the subroutine processing shown by the flowchart of FIG. 14. Further, the processing of S412 of FIG. 14 is carried out by the subroutine processing shown by the flowchart of FIG. 15. These processing will be explained below.

The processing shown in FIG. 13 will be schematically explained. First, the processing of S300 to S312 provisionally creates a normal gait such that a desired ZMP is satisfied on a simplified model and a floor reaction force component permissible range is satisfied at each time k (the time at every predetermined time width Δk) from the initial time Ts to the terminating time Ts+Tcyc of the normal gait. At this time, a time series of a floor reaction force moment error Merr_p(k) as an error of a floor reaction force moment horizontal component about a desired ZMP generated on a simplified model by a motion (provisional motion) of the provisionally created gait and a times series of a translational floor reaction force error Ferr_p(k) as an error of a translational floor reaction force horizontal component generated on the simplified model by the motion are determined. The processing shown in FIG. 13 includes processing for not only creating a normal gait but also for determining these errors Merr_p(k) and Ferr_p(k). These errors Merr_p(k) and Ferr_p(k) are updated and finally determined in the processing of FIG. 13.

Here, generally speaking, the floor reaction force moment error Merr_p(k) denotes a time series (a time series for every predetermined time width Δk) of a difference between a floor reaction force moment generated about a predetermined point of action, such as a desired ZMP on a semi-full model (a second dynamic model) by a motion of a gait generated using a simplified model (a first dynamic model) in the period from the initial time Ts to the terminal time Ts+Tcyc of a normal gait (the period of one cycle of a normal gait) and a floor reaction force moment generated about the point of action on a simplified model, or a difference between a floor reaction force moment produced about a predetermined point of action on a semi-full model by a motion of a gait generated such that a desired value of a floor reaction force moment about the point of action is satisfied on a simplified model and a desired value of a floor reaction force moment about the point of action. In the present embodiment, attention is focused on a floor reaction force moment horizontal component about a desired ZMP (a desired ZMP defined by a ZMP trajectory parameter determined in S022), and the time series of a difference between a floor reaction force moment horizontal component produced about a desired ZMP on the semi-full model by a motion of a gait generated such that a desired ZMP is satisfied on a simplified model and a floor reaction force moment horizontal component produced about a desired ZMP on a simplified model or a desired value (=0) thereof (a difference in an instantaneous value of a floor reaction force moment horizontal component at each time k) is defined as the time series of the floor reaction force moment error Merr_p(k).

Further, generally speaking, the translational floor reaction force error Ferr_p(k) denotes a time series (a time series for every predetermined time width Δk) of a difference between a translational floor reaction force produced on a semi-full model (a second dynamic model) by a motion of a gait generated using a simplified model (a first dynamic model) in the period from the initial time Ts to the terminal time Ts+Tcyc of a normal gait (the period of one cycle of a normal gait) and a translational floor reaction force produced on a simplified model. In the present embodiment, a gait is generated such that a translational floor reaction force horizontal component falls within a floor reaction force horizontal component permissible range, so that attention is focused on a translational floor reaction force horizontal component, and the time series of a difference between a translational floor reaction force horizontal component produced on the semi-full model and a translational floor reaction force horizontal component produced on a simplified model by a motion of a gait generated on a simplified model (a difference in an instantaneous value of a translational floor reaction force horizontal component at each time k) is defined as the time series of the translational floor reaction force error Ferr p(k).

Subsequently, the loop processing of S314 to S328 creates a gait (a provisional normal gait) obtained by correcting a motion of the provisionally created gait by using the errors Merr_p(k) and Ferr_p(k). In this case, the gait is repeatedly corrected as necessary, and the errors Merr_p(k) and Ferr_p (k) are updated at each correction. And, a gait created lastly in S314 to 328 is obtained as the gait that should be created by the processing of FIG. 13. There are cases where a motion of a gait provisionally created by the processing of S300 to S312 is not corrected, and at that time, the provisionally created gait is obtained as a gait that should be created by the processing of FIG. 13.

In this processing of S314 to S328, at each time k from the beginning to the end of a normal gait, a result obtained by adding a floor reaction force moment error Merr_p(k) to a floor reaction force moment about a desired ZMP that is produced on a simplified model by a motion of the gait (the normal gait to be created) is regarded as a true floor reaction force moment about the desired ZMP, and the normal gait is generated such that the true floor reaction force moment becomes zero (such that an original definition of the desired ZMP is satisfied). At the same time, at each time k from the beginning to the end of a normal gait, a result obtained by adding a translational floor reaction force error Ferr_p(k) to a translational floor reaction force horizontal component that is produced on a simplified model by a motion of the gait (the normal gait to be created) is regarded as a true translational floor reaction force horizontal component, and the normal gait is generated such that the true floor reaction force horizontal component satisfies a floor reaction force horizontal component permissible range. At this time, Merr_p(k) and Ferr_p(k) desirably enhances the reliability thereof, and they change according to a motion pattern of a gait, so that the creation of a normal gait for one cycle is repeated until a predetermined condition is satisfied (to be more specific, until the time series pattern of each of Merr_p(k) and Ferr_p(k), respectively, converges to a substantially fixed pattern or it is determined that they have virtually converged). And, each time, the time series of Merr_p(k) and Ferr_p(k) for one cycle (two steps) of a normal gait are newly determined and observed, thereby determining appropriate time series of Merr_p(k) and Ferr_p(k). In this case, a floor reaction force generated on a semi-full model is used as a true value of a floor reaction force that provides the reference of the errors Merr_p(k) and Ferr_p(k). Supplementally, creating a gait such that a result obtained by adding a floor reaction force moment error Merr_p(k) to a floor reaction force moment about a desired ZMP generated on a simplified model becomes zero is equivalent to creating a gait such that the floor reaction force moment horizontal component (=−Merr_p(k)) obtained by subtracting the floor reaction force moment error Merr_p(k) from an original desired value (=0) of a floor reaction force moment horizontal component about a desired ZMP is generated about the desired ZMP on a simplified model.

The following will specifically explain the processing of FIG. 13. First, in S300, as the initial state (the state at time Ts) of a motion of the body 3, values (current candidate values) (Xs, Vxs, θbs, ωs, Zs, Vzs) provisionally determined in the processing of FIG. 12 are set.

Subsequently, in S302, each value of the time series of the floor reaction force moment error Merr_p(k) and the translational floor reaction force error Ferr_p(k) is initialized to zero. The Merr_p(k) and Ferr_p(k) are initialized to zero here to create a gait that satisfies a desired ZMP on a simplified model and to satisfy a floor reaction force horizontal component permissible range in S306 to be discussed later.

Via S304 following the aforesaid S302, the processing of S306 to S312 is implemented at each time from the initial time Ts to the terminating time Ts+Tcyc of the normal gait. In S306, using the time series of the errors Merr_p(k) and Ferr_p (k) initialized in S302, a time series of an instantaneous value of a normal gait is created such that −Merr_p(k) is generated about a desired ZMP (a desired ZMP defined by a ZMP trajectory parameter determined in S022) at time k on a simplified model and a result obtained by adding Ferr_p(k) to a translational floor reaction force horizontal component (a translational floor reaction force that balances out an inertial force involved in a translational acceleration horizontal component of a total center-of-gravity of a gait on the simplified model) falls within a floor reaction force horizontal component permissible range (the floor reaction force horizontal component permissible range defined by the parameters determined in S022) at time k. In this case, Merr_p(k)=0 and Ferr_p(k)=0 in S306, so that a gait created (provisionally created) in S306 will eventually be a gait that satisfies a desired ZMP on the simplified model and also satisfies the floor reaction force horizontal component permissible range. More specific processing of S306 will be described later. During the processing of S306, at each time k, a difference Merr(k) between a floor reaction force moment horizontal component about a desired ZMP generated on a semi-full model by a motion of a gait that is being created and a floor reaction force moment horizontal component about a desired ZMP generated on the semi-full model by the motion is determined, and a difference Ferr(k) between a translational floor reaction force horizontal component generated on the semi-full model by the motion and a translational floor reaction force horizontal component generated on the simplified model by the motion is determined.

Subsequently, in S308, the differences ΔMerr(k) and ΔFerr (k) between the respective Merr(k) and Ferr(k) determined as described above and the current values of the respective Merr_p(k) and the Ferr_p(k) are calculated according to the expressions shown in the figure. Further, in S310, Merr(k) and Ferr(k) determined in S306 are set as new values of Merr_p(k) and Ferr_p(k), respectively. Then, time k is updated to k+Δk in S312. The processing of S306 to S312 described above is repeated until k=Ts+Tcyc. This provisionally creates the time series of instantaneous value of a gait that satisfies a desired ZMP on the simplified model and also satisfies the floor reaction force horizontal component permissible range, and time series of Merr_p(k) and Ferr_p(k) corresponding thereto are determined. The Merr_p(k) and Ferr_p(k) determined as described above indicate errors of a floor reaction force generated on the simplified model by a motion (provisional motion) of a gait created in S306 such that a desired ZMP and a floor reaction force horizontal component permissible range are satisfied.

Supplementally, the aforesaid ΔMerr(k) and ΔFerr(k) mean change amounts of Merr(k) and Ferr(k) updated each time a gait is created in the loop processing of S314 to S328, which will be discussed later. Hereinafter, the time series of ΔMerr(k) will be referred to as a floor reaction force moment error change amount and the time series of ΔFerr(k) will be referred to as a translational floor reaction force error change amount. However, both Merr_p(k) and Ferr_p(k) are initialized to zero in S302, so that ΔMerr(k) and ΔFerr(k) calculated in S308 agree with Merr(k) and Ferr(k), respectively, determined in S306. Hence, ΔMerr(k) and ΔFerr(k) calculated in S308 virtually indicate the errors of floor reaction forces produced on a simplified model by a motion (provisional motion) of a gait created in S306 such that a desired ZMP and a floor reaction force horizontal component permissible range are satisfied. The ΔMerr(k) and ΔFerr(k) calculated in S308 have meanings as the initial values of a floor reaction force moment error change amount ΔMerr(k) and a translational floor reaction force error change amount ΔFerr(k).

Subsequently, via S314, the discrimination processing of S316 is carried out. In this S316, it is determined whether a predetermined characteristic amount of each of the time series (current time series) of ΔMerr(k) and the time series (current time series) of ΔFerr(k) falls within a predetermined permissible range. This discrimination processing is the processing for determining whether both the time series of ΔMerr(k) and the time series of ΔFerr(k) have individually converged to substantially zero or not (this means whether the time series pattern of Merr_p(k) and the time series pattern of Ferr_p(k) have individually converged substantially to fixed patterns or not). In this case, for example, a maximum value of the absolute values of the time series of ΔMerr(k) (the absolute value of the value at each time k) or the total sum of the absolute values, or an effective value of a pattern of the time series, or a difference between a maximum value and a minimum value of the time series is defined as a characteristic amount for determining the convergence of the time series of ΔMerr(k), and it is determined in S314 whether the characteristic amount falls within a permissible range in the vicinity of zero. Similarly, a maximum value of the absolute values of the time series of ΔFerr(k) (the absolute value of the value at each time k) or the total sum of the absolute values, or an effective value of a pattern of the time series, or a difference between a maximum value and a minimum value of the time series is defined as a characteristic amount for determining the convergence of the time series of ΔFerr(k), and it is determined in S314 whether the characteristic amount falls within a permissible range in the vicinity of zero. Incidentally, the same type of characteristic amount may be used for both ΔMerr(k) and ΔFerr(k), but it does not have to be the same. Further, the permissible ranges for characteristic amounts of ΔMerr(k) and ΔFerr(k) do not have to be the same, either.

Supplementally, when the processing of S316 is carried out first after completion of the processing of S300 to S312, ΔMerr(k)=Merr_p(k) and ΔFerr(k)=Ferr_p(k) as described above, so that the discrimination processing of S316 at this time may be said to be processing for evaluating whether a floor reaction force moment error Merr_p(k) and a translational floor reaction force error Ferr_p(k) related to a gait created by the processing of S300 to S312 are sufficiently small or not (whether the dynamic accuracy of a gait created by the processing of S300 to S312 is adequate or not) rather than the convergence discrimination processing of a time series of ΔMerr(k) and a time series of ΔFerr(k). In other words, the discrimination processing of S316 functions as the processing for evaluating whether the floor reaction force moment error Merr_p(k) and the translational floor reaction force error Ferr_p(k) related to a gait created by the processing of S300 to S312 are sufficiently small and also as the processing for discriminating whether the time series of ΔMerr(k) and the time series of ΔFerr(k) have converged. Incidentally, these evaluation processing and convergence discrimination processing may be separately carried out. In such a case, the evaluation processing and the convergence discrimination processing may have different types of characteristic amounts or different permissible ranges of characteristic amounts.

If a discrimination result in S316 is YES, then the loop processing of S314 to S328 is terminated and the processing shown in FIG. 13 is also terminated. In this case, at this point, a gait lastly created by the processing of FIG. 13 is obtained as a gait (normal gait) that should be created in S208 shown in FIG. 12. Hence, after completion of the processing of S300 to S312, if a first discrimination result of S316 is YES, then a gait created by the processing of S300 to S312 is obtained as a gait (normal gait) that should be created in S208 shown in FIG. 12. Incidentally, since the discrimination result of S316 is YES, the gait will be a gait having adequate dynamic accuracy.

As long as the discrimination result of S316 remains NO (in a case where a characteristic amount of at least either the time series of ΔMerr(k) or the time series of ΔFerr(k) deviates from a permissible range), the same processing as those of S300 and S304 to S312 are repeated in S318 to S328. To be more specific, in S318, the initial state of the body 3 is set in the same manner as that in S300. Further, via S320 (this is the same as S304), the processing of S322 to S328 is carried out at each time from the initial time Ts to the terminating time Ts+Tcyc of a normal gait. The processing of these S322 to S328 are respectively the same as the processing of the aforesaid S306 to S312. However, in the processing of S322, the time series of Merr_p(k) and Ferr_p(k) used therein is a latest time series, that is, the time series of Merr_p(k) and Ferr_p(k) updated in the aforesaid S310 or the time series of Merr_p(k) and Ferr_p(k) updated in S326 in the processing of S318 to S328 of one cycle before (last cycle) in the repetition of S318 to S328 rather than the value (=0) initialized in the aforesaid S302.

Thus, in the processing of S322 of an n-th (n=1, 2 . . . ) number of times during the repetition of S318 to S328, when generating a gait of an (n−1)th number of times, a gait of an n-th number of times is generated by adding a correction based on the errors Merr_p(k) and Ferr_p(k) determined relative to a motion of the gait. Detailedly, the gait of the n-th number of times is generated such that −Merr_p(k), which is obtained by reversing the sign of a floor reaction force moment error Merr_p(k) at the generation of the gait of the (n−1)th number of times, is produced about a desired ZMP at time k on a simplified model by a motion of the gait of the n-th number of times, and that a result obtained by adding a translational floor reaction force error Ferr_p(k) at the generation of the gait of the (n−1)th number of times to a translational floor reaction force horizontal component produced on a simplified model by a motion of the gait of the n-th number of times falls within a floor reaction force horizontal component permissible range at time k. Incidentally, in this case, the generation of a gait of a 0-th number of times means the generation of a gait carried out from S300 to S312.

Then, as described above, if a discrimination result of S316 switches to YES, then the processing shown in FIG. 13 is terminated, and a gait lastly created at this point is obtained as a normal gait that should be created in S208 shown in FIG. 12.

Here, in the repetition of the processing from S318 to S328, a state causing a discrimination result of S316 to become NO is a state wherein a pattern of a time series of Merr_p(k) or Ferr_p(k) updated each time the repetition is performed changes. And, the time series of Merr_p(k) or Ferr_p(k) newly determined from a motion of a gait corrected using such time series of Merr_p(k) and Ferr_p(k) exhibits low reliability as the one indicating an error of a floor reaction force produced on a simplified model by the motion. In comparison with this, a state causing a discrimination result of S316 to become YES is a state wherein a pattern of a time series of Merr_p(k) or Ferr_p(k) updated each time the processing of S318 to S328 is repeated has become steady; therefore, the time series of Merr_p(k) or Ferr_p(k) in this state exhibits high reliability as the one indicating an error of a floor reaction force produced on a simplified model by the motion of a gait corrected by using it. Hence, if a discrimination result of S316 switches to YES, then the processing shown in FIG. 13 is terminated, and a gait lastly created at this point will be the one that properly reflects an error of a floor reaction force produced on a simplified model, providing high dynamic accuracy.

The processing of S306 and S322 shown in FIG. 13 (the processing for creating a time series of instantaneous values of a normal gait) is carried out by the subroutine processing shown by the flowchart in FIG. 14.

In the processing shown in FIG. 14, first, the processing of S400 to S410 determines the instantaneous values of a desired floor reaction force vertical component, a desired ZMP, desired positions/postures of both feet, a reference body posture, a desired arm posture, a desired body vertical position, and a floor reaction force horizontal component permissible range on the basis of the parameters of the normal gait determined in the aforesaid S022. This processing of S400 to S410 is the same as the processing of S400 to S410 of FIG. 22 in the aforesaid publication document 1, so that detailed explanation will be omitted herein.

Subsequently, the instantaneous values of a body horizontal acceleration and a body posture angular acceleration are determined by the processing of S412 such that the conditions described in the figure are satisfied. In this case, if Merr_p(k) (the Merr_p(k) determined at the gait generation of the (n−1)th number of times) is regarded as the error of a floor reaction force moment horizontal component about a desired ZMP generated on a simplified model at time k by a motion of a gait that is being created (the gait undergoing the generation of the n-th number of times), then it is considered that determining the motion of the gait such that −Merr_p(k) is generated about a desired ZMP (the desired ZMP determined in S402) on the simplified model causes a true floor reaction force moment horizontal component about the desired ZMP generated by the actual robot 1 by the determined motion (strictly speaking, the floor reaction force moment horizontal component about a desired ZMP generated on the semi-full model) to become substantially zero (an original desired value of the floor reaction force moment horizontal component about the desired ZMP). Hence, in S412, the body horizontal acceleration and the body posture angular acceleration are determined such that −Merr_p(k) is produced about the desired ZMP on the simplified model. Incidentally, this is equivalent to determining the body horizontal acceleration and the body posture angular acceleration such that a result obtained by adding the error Merr_p(k) to a floor reaction force moment horizontal component about the desired ZMP generated on the simplified model by the motion of the gait to be created (≈−Merr_p(k)) becomes zero, which is the original desired value of the floor reaction force moment horizontal component about the desired ZMP.

Further, if Ferr_p(k)(the Ferr_p(k) determined at the gait generation of the (n−1)th number of times) is regarded as the error of a translational floor reaction force horizontal component generated on a simplified model at time k by a motion of a gait that is being created (the gait undergoing the generation of the n-th number of times), then it is considered that determining the motion of the gait such that a result obtained by adding Ferr_p(k) to the translational floor reaction force horizontal component produced by the motion of the gait on the simplified model does not exceed the floor reaction force horizontal component permissible range (the permissible range determined in S410) causes a translational floor reaction force horizontal component acting on the actual robot 1 by the determined motion (strictly speaking, the translational floor reaction force horizontal component generated on the semi-full model) to fall within the floor reaction force horizontal component permissible range. Hence, in S412, the body horizontal acceleration and the body posture angular acceleration are determined such that a result obtained by adding Ferr_p(k) to the translational floor reaction force horizontal component produced on the simplified model by the motion of the gait to be created does not exceed the floor reaction force horizontal component permissible range (the permissible range at current time k determined in S410).

More specific description of the processing of S412 will be given later.

Subsequently, by the processing of S414, the body horizontal acceleration and the body posture angular acceleration determined in S412 as described above are subjected to second-order integration to determine instantaneous values of the body horizontal position and the body posture angle. By this time, the instantaneous values of the body vertical position, the foot position/posture, and the arm posture have already been determined (refer to S404 and S408), meaning that the instantaneous value of the motion of the robot 1 (the instantaneous value of a desired motion of a normal gait) composed of the aforesaid instantaneous values and the instantaneous values of the body horizontal position and the body posture angle have been determined. Supplementally, each of the leg bodies 2 of the robot 1 of the present embodiment has six degrees of freedom; therefore, once the instantaneous value of the desired position/posture of each foot 22 and the instantaneous value of the desired position/posture of the body 3 are determined, the displacement amount of each joint of each leg body 2 of the robot 1 is uniquely determined.

Further, the processing of S415 following S414 calculates a floor reaction force moment horizontal component Msmpl(k) about the desired ZMP and a translational floor reaction force horizontal component Fsmpl(k) at time k (current time) generated on the simplified model by the desired motion of the normal gait determined as described above.

In this case, the floor reaction force moment horizontal component Msmpl(k) about the desired ZMP and the translational floor reaction force horizontal component Fsmpl(k) may be calculated by using the simplified model on the basis of the determined desired motion composed of the foot position/posture, the body position and velocity, and the body posture angle and angular velocity. In other words, the Msmpl(k) is calculated as the value with a reversed sign of the instantaneous value (the value at each time k) of the horizontal component of the moment generated about the desired ZMP by the resultant force of each inertial force produced by a motion of each element (the mass points and the flywheel in the present embodiment) of the simplified model and the gravity acting on the total center-of-gravity of the simplified model, which is determined in association with the desired motion. Further, the Fsmpl(k) is calculated as a value with a reversed sign of a value (the horizontal component of an inertial force produced by a motion of the total center-ofgravity) obtained by multiplying the instantaneous value (the value at each time k) of the horizontal component of the translational acceleration of the total center-of-gravity of the simplified model in association with the desired motion by the total mass of the simplified model.

Alternatively, the Msmpl(k) and the Fsmpl(k) may be determined according to the following expressions instead of performing the calculation of the simplified model as described above.

$$Msmpl(k)=0-Merr\_p(k) \qquad \text{Expression 3a}$$

$$Fsmpl(k)=Fx'(k)-Ferr\_p(k) \qquad \text{Expression 3b}$$

More specifically, the gait created by the processing from S410 to S414 is created such that −Merr_p(k) is generated about a desired ZMP (more precisely, the value obtained by subtracting Merr_p(k) from an original desired floor reaction force moment horizontal component (=0) about the desired ZMP), so that the floor reaction force moment Msmpl(k) about the desired ZMP generated on the simplified model by a motion of the gait agrees or substantially agrees with −Merr_p(k). Hence, Msmpl(k) may be determined according to the aforesaid expression 3a. Incidentally, "0" in expression 3a may be of course omitted.

Further, Fx' (k) in expression 3b is obtained by adding a translational floor reaction force error (a translational floor reaction force horizontal component error) Ferr_p(k) to the translational floor reaction force horizontal component Fsmpl (k) produced on the simplified model by a motion of a gait created by the processing from S410 to S414, and it is determined such that it satisfies a floor reaction force horizontal component permissible range in the processing of S412 to be discussed later (more specifically, it is determined as a desired value (a desired value that satisfies a floor reaction force horizontal component permissible range) of a floor reaction force horizontal component (Fsmpl(k)+Ferr_p(k)) when a body horizontal acceleration is determined). Thus, the translational floor reaction force horizontal component Fsmpl(k) produced on the simplified model by a motion of the gait created by the processing from S410 to S414 agrees or substantially agrees with a value of the right side of expression 3b, so that Fsmpl(k) may be determined according to expression 3b by using the value of Fx' (k) determined in the processing of S412.

The Msmpl(k) and Fsmpl(k) may be determined using expression 3a and expression 3b as described above. The same applies to the processing for creating a current time's gait, which will be described later (the processing of S028 or the processing of S032 to be described later).

Subsequently, the processing of S416 following S415 calculates an instantaneous value Msemifull(k) of a floor reaction force moment horizontal component about a desired ZMP and an instantaneous value Fsemifull(k) of a translational floor reaction force horizontal component generated on the aforesaid semi-full model on the basis of the desired motion of the gait determined as described above. The method for the calculation is the same as that for calculating the instantaneous values Msmpl(k) and Fsmpl(k) on the simplified model in the aforesaid S415. In this case, however, the Msemifull(k) and Fsemifull(k) cannot be determined by the same technique as the aforesaid expressions 3a and 3b, so that actual calculation processing of the semi-full model need to be carried out. These Msemifull(k) and Fsemifull(k) correspond to the true values of a floor reaction force moment horizontal component and a translational floor reaction force horizontal component, respectively, acting on the robot 1 when a motion of the actual robot 1 is performed on the basis of a desired motion.

Subsequently, in the processing of S418, new floor reaction force moment error Merr(k) and translational floor reaction force error Ferr(k)(the errors Merr(k) and Ferr(k) determined at the gait generation of the n-th number of times) are calculated according to the following expressions 3c and 3d.

$$Merr(k)=Msemifull(k)-Msmpl(k) \qquad \text{Expression 3c}$$

$$Ferr(k)=Fsemifull(k)-Fsmpl(k) \qquad \text{Expression 3d}$$

Supplementally, in the present embodiment, the subroutine processing of S306 and S322 of FIG. 13 is the same; however, the subroutine processing may be separately established for S306 and S322. In this case, an algorithm may be constructed on the assumption that Merr_p(k)=0 and Ferr_p(k)=0 from the beginning in the processing of S306, and in such a case, the processing of S302 of FIG. 13 is unnecessary. Further, if the aforesaid expression 3a is applied in S415 in the processing of S306, then the processing of S415 may be omitted in the processing of S322, because Msmpl(k) is always zero. The same supplemental particular explained above applies to the processing for creating a current time's gait to be discussed later (the processing of S028 to be discussed later).

The subroutine processing of S412 of FIG. 14 is carried out as shown by the flowchart of FIG. 15.

In the processing of FIG. 15, first, times Tm, Ts2, and Tm2 that define a body inclination angle restoring period of a normal gait are determined. These times define the period during which the aforesaid body inclination restoring moment ZMP-converted value ZMPrec is generated, as shown in FIG. 19. More specifically, the time immediately following the start of a first one-leg supporting period after the initial time Ts of a normal gait is determined as Tm, the time immediately before the end of the one-leg supporting period is determined as Ts2, and the time immediately following the start of the next one-leg supporting period is determined as Tm2. And, a period [Tm, Ts2] and a period [Tm2, Te] are respectively defined as the periods during which ZMPrec is generated (the body inclination angle restoring period in a normal gait). This is the same as the processing of S500 of FIG. 23 in the aforesaid publication document 1.

Subsequently, in S502, it is determined whether the current time k at which an instantaneous value of a normal gait is to be created (the time in the normal gait that is being created) is in the body inclination angle restoring period. And, if the current time k is not time within the aforesaid body inclination angle restoring period, that is, if the current time k is in a period from an instant immediately before the end of a one-leg supporting period to an instant immediately after the start of the next one-leg supporting period (a period during which a desired floor reaction force vertical component is zero or in the vicinity of zero), then the processing of S504 to S518 is carried out. In these processing, first, a body horizontal acceleration αtmp attributable to a motion of the aforesaid body translational mode is calculated such that a floor reaction force moment horizontal component −Merr_p(k) obtained by subtracting a current value Merr_p(k) of a floor reaction force moment error (a floor reaction force moment horizontal component error) from an original desired floor reaction force moment horizontal component (=0) about a desired ZMP is generated on a simplified model (S504), αtmp denotes a provisional value of a body horizontal acceleration in a gait that is being created. Then, a translational floor reaction force horizontal component Fxtmp' obtained by adding a current value Ferr_p(k) of a translational floor reaction force error (a translational floor reaction force horizontal component error) to a translational floor reaction force horizontal component Fxtmp that balances out an inertial force attributable to a horizontal acceleration of the total center-of-gravity of the simplified model (=Fxtmp+Ferr_p(k)) when the body horizontal acceleration is denoted by αtmp is compared with a floor reaction force horizontal component permissible range (S506 to S510). If this comparison reveals that Fxtmp' deviates from the floor reaction force component permissible range, then a translational floor reaction force horizontal component Fx' to be generated by a motion of the gait that is being created (this Fx' means a desired value of a component obtained by adding Ferr_p(k) to a translational floor reaction force horizontal component generated on the simplified model by the motion of the gait that is being created) is restricted to an upper limit value Fxmax or a lower limit value Fxmin of the floor reaction force horizontal component permissible range, or if Fxtmp' falls within the floor reaction force component permissible range, then Fxtmp is directly determined as Fx' (S512 to S514).

Then, a body horizontal acceleration α of the aforesaid body translational mode is determined such that a translational floor reaction force horizontal component obtained by adding the current value Ferr_p(k) of a translational floor reaction force error (a translational floor reaction force horizontal component error) to a translational floor reaction force horizontal component Fx generated on the simplified model by a motion of a gait that is being created (=Fx+Ferr_p(k)) agrees with the Fx' determined as described above, and a body angular acceleration β of the body rotational mode is determined such that a floor reaction force moment horizontal component about a desired ZMP becomes −Merr_p(k) on the simplified model by a motion of the body translational mode of the body horizontal acceleration α and a motion of the body rotational mode (S518).

Thus, the body horizontal acceleration α of the body translational mode and the body angular acceleration β of the body rotational mode are determined such that −Merr_p(k) is generated about the desired ZMP on the simplified model (the value obtained by adding the current value Merr(k) of a floor reaction force moment error to a floor reaction force moment horizontal component generated about the desired ZMP on the simplified model by a motion of the gait that is being created becomes zero, which is the original desired value about the desired ZMP), and the translational floor reaction force horizontal component Fx' obtained by adding the current value Ferr_p(k) of a translational floor reaction force error to the floor reaction force horizontal component Fx that balances out an inertial force attributable to a horizontal acceleration of the total center-of-gravity (this corresponds to a translational floor reaction force horizontal component truly generated by the motion of the gait that is being created) on the simplified model falls within a floor reaction force horizontal component permissible range.

Further, if the current time k (time within a normal gait that is being created) is time within the aforesaid body inclination angle restoring period, then the processing of S520 to S530 is carried out. In these processing, first, the body angular acceleration β is determined such that a floor reaction force moment based on an instantaneous value of a body inclination restoring moment ZMP-converted value pattern (this is determined on the basis of a body inclination restoring moment ZMP-converted value peak value (a latest candidate value) provisionally determined during the processing of the aforesaid S12 and the current time k. Refer to FIG. 19) is generated about a desired ZMP on the simplified model (S520 and S522). Further, the body horizontal acceleration α is determined as a difference between the body horizontal acceleration αtmp for a floor reaction force moment about a desired ZMP generated by a motion of a body translational mode on the simplified model to agree with a floor reaction force moment horizontal component −Merr_p(k) obtained by subtracting the current value Merr_p(k) of a floor reaction force moment error from an original desired floor reaction force moment horizontal component (=0) and a body horizontal acceleration that generates a floor reaction force moment equivalent to a floor reaction force moment by the body angular acceleration β previously determined (S524 and S526).

Thus, the body angular acceleration β and the body horizontal acceleration α are determined such that −Merr_p(k) is generated about a desired ZMP while restoring the body posture toward a reference body posture on the simplified model. At the same time, if the body horizontal acceleration is the acceleration α determined as described above, then the translational floor reaction force horizontal component Fx' obtained by adding the current value Ferr_p(k) of a translational floor reaction force error to the floor reaction force horizontal component Fx that balances out an inertial force attributable to a horizontal acceleration of a total center-of-gravity on the simplified model is determined as a translational floor reaction force horizontal component truly generated by a motion of a gait that is being created. If the current time k is time within the aforesaid body inclination angle restoring period, then a floor reaction force horizontal component permissible range is sufficiently wide, so that the translational floor reaction force horizontal component Fx' determined as described above will not deviate from the permissible range. For this reason, Fx' is not compared with a floor reaction force horizontal component permissible range in the processing of SS520 to S530.

Supplementally, the basic concept (approach) of the processing shown in FIG. 15 is the same as the processing shown in FIG. 22 of the aforesaid publication document 1. However, in the processing in the publication document 1, a body horizontal acceleration and a body posture angular acceleration are determined such that they satisfy a desired ZMP (a floor reaction force moment horizontal component about the desired ZMP becomes zero) on the simplified model and also satisfy a floor reaction force horizontal component permissible range on the simplified model. In comparison with this, the processing shown in FIG. 15 of the present embodiment determines a body horizontal acceleration and a body posture angular acceleration such that the floor reaction force moment horizontal component −Merr_p(k) obtained by subtracting the current value Merr_p(k) of a floor reaction force moment error from an original desired floor reaction force moment horizontal component (=0) about a desired ZMP is produced on the simplified model (in other words, the value obtained by adding the current value Merr_p(k) of a floor reaction force moment error to a floor reaction force moment horizontal component produced about the desired ZMP by a motion of the robot 1 on the simplified model becomes zero, which indicates an original desired floor reaction force moment horizontal component about the desired ZMP), and the translational floor reaction force horizontal component Fx' obtained by adding the current value Ferr_p(k) of a translational floor reaction force error to the floor reaction force horizontal component Fx that balances out an inertial force attributable to a horizontal acceleration of a total center-of-gravity satisfies a floor reaction force horizontal component permissible range (falls within the permissible range) on the simplified model.

In the present embodiment, it has been arranged such that the translational floor reaction force horizontal component Fx' obtained by adding the current value Ferr_p(k) of a translational floor reaction force error to the floor reaction force horizontal component Fx that balances out an inertial force attributable to a horizontal acceleration of a total center-of-gravity satisfies a floor reaction force horizontal component permissible range (falls within the permissible range) on the simplified model. Alternatively, however, a body horizontal acceleration and a body posture angular acceleration may be determined such that Fx satisfies a permissible range obtained by subtracting the current value Ferr_p(k) of a translational floor reaction force error from the upper limit value and the lower limit value, respectively, of a floor reaction force horizontal component permissible range. This is equivalent to the original method.

In the present embodiment, a normal gait is generated as explained above, so that the normal gait lastly generated in S024 is determined such that a floor reaction force produced on a semi-full model by the motion thereof (this accurately agrees with a floor reaction force acting on the actual robot 1 attributable to the motion) satisfies a desired ZMP and a floor reaction force horizontal component permissible range. At this time, the normal gait is generated on the basis of the dynamics of a simplified model with high linearity, taking into account the error Merr_p(k) and Ferr_p(k) of a floor reaction force produced on the simplified model in response to a motion of the gait. Further, an instantaneous value of the normal gait at each time k is generated by adding a correction based on Merr_p(k) and Ferr_p(k) at that time. And, the Merr_p(k) and Ferr_p(k) used in this case are the ones in the state wherein a convergence discrimination result of S316 is YES, so that they exhibit high reliability as the ones indicating errors of floor reaction forces produced on the simplified model. Thus, it is possible to promptly and efficiently determine the initial state of the normal gait in an exploratory manner without causing a motion of the gait to diverge. In addition, the semi-full model is used only to calculate a floor reaction force (a floor reaction force horizontal component and a translational floor reaction force horizontal component) produced by a motion of a gait created using the simplified model; therefore, the calculation does not require exploratory processing or the like and it can be accomplished promptly and easily.

Returning to the explanation of FIG. 10, after the processing of S024 is carried out as explained above, gait parameters of a current time's gait is determined (some are provisionally determined) in S026. This processing is carried out according to the flowchart of FIG. 16. The gait parameters determined here include the parameters that define a foot position/posture trajectory (the position/posture trajectory of each foot 22), a reference body posture trajectory, an arm posture trajectory, a floor reaction force vertical component trajectory, a floor reaction force horizontal component permissible range, and a ZMP trajectory in the current time's gait, and these individual parameters are determined by the processing from S600 to S610. Then, in S612, a body inclination angle restoring period [Ta, Tb] in the current time's gait is set. This processing is the same as the processing of a flowchart of FIG. 33 in the aforesaid publication document 1, so that detailed explanation will be omitted herein, but the gait parameters defining the individual trajectories are determined such that the aforesaid trajectories are connected from the terminal states of a last time gait (the initial states of a current time's gait) to a normal gait while satisfying the aforesaid requirements related to the current time's gait. For example, the foot trajectory parameter related to the foot 22 of a free leg of the current time's gait is determined such that the expected landing position/posture and time of the foot 22 of the free leg of the current time's gait satisfy the required values thereof and the position/posture of the foot 22 of the free leg at the end of the current time's gait agree at the beginning of a normal gait (at the time of the end of the current time's gait).

Supplementally, the ZMP trajectory parameter determined in S610 is a provisional value, an example of the ZMP trajectory defined by the provisional value (an example of the trajectory in the X-axis direction) being shown at the top in FIG. 21. The ZMP trajectory parameter is determined such that a desired ZMP is positioned near substantially the center of the ground contact surface of the foot 22 of a supporting leg in the one-leg supporting period of the current time's gait and that the desired ZMP continuously changes until the initial ZMP of the normal gait at the end of the current time's gait in a floating period following the one-leg supporting period. Further, the body inclination angle restoring period set in S612 of FIG. 16 is the period from time Ta to time Tb in FIG. 21 and it is the period from the point immediately after the start of the one-leg supporting period of the current time's gait to the point immediately before the end thereof.

The parameters of the current time's gait determined by the processing from S600 to S610 are not all the parameters constituting a current time's gait parameter. In the present embodiment, the gait parameter defining the current time's gait (the current time's gait parameter) includes, in addition to the parameters determined in S026, a ZMP correcting parameter for correcting a ZMP trajectory defined by a ZMP trajectory parameter and a peak value of a body inclination restoring moment ZMP-converted value (two types of peak values in this case). These parameters are determined in the exploratory manner in the processing of S028 explained below.

Subsequently, the procedure proceeds to S028 wherein the gait parameter (the ZMP trajectory parameter) of the current time's gait is corrected. In this processing, the gait parameter of the current time's gait is corrected such that the divergence component at the end of the current time's gait agrees with the initial divergence component of the normal turning gait determined in S024 (more specifically, such that a body position/posture trajectory is connected to or brought close to a normal gait), thereby determining a final current time's gait parameter (more specifically, determining a ZMP correcting parameter and two types of peak values of a body inclination restoring moment ZMP-converted value).

This processing is carried out according to the subroutine processing shown by the flowchart of FIG. 17.

The processing shown in FIG. 17 will be schematically explained. A ZMP correcting parameter "a", which is the parameter defining a ZMP correction amount, and a first peak value ZMPrecpeaka and a second peak value ZMPrecpeakb of the body inclination restoring moment ZMP-converted value are determined in the exploratory manner such that the terminal divergence component of the current time's gait agrees or substantially agrees with the initial divergence component of a normal gait (such that the current time's gait connects to the normal gait) on the simplified model. Here, the first peak value ZMPrecpeaka and a second peak value ZMPrecpeakb of the body inclination restoring moment ZMP-converted value determined in the processing of FIG. 17 indicate two peak values of a pattern of a ZMP-converted value of a floor reaction force moment required to bring a body posture close to a reference body posture in the body inclination angle restoring period [Ta, Tb] of the current time's gait, an example thereof being shown in FIG. 20. There has been only one peak value of a body inclination restoring moment ZMP-converted value in the case of a normal gait; in the present embodiment, however, the first peak value ZMPrecpeaka and the second peak value ZMPrecpeakb are used as two adjustable parameters of the body inclination restoring moment ZMP-converted value in order to make the body posture angle and the angular velocity thereof at the end of the current time's gait agree with the initial body posture angle and the angular velocity thereof, respectively, of a normal gait. In the present embodiment, as shown in FIG. 20, the body inclination restoring moment ZMP-converted value in the current time's gait takes a pattern having a shape combining a trapezoidal pattern in the first half of a one-leg supporting period and another trapezoidal pattern in the latter half thereof, the peak value of the trapezoidal pattern of the first half being the first peak value ZMPrecpeaka and the peak value of the trapezoidal pattern of the latter half being the second peak value ZMPrecpeakb.

Further, the ZMP correcting parameter "a" determined in the processing of FIG. 17 is a parameter defining the correction amount of a desired ZMP for connecting the current time's gait to the normal gait (for making the terminal divergence component of the current time's gait substantially agree with the initial divergence component q" of the normal gait), an example thereof being shown at the middle in FIG. 21. As illustrated, the ZMP correction amount defined by the ZMP correcting parameter "a" has a trapezoidal pattern produced from a point immediately after the start of a one-leg supporting period to a point immediately before the end thereof, and the peak value "a" is used as the ZMP correcting parameter.

The processing of FIG. 17 will be explained in more detail. First, in S700, the initial candidates of the values of "a", ZMPrecpeaka and ZMPrecpeakb, which are search objects, on the simplified model are provisionally determined. In this case, the initial candidates may be basically arbitrary or they may be determined, for example, on the basis of the values of "a", ZMPrecpeaka and ZMPrecpeakb or the like that have been finally determined when creating a last time gait.

Subsequently, the loop processing of S704 to S714 is carried out. The processing will be schematically explained. First, in S704, a current time's gait (provisional current time's gait) is calculated using the current candidate values of "a", ZMPrecpeaka, and ZMPrecpeakb, which are search objects, and the simplified model. More specifically, the provisional current time's gait is calculated using a current time's gait parameter composed of a ZMP trajectory parameter that has been corrected on the basis of the current value of the ZMP correcting parameter "a", the current values of ZMPrecpeaka and ZMPrecpeakb, and parameters other than the ZMP trajectory parameter determined in S026 (a foot trajectory parameter, a floor reaction force vertical component trajectory parameter, etc.), and the simplified model. More specific processing of S704 will be discussed hereinafter.

Then, in S706 to S716, the difference between the divergence component at the terminating end of the provisional current time's gait calculated in S704 (the time at which the foot of a free leg of the current time's gait is expected to land) and the initial divergence component q" of a normal gait (the component finally calculated in the aforesaid S024), the difference between the body posture angle at the terminating end of the provisional current time's gait and the initial body posture angle of the normal gait (the posture angle lastly calculated in the aforesaid S024), and the difference between the angular velocity of the body posture angle at the terminating end of the provisional current time's gait and the initial body posture angular velocity of the normal gait (the one lastly calculated in the aforesaid in the aforesaid S024) are determined. Then, it is determined whether all the values of these differences satisfy a condition in that they fall within permissible ranges (whether they are in the vicinity of zero), and if they do not satisfy the condition, then the values of the search objects are changed. This is repeated to eventually determine "a", ZMPrecpeaka and ZMPrecpeakb as the corrected values of a gait parameter that allows the provisional current time's gait to connect to the normal gait on the simplified model.

The processing of S706 to S716 will be explained in more detail. In S706, a terminal divergence component q0[k] of the provisional current time's gait is calculated according to the aforesaid definitional expression of divergence components from body position and velocity (Xe, Ve) at the terminating end of the provisional current time's gait.

Subsequently, in S708, the difference between the terminal divergence component q0[k] and the initial divergence component q" of a normal turning gait is determined as a terminal divergence component error errq.

Further, in S710, the difference between the initial body posture angle of the normal gait and the terminal body posture angle of the provisional current time's gait created in S704 is determined as a terminal body posture angle error θberr, and the difference between the initial body posture angular velocity of the normal gait and the terminal body posture angular velocity of the provisional current time's gait created in S704 is determined as a terminal body posture angular velocity error ωberr.

The errors errq, θberr, and ωberr determined as described above indicate a degree of deviation of the provisional current time's gait created in S704 from a boundary condition (a condition in that the current time's gait connects, at its terminating end, to the normal gait).

Subsequently, in S712, it is determined whether all of the errq, θberr, and ωberr determined as described above fall within predetermined permissible ranges in the vicinity of zero, and the discrimination result is YES, then the loop processing of S704 to S716 is terminated. In this case, a current time's gait parameter that includes current candidate values of search objects is obtained as the current time's gait parameter that makes it possible to generate a gait connecting to a normal gait on the simplified model.

Meanwhile, if the discrimination result of S712 is NO, then the candidates of a plurality of (three in the present embodiment) search objects obtained by changing the values of the individual parameters by predetermined extremely small amounts Δa, ΔZMPrecpeaka, and ΔZMPrecpeakb are determined in the vicinity of the candidate values of the current search objects ("a", ZMPrecpeaka, ZMPrecpeakb), and the same processing as that of S704 to S710 is carried out on the basis of the current time's gait parameters, which include the candidates of the individual search objects, to determine a set of errors (errq, θberr, ωberr) associated with each search object candidate.

Subsequently, in S716, the new candidates of the search objects ("a", ZMPrecpeaka, ZMPrecpeakb) are determined by an exploratory technique, such as the steepest descent method or the simplex method, on the basis of the current candidates of the search objects ("a", ZMPrecpeaka, ZMPrecpeakb) and the sets of errors (errq, θberr, ωberr) associated with the candidates of the search objects in the vicinity thereof. Then, the processing from S704 is repeated again.

As described above, the current time's gait parameter is determined in the exploratory manner such that a current time's gait connects to a normal gait, ("a", ZMPrecpeaka, ZMPrecpeakb) being the search objects.

The processing of S704 in the processing of FIG. 17 is implemented by the subroutine processing shown by the flowchart of FIG. 18.

This processing of FIG. 18 is the processing for determining a floor reaction force moment error about a desired ZMP and a translational floor reaction force error and for sequentially creating, in time series, the instantaneous value of a current time's gait (provisional current time's gait) from the start to the end thereof, as with the aforesaid processing of FIG. 13 related to the creation of a normal gait. In this case, the difference from the processing for generating a normal gait in FIG. 13 is only the initial state of the gait and the gait generation period. More specifically, regarding this different aspect, in the processing of FIG. 18, the terminal state of a last time gait (specifically, the terminal state of the current time's gait observed in the supporting leg coordinate system) is set as the initial state of the current time's gait (the provisional current time's gait) in S800 and S818. Further, the period during which the processing of S804 to S812 and the processing of S820 to S828 are carried out is the period from start time (k=0) of the current time's gait to end time Tcurr (the time at which the foot 22 of a free leg of the current time's gait is expected to land) of the current time's gait (refer to S804 and S820). The processing other than this is the same as the processing of FIG. 13. In this case, the processing of S804 to S812 corresponds to the processing of S304 to S312 of FIG. 13, and the processing of S820 to S828 corresponds to the processing of S320 to S328 of FIG. 13. Thus, the processing of S806 and S822 of FIG. 18 is implemented by the aforesaid subroutine processing of FIG. 14, and the processing of S412 of FIG. 14 is implemented by the subroutine processing of FIG. 15. However, in the processing of S806 and S822 in FIG. 18, the processing of S500 is omitted in the processing in FIG. 15, which is the subroutine processing of S412 of FIG. 14. This is because the body inclination angle restoring period of the current time's gait is the period [Ta, Tb] set in S612 of FIG. 16.

In the present embodiment, the provisional current time's gait is generated in S028 as explained above. In this case, as in the case of creating a normal gait, the processing of S800 to S812 of FIG. 18 provisionally creates the current time's gait such that a desired ZMP (a desired ZMP obtained by correcting the desired ZMP defined by a ZMP trajectory parameter determined in S026 by a ZMP correcting parameter "a" provisionally determined in the processing of FIG. 17 (the latest candidate value)) is satisfied and that a floor reaction force horizontal component permissible range (the permissible range defined by the parameters determined in S026) is satisfied on the simplified model from the start to the end of the current time's gait. Then, based on a motion (provisional motion) of the provisionally created gait, the time series of the floor reaction force moment error (floor reaction force moment horizontal component error) Merr_p(k) and the translational floor reaction force error Ferr_p(k), and an initial value (=Merr_p(k)) of a time series of a floor reaction force moment error change amount ΔMerr(k) and an initial value (=Ferr_p(k)) of a time series of a translational floor reaction force error change amount ΔFerr(k) are determined using the simplified model and the semi-full model.

Further, the processing of S814 to S828 in FIG. 18 repeats correcting gaits (creating gaits) by using the latest values of the time series of Merr_p(k) and Ferr_p(k) until the respective characteristic amounts of both the time series of the floor reaction force moment error change amount ΔMerr(k) and the time series of the translational floor reaction force error change amount ΔFerr(k) fall within predetermined permissible ranges and a discrimination result of S816 switches to YES (until the respective characteristic amounts converge to zero). In this case, a gait to be created at an n-th number of times (n=1, 2 . . . ) in the repetition is created such that a floor reaction force moment horizontal component produced about the desired ZMP on the simplified model by a motion of the gait of the n-th number of times becomes −Merr_p(k) (obtained by reversing the sign of the error Merr_p(k) determined at the (n−1)th generation of a gait) and a result obtained by adding Ferr_p(k) (the error Ferr_p(k) determined at the (n−1)th gait generation) to a translational floor reaction force horizontal component produced on the simplified model by the gait of the n-th number of times falls within a floor reaction force horizontal component permissible range related to the current time's gait at each time k of the current time's gait. The gait of the 0-th number of times is the gait created by the processing of S800 to S812.

And, if a discrimination result of S816 is YES, then the processing shown in FIG. 13 is terminated, and the gait lastly created at this point is obtained as a current time's gait (a provisional current time's gait) that should be created in S704 shown in FIG. 17. If a first discrimination result in S816 is YES after the completion of the processing of S800 to S812, then the gait (the gait of the 0-th number of times) created by the processing of S800 to S812 is obtained as a current time's gait (a provisional current time's gait) that should be created in S704 shown in FIG. 17.

Supplementally, in the discrimination processing in S816, ΔMerr(k) and ΔFerr(k) may use the same types of characteristic amounts or may use different types thereof, as in the case of the aforesaid S316. In addition, ΔMerr(k) and ΔFerr(k) do not have to share the same permissible range of a characteristic amounts. Further, as in the case of S316, the discrimination processing of S816 not only discriminates the convergence of ΔMerr(k) and ΔFerr(k) in the repetitive processing of S818 to S828 but the first processing of S816 after the completion of the processing of S800 to S812 also evaluates whether the floor reaction force moment error Merr_p(k) and the translational floor reaction force error Ferr_p(k) related to a gait created by the processing of S800 to S812 are respectively sufficiently small or not (whether the dynamic accuracy of a gait created by the processing of S300 to S312 is adequate or not). Incidentally, these evaluation processing and convergence discrimination processing may be separately carried out, as in the case of S316, and in such a case, the evaluation processing and the convergence discrimination processing may have different types of characteristic amounts or different permissible ranges of characteristic amounts.

A provisional current time's gait lastly generated in S028 as described above will connect to a normal gait while satisfying a desired ZMP and a floor reaction force horizontal component permissible range on a semi-full model by a motion thereof (satisfying a boundary condition of a current time's gait). At this time, the provisional current time's gait is generated on the basis of the dynamics of the simplified model by taking into account the errors Merr_p(k) and Ferr_p(k) of a floor reaction force on the simplified model. Further, the instantaneous value at each time k of the current time's gait is generated by adding corrections based on the Merr_p(k) and Ferr_p(k) at that time. And, the Merr_p(k) and Ferr_p(k) used in this case are the ones in the state wherein the convergence discrimination result in S816 has switched to YES, so that they exhibit high reliability as the ones indicating an error of a floor reaction force produced on the simplified model. This makes it possible to promptly and efficiently determine the gait parameters ("a", ZMPrecpeaka, and ZMPrecpeakb) of the current time's gait in an exploratory manner without causing a motion of the gait to diverge.

Returning to the explanation of FIG. 10, after the processing of S028 is carried out as explained above, the procedure proceeds to S030 wherein the parameters defining a ZMP permissible range and a floor reaction force horizontal component permissible range for full-model correction are determined.

This processing is the same as the processing of S030 of FIG. 13 in the aforesaid publication document 1, so that the explanation thereof will be omitted herein.

The processing up to S018 to S030 explained above is the processing carried out by the aforesaid gait parameter determiner 100a. Supplementally, the time series of Merr_p(k) related to the provisional current time's gait lastly generated in S028 is the aforesaid floor reaction force moment error trajectory (refer to FIG. 5) and the time series of Ferr_p(k) related to the provisional current time's gait is the aforesaid translational floor reaction force error trajectory (refer to FIG. 5).

After the processing of S030 is carried out or if the discrimination result of S016 is NO, then the procedure proceeds to S032 wherein an instantaneous value of the current time's gait is sequentially determined. The subroutine processing of this processing is the same as the aforesaid processing of the flowchart shown in FIG. 14. However, in this case, the values lastly determined in S028 of FIG. 10 described above are used as the values of the time series of Merr_p(k) and Ferr_p(k) used in S412. The processing of S416 and S418 is omitted. The time width (the value of the aforesaid Δk) of the time series of the instantaneous values of the current time's gait is defined as the control cycle Δt of the control unit 60.

Subsequently, the procedure proceeds to S034 wherein the operations of the arm bodies to cancel a spin (the rotation about a vertical axis) of the robot 1 are determined. This processing is for determining the postures of the arm bodies such that a floor reaction force moment in the opposite direction from the vertical component of the floor reaction force moment, which would be generated about a desired ZMP if the robot 1 were operated according to a desired gait without swinging the arms of the robot 1, is generated by the arm swings of the arm bodies (a motion of swinging both arm back and forth in the opposite directions from each other). This is performed in the same manner as that in S034 of FIG. 13 in the aforesaid publication document 1. The details thereof are described in the publication document 1, so that no further explanation will be given herein.

Supplementally, the processing of S412 and S414 in S032 and the processing of S034 are the processing carried out by the aforesaid simplified model gait generator 100c.

Subsequently, the procedure proceeds to S036 wherein the instantaneous value of the ZMP permissible range and the instantaneous value of the floor reaction force horizontal component permissible range for full-model correction (for the processing of the aforesaid full-model corrector 100e) are determined. In this processing, they are determined on the basis of the gait parameter that defines the ZMP permissible range and the floor reaction force horizontal component permissible range determined in S030 described above.

Supplementally, the processing of S032 to S036 (excluding the processing of S412 and S414 in S032 and the processing of S034) is the processing carried out by the aforesaid desired instantaneous value generator 100b.

Subsequently, the procedure proceeds to S038 wherein a corrected gait using the full model is generated. This processing is the processing carried out by the aforesaid full-model corrector 100c. In this case, the processing is the same as the processing of S038 of FIG. 13 in the aforesaid publication document 1, and it is carried out exactly as described in the publication document 1. Hence, detailed explanation will be omitted in the present description. This processing determines corrected desired body position/posture obtained by further correcting desired body position/posture (the body position/posture of the aforesaid displacement-dimension corrected gait) and a corrected desired floor reaction force moment.

The above is the gait generation processing of the gait generating device 100 in the present embodiment.

Here, the correspondence relationship between the gait generation processing of the gait generating device 100 in the present embodiment and the present invention will be explained.

The present embodiment is an embodiment of the first invention, the third invention, the fifth invention, the sixth invention, the ninth invention, the thirteenth invention, and the fifteenth invention described above. In this case, the normal gait lastly generated in the processing of S024 in FIG. 10 or the current time's gait lastly generated in S028 in FIG. 10 corresponds to the desired gait in the aforesaid inventions. And, the processing of S300 to S312 in FIG. 13 or the processing of S800 to S812 in FIG. 18 corresponds to the provisional desired motion creating means in the aforesaid inventions, and a motion of a gait created by these processing corresponds to a provisional motion. Further, S306 and S322 in FIG. 13 or the processing of S415 to S418 in FIG. 14 carried out in the processing of S806 and S822 in FIG. 18 correspond to the floor reaction force error calculating means in the aforesaid inventions. In addition, the first processing in S316 after the processing of S300 to S312 in FIG. 13 or the first processing in S816 after the processing of S800 to S812 in FIG. 18 corresponds to the evaluating means in the aforesaid inventions. Further, the repetitive processing of S316 to S328 in FIG. 13 or the repetitive processing of S816 to S828 in FIG. 18 corresponds to the desired motion determining means in the aforesaid inventions. In this case, the discrimination processing in S316 or S816, excluding the first discrimination processing in S316 or the first discrimination processing in S816, corresponds to the convergence discrimination processing in the desired motion determining means, and the processing in S322 or the processing in S822 corresponds to the processing for determining a corrected motion. Incidentally, the first floor reaction force component and the second floor reaction force component in the third invention correspond to the floor reaction force moment horizontal component and the translational floor reaction force horizontal component, respectively, of the present embodiment. And, in the present embodiment, the case where the aforesaid expression 3a is used by the processing in S415 in FIG. 14 provides an embodiment of the ninth invention.

The operation of the composite-compliance control unit 101 will now be explained with reference to FIG. 4. Incidentally, the operation of the composite-compliance control unit 101 is described in detail in Japanese Unexamined Patent Application Publication No. H10-277969 and the like previously applied by the present applicant; therefore, only schematic explanation will be given in the present description. In the gait generating device 100, the corrected desired body position/posture (trajectory) and the desired arm posture (trajectory) out of the desired gait generated as described above are sent out to a robot geometric model (inverse kinematics calculator) 102.

Further, the desired foot position/posture (trajectory), the desired ZMP trajectory (the desired total floor reaction force central point trajectory), and the desired total floor reaction force (trajectory)(the corrected desired floor reaction force moment and the desired floor reaction force vertical component) are sent to a composite-compliance operation determiner 104 and also to a desired floor reaction force distributor 106. Then, in the desired floor reaction force distributor 106, the floor reaction force is distributed to each foot 22 and the desired floor reaction force central point of each foot and the desired floor reaction force of each foot are determined. The determined desired floor reaction force central point of each foot and the desired floor reaction force of each foot are sent to the composite-compliance operation determiner 104.

Corrected desired foot position/posture (trajectory) with deformation compensation is sent from the composite-compliance operation determiner 104 to the robot geometric model 102. Upon receipt of the desired body position/posture (trajectory) and the corrected desired foot position/posture (trajectory) with deformation compensation, the robot geometric model 102 calculates the joint displacement commands (values) of the twelve joints of the leg bodies 2, 2 that satisfy them and sends them to a displacement controller 108. The displacement controller 108 carries out follow-up control of the displacements of the twelve joints of the robot 1, using the joint displacement commands (values) calculated by the robot geometric model 102 as the desired values. Further, the robot geometric model 102 calculates the displacement commands (values) of arm joints that satisfy desired arm postures and sends them to the displacement controller 108. The displacement controller 108 carries out follow-up control of the displacements of the twelve joints of the arm bodies of the robot 1, using the joint displacement commands (values) calculated by the robot geometric model 102 as the desired values.

The floor reaction forces (specifically, the actual floor reaction force of each foot) generated in the robot 1 are detected by the six-axis force sensor 50. The detected values are sent to the aforesaid composite-compliance operation determiner 104. Further, the posture inclination errors θerrx and θerry (specifically, the errors of actual posture angles relative to the desired body posture angle, the posture angle error in the roll direction (about the X-axis) being denoted by θerrx and the posture angle error in the pitch direction (about the Y-axis) being denoted by θerry) produced in the robot 1 are detected through the intermediary of the posture sensor 54, and the detected values are sent to a posture stabilization control calculator 112. The posture stabilization control calculator 112 calculates the compensating total floor reaction force moment about the desired total floor reaction force central point (the desired ZMP) for restoring the body posture angle of the robot 1 to the desired body posture angle and the calculation result is sent to the composite-compliance operation determiner 104. The composite-compliance operation determiner 104 corrects the desired floor reaction force on the basis of the input value. To be specific, the desired floor reaction force is corrected such that the compensating total floor reaction force moment or the sum of the compensating total floor reaction force moment and the corrected desired floor reaction force moment acts about the desired total floor reaction force central point (the desired ZMP).

The composite-compliance operation determiner 104 determines the aforesaid corrected desired foot position/posture (trajectory) with deformation compensation so as to make the states of the actual robot and the floor reaction force calculated from sensor-detected values and the like coincide with the desired floor reaction force that has been corrected. In this case, the corrected desired foot position/posture with deformation compensation considers the mechanical deformation of the aforesaid compliance mechanism 72 or the like. However, it is virtually impossible to make all states agree with desired values, so that a trade-off relationship is imparted among them to make them compromisingly agree as much as possible. More specifically, a control error for each desired value is weighted in conducting control so that the weighted average of the control error (or the square of the control error) is minimized. Thus, actual foot position/posture and total floor reaction force are controlled so as to approximately follow the desired foot position/posture and the desired total floor reaction force.

Several modifications of the embodiment explained above will now be explained. The modifications explained below are applicable to cases where either normal gaits or current time's gaits are generated.

In the aforesaid embodiment, a body acceleration and a body posture angular acceleration have been determined (and eventually a desired gait (a normal gait or a current time's gait) has been determined) such that a floor reaction force moment about a desired ZMP becomes a floor reaction force moment horizontal component $-Merr\_p(k)$ obtained by subtracting a current value $Merr\_p(k)$ of a floor reaction force moment error from an original desired floor reaction force moment horizontal component ($=0$) ($=Msemifull(k)-Msmpl(k)$) on a simplified model at each time k from the beginning to the end of a gait (a normal gait or a current time's gait), and a result obtained by adding a current value $Ferr\_p(k)$ of a translational floor reaction force error ($=Fsemifull(k)-Fsmpl(k)$) to a translational floor reaction force component produced on the simplified model by a motion of a gait to be determined falls within a floor reaction force horizontal component permissible range.

However, if $Merr\_p(k)$ and $Ferr\_p(k)$ are updated according to expressions 10a and 10b given below in S310 and S326 in FIG. 13 or in S810 and S826 in FIG. 18 to create a new gait in S322 in FIG. 13 or S822 in FIG. 18, then the updated $Merr\_p(k)$ and $Ferr\_p(k)$ (these corresponding to the floor reaction force correction amounts in the present invention) may be used in place of a floor reaction force moment error and a translational floor reaction force error.

$$Merr\_p(k)=Merr\_p(k)+p*\Delta Merr(k) \quad \text{Expression 10a}$$

$$Ferr\_p(k)=Ferr\_p(k)+p*\Delta Ferr(k) \quad \text{Expression 10b}$$

In these expressions 10a and 10b, p denotes a predetermined coefficient of 1 or less but 0 or more.

More specifically, a body acceleration and a body posture angular acceleration may be determined such that a floor reaction force moment horizontal component produced about a desired ZMP on the simplified model by a motion of a gait (desired gait) that includes the body horizontal acceleration and a body posture angular acceleration to be determined becomes a floor reaction force moment horizontal component $-Merr\_p(k)$ obtained by subtracting the correction amount $Merr\_p(k)$ determined by expression 10a from an original desired floor reaction force moment horizontal component ($=0$), and a translational floor reaction force horizontal component obtained by adding the correction amount $Ferr\_p(k)$ determined by expression 10b to a floor reaction force horizontal component Fx produced on the simplified model by a motion of a gait (desired gait) that includes the body horizontal acceleration and the body posture angular acceleration to be determined satisfies a floor reaction force horizontal component permissible range. Incidentally, the floor reaction force moment horizontal component produced about a desired ZMP on the simplified model becoming the floor reaction force moment horizontal component $-Merr\_p(k)$ obtained by subtracting the correction amount $Merr\_p(k)$ determined by expression 1a from the original desired floor reaction force moment horizontal component ($=0$) means determining a motion of a gait such that a floor reaction force moment horizontal component obtained by adding the correction amount Merr_p(k) to a floor reaction force moment horizontal component produced about a desired ZMP on the simplified model by the motion of the gait to be determined agrees with the original desired floor reaction force moment horizontal component.

If the correction amounts Merr_p(k) and Ferr_p(k) are updated by expressions 10a and 10b as described above, then ΔMerr(k) and ΔFerr(k) may be said to mean the differences between the correction amounts Merr_p(k) and Ferr_p(k) used to correct a floor reaction force produced on the simplified model each time a gait is created and an error of a floor reaction force of a created gait in the loop processing of S314 to S328 in FIG. 13 or the loop processing of S814 to S828 in FIG. 18.

In other words, if the differences are close to zero, then it means that the floor reaction forces Merr_p(k) and Ferr_p(k) used to correct the floor reaction force produced on the simplified model have been appropriate.

Supplementally, setting the value of the aforesaid coefficient p to 1 makes it substantially the same as the aforesaid embodiment. Further, Further, after the completion of the processing of S300 to S312 in FIG. 13, the first discrimination processing in S316 before carrying out the processing of S318 to S328 in FIG. 13 may be omitted. More specifically, the processing of S318 to S328 may be always carried out once after the processing of S300 to S312 in FIG. 13. Similarly, after the completion of the processing of S800 to S812 in FIG. 18, the first discrimination processing in S816 before carrying out the processing of S818 to S828 in FIG. 18 may be omitted and the processing of S818 to S828 may be always carried out once. An embodiment with such an arrangement (hereinafter referred to as a second embodiment) provides an embodiment of the second invention, the fourth invention, the fifth invention, the sixth invention, the tenth invention, the fourteenth invention, and the sixteenth invention. The relationship of correspondence between these inventions and the second embodiment in this case is the same as the relationship of correspondence between the embodiment described above (the embodiment explained first in the present description (hereinafter referred to as the first embodiment)) and the first invention or the third invention or the like except for the evaluating means (the evaluating means being not provided in the second embodiment).

Updating Merr_p(k) or Ferr_p(k) by expressions 10a and 10b and correcting a gait as described above may be applied to the aforesaid second embodiment.

Further, in the first embodiment or the second embodiment described above, to perform the convergence discrimination of ΔMerr(k) and ΔFerr(k) in S316 of FIG. 13 or S816 of FIG. 18, it has been discriminated whether or not the predetermined characteristic amounts of the time series thereof fall within the permissible ranges; alternatively, however, the convergence discrimination may be accomplished by determining whether or not the number of repetitions of the processing of S318 to S328 of FIG. 13 or the processing of S818 to S828 of FIG. 18 has reached a predetermined number of times (multiple times). More specifically, repeating the processing of S318 to S328 of FIG. 13 or the processing of S818 to S828 of FIG. 18 a certain number of times normally causes the characteristic amounts of the time series of ΔMerr(k) and ΔFerr(k) to converge to the vicinity of zero. Hence, the convergence discrimination of ΔMerr(k) and ΔFerr(k) may be accomplished on the basis of the number of repetitions as mentioned above. Alternatively, the convergence discrimination of ΔMerr(k) and ΔFerr(k) may be accomplished on the basis of a difference between a motion of a gait generated at each gait generation and a motion of a gait generated last time (e.g., a difference in the position/posture of a certain portion, such as a body).

Further, in the aforesaid embodiments, the error Merr_p(k) related to the floor reaction force moment horizontal component about the desired ZMP has been used; alternatively, however, a point of action different from the point of a desired ZMP may be set, and an error (denoted by Merr_p' (k) here) related to a floor reaction force moment horizontal component about the point of action may be used. In this case, in the processing of S412 in FIG. 14, determining the body horizontal acceleration and the body posture angular acceleration such that a value obtained by subtracting the error Merr_p' (k) from the desired value of a floor reaction force moment horizontal component about the point of action (the desired value that causes the floor reaction force moment horizontal component about the desired ZMP to become zero) is produced will be equivalent to determining the body horizontal acceleration and the body posture angular acceleration (eventually determining the instantaneous value of a motion of a desired gait) such that −Merr_p(k) is produced about the desired ZMP.

Further, the explanation has been given, taking the case where running of the robot 1 is performed as an example in the embodiments described above; however, the present invention can be applied also to a case where walking of the robot 1 is performed. In this case, the floor reaction force vertical component trajectory (or a parameter defining it) may be set as shown in, for example, FIG. 40 in the aforesaid publication document 1. The body inclination angle restoring period may be set to, for example, the two-leg supporting period. Alternatively, if the friction coefficient of a floor assumed in generating a gait is large and the floor reaction force horizontal component permissible range is sufficiently wide over the whole period of one step of the gait (if a translational floor reaction force horizontal component produced by a motion of the gait to be generated will securely fall within the floor reaction force horizontal component permissible range), then the whole period may be set to the body inclination angle restoring period. Incidentally, in this case, a body inclination restoring moment ZMP-converted value may be zero.

Further, in the aforesaid embodiments, the floor reaction force moment error Merr_p(k) has been used. The value obtained by dividing the Merr_p(k) by a desired floor reaction force vertical component at each time k of a gait will correspond to the amount of deviation (error) of the ZMP at time k (the point on a floor surface at which the moment horizontal component of the resultant force of the inertial force produced by a motion of a gait of the robot 1 and the gravity becomes zero) from a desired ZMP. Hence, the error of a ZMP from a desired ZMP (this is defined as the ZMP error ZMPerr_p(k) here) may be used in place of the floor reaction force moment error Merr_p(k). In this case, in the processing of S412 in FIG. 14, determining the body horizontal acceleration and the body posture angular acceleration such that the horizontal component of a floor reaction force moment acting, due to the resultant force of the inertial force produced by a motion of a gait of the robot 1 and the gravity, about a point shifted in the opposite direction from a desired ZMP by a ZMP error ZMPerr_p(k) (the value obtained by converting Merr_p(k) into the amount of deviation of a ZMP from a desired ZMP) or by a value obtained by multiplying the ZMP error ZMPerr_p(k) by a predetermined coefficient (e.g., a positive number of 1 or less) (the point whose position has been shifted from the desired ZMP by −ZMPerr_p(k) or the point whose position has been shifted from the desired ZMP by the value resulting from multiplying −ZMPerr_p(k) by a predetermined coefficient) becomes zero will be equivalent to determining the body horizontal acceleration and the body posture angular acceleration (eventually determining an instantaneous value of a motion of a desired gait) such that −Merr_p(k) or a floor reaction force moment horizontal component obtained by multiplying −Merr_p(k) by a predetermined coefficient is produced about the desired ZMP. This is equivalent to determining the body horizontal acceleration and the body posture angular acceleration (eventually determining an instantaneous value of a motion of a desired gait) such that the result obtained by adding ZMPerr_p(k) or the value obtained by multiplying ZMPerr_p(k) by a predetermined coefficient to the position of ZMP calculated on the simplified model from a motion of the gait to be created agrees with the position of a desired ZMP.

Using the error ZMPerr_p(k) in place of Merr_p(k) in the aforesaid embodiments constitutes an embodiment of the seventh invention, the eighth invention, the eleventh invention, the twelfth invention, the seventeenth invention, and the eighteenth invention described above. In this case, to be more specific, in the first embodiment, in the processing of S306 and S322 in FIG. 13 or S806 and S822 in FIG. 18, Merr(k) determined in S418 in FIG. 14 may be divided by an instantaneous value of a floor reaction force vertical component at the appropriate time k and the result may be determined as a new ZMP error ZMPerr_p(k). At this time, in S414 of FIG. 14, if the floor reaction force moment Msmpl(k) produced about the desired ZMP on the simplified model is calculated by actual computing of the simplified model, then the error ZMPerr_p(k) determined as described above means the difference between the ZMP calculated on a semi-full model from a motion of a gait that is being created by the processing of S306 and S322 in FIG. 13 or S806 and S822 in FIG. 18 and the ZMP calculated on the simplified model from the motion. Further, in S308 and S324 or S808 and S824, at each time k, a difference between a newly determined ZMP error and a ZMP error determined when a gait immediately preceding it was generated may be determined as a ZMP error change amount ΔZMPerr(k), and this may be used in place of ΔMerr for the discrimination processing in S316 or S816. This constitutes an embodiment of the seventh invention and the seventeenth invention (hereinafter referred to as the third embodiment).

Further, in this third embodiment, as with the aforesaid second embodiment, omitting the first discrimination processing in S316 before carrying out the processing of S318 to S328 in FIG. 13 after the completion of the processing of S300 to S312 in FIG. 13, or omitting the first discrimination processing in S816 before carrying out the processing of S818 to S828 in FIG. 18 after the completion of the processing of S800 to S812 in FIG. 18 constitutes an embodiment of the eighth invention and the eighteenth invention (hereinafter referred to as a fourth embodiment).

Further, in the third embodiment or the fourth embodiment mentioned above, in S414 of FIG. 14, if the floor reaction force moment Msmpl(k) produced about a desired ZMP on the simplified model is calculated as a difference between a desired value (=0) of a floor reaction force moment horizontal component about a desired ZMP and Merr_p(k) according to the aforesaid expression 3a, then the error ZMPerr_p(k) determined as described above will mean a difference between a ZMP calculated on a semi-full model from a motion (provisional motion) of a gait that is being created by the processing in S306 and S322 of FIG. 13 or S806 and S822 of FIG. 18 and a desired ZMP. Hence, the embodiment in this case corresponds to an embodiment of the eleventh invention or the twelfth invention described above.

Using the ZMP error ZMPerr_p(k) in place of Merr_p(k) in the first embodiment or the second embodiment described above constitutes an embodiment of the seventh invention, the eighth invention, the tenth invention, the fifteenth invention, and the sixteenth invention described above. However, when generating a gait having a floating period, a floor reaction force vertical component becomes zero and a ZMP becomes unstable during the floating period, so that it is preferred to use a floor reaction force moment error, as in the aforesaid embodiments. If a walking gait of the robot 1 is generated, no floating period will be involved, so that ZMPerr_p(k) can be used over the whole period of the gait. Further, in place of the ZMP error ZMPerr_p(k) determined as described above, a value obtained by dividing the right side of the aforesaid expression 10a by a floor reaction force vertical component at time k (this corresponding to a ZMP correction amount in the present invention) may be used.

Further, in the first to the fourth embodiments described above, the processing in FIG. 13 or FIG. 18 generates gaits that satisfy a desired ZMP and a floor reaction force horizontal component permissible range from the start to the end thereof, and then generates a gait (a normal gait or a current time's gait), to which corrections of the floor reaction force moment error Merr_p(k) and the translational floor reaction force error Ferr_p(k) have been added, from the start to the end thereof; alternatively, however, the generation of an instantaneous value of a gait that satisfies a desired ZMP and a floor reaction force horizontal component permissible range and the generation of an instantaneous value of a gait to which corrections of the floor reaction force moment error Merr_p(k) and the translational floor reaction force error Ferr_p(k) determined on the basis of a motion (provisional motion) of the gait have been added may be sequentially performed at each time k from the start to the end of the gait.

Further, as previously described, the aforesaid semi-full model may be the same as a full model for full-model correction. In this case, to promptly and efficiently implement the processing for determining a gait parameter in the exploratory manner (the processing of S024 and S028 in FIG. 10), the floor reaction force horizontal component permissible range for a semi-full model is preferably set to be wider than the floor reaction force horizontal component permissible range for a full model.

Further, in the first to the fourth embodiments described above, only the permissible range of the translational floor reaction force horizontal component about a desired ZMP has been set, excluding the processing for correcting a gait by the full model; alternatively, however, the permissible range of a floor reaction force moment vertical component about the desired ZMP may be also set in order to prevent the robot 1 from spinning. In this case, regarding a floor reaction force moment error, an error of a floor reaction force moment vertical component may be also determined instead of determining only an error of a floor reaction force moment horizontal component on a motion of a gait created on the simplified model such that the desired ZMP, the floor reaction force horizontal component permissible range, and the permissible range of a floor reaction force moment vertical component are satisfied, and then a motion of a desired gait may be generated such that the moment composed of a floor reaction force moment vertical component produced on the simplified model and an error relative to the vertical component satisfies the permissible range for the vertical component.

Further, in the processing of S306 of FIG. 13 or S806 of FIG. 18, an error of a translational floor reaction force vertical component may be also determined, and then a motion of a desired gait may be generated such that the value composed of a translational floor reaction force vertical component produced on the simplified model and an error thereof satisfies a desired value of the translational floor reaction force vertical component.

INDUSTRIAL APPLICABILITY

As is obvious from the above explanation, the gait generating system for a mobile robot in accordance with the present invention is useful in that it is capable of efficiently generating a gait that makes it possible to prevent slippage and the like of a robot, successfully securing dynamic accuracy between a motion and a floor reaction force of the gait, and generating a gait of a mobile robot intrinsically exhibiting low stability, such as a bipedal mobile robot, in particular, while securing stability of the mobile robot.

BRIEF DESCRIPTION OF THE DRAWINGS

FIG. 12 is a flowchart showing the subroutine processing of FIG. 10.

FIG. 14 is a flowchart showing the subroutine processing of FIG. 13.

Figure 1:
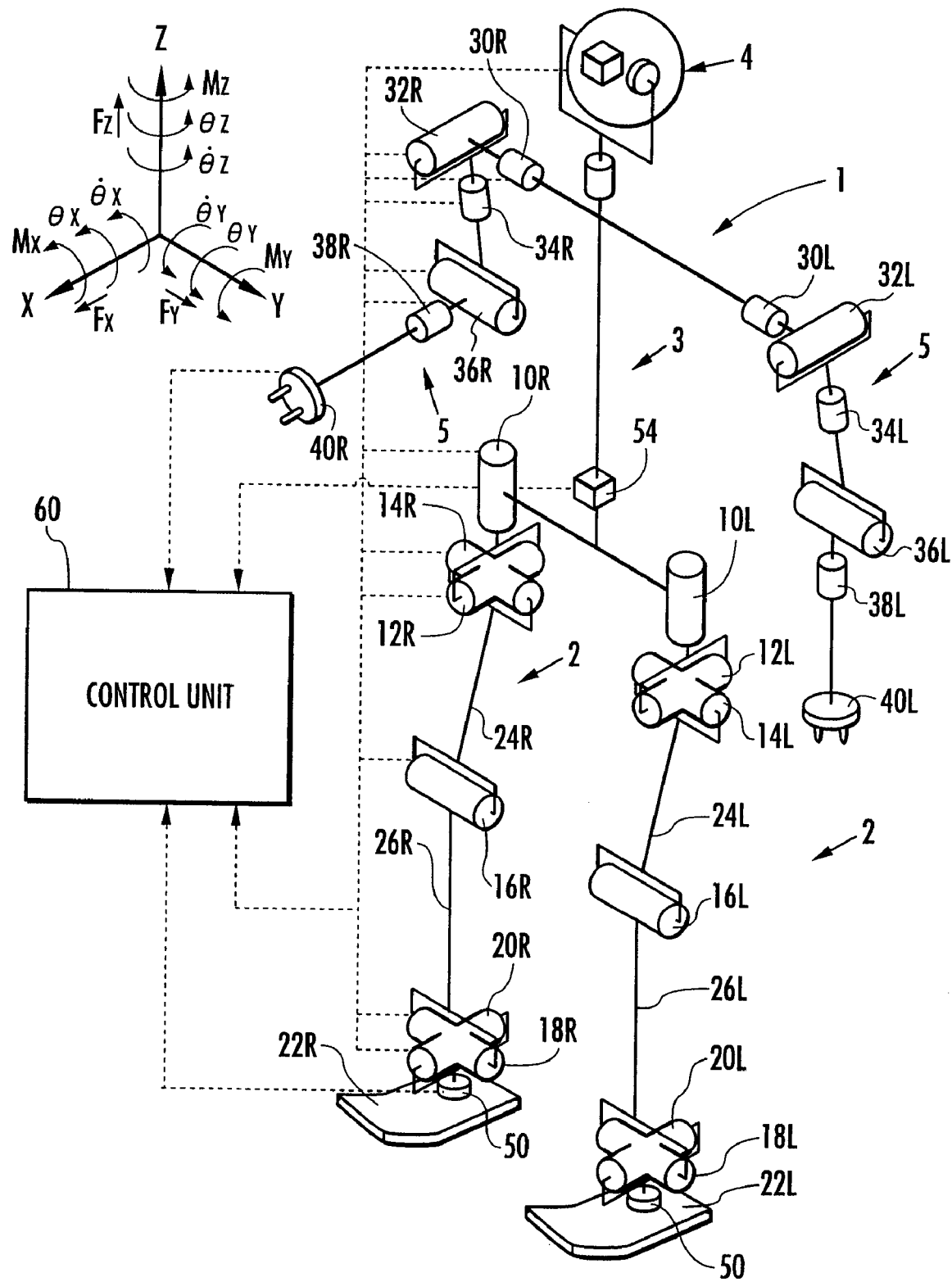
FIG. 1 is a diagram showing the overview of the entire construction of a mobile robot (a bipedal walking robot) to which an embodiment of the present invention is applied.
Figure 2:
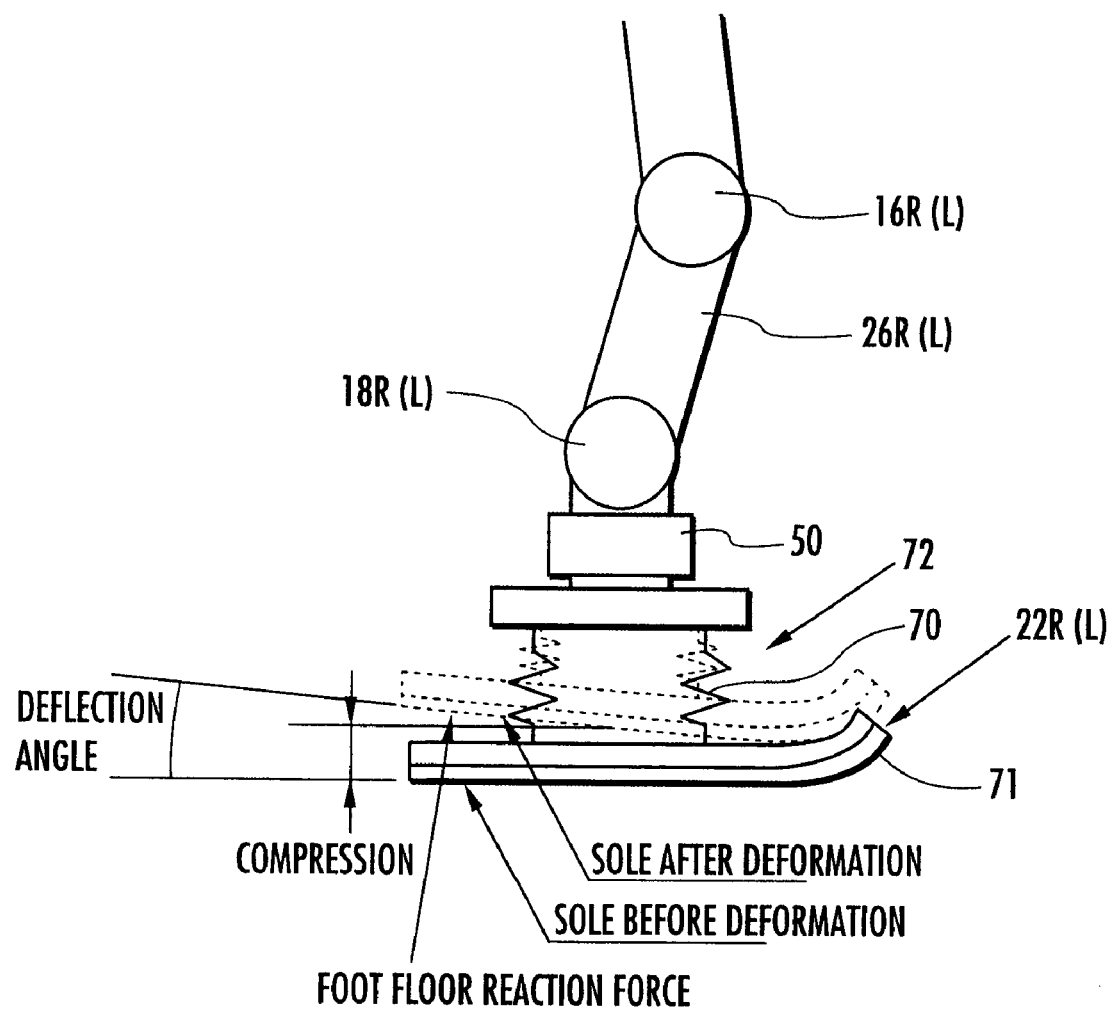
FIG. 2 is a side view showing the construction of a foot portion of each leg body of the robot shown in FIG. 1.
Figure 3:
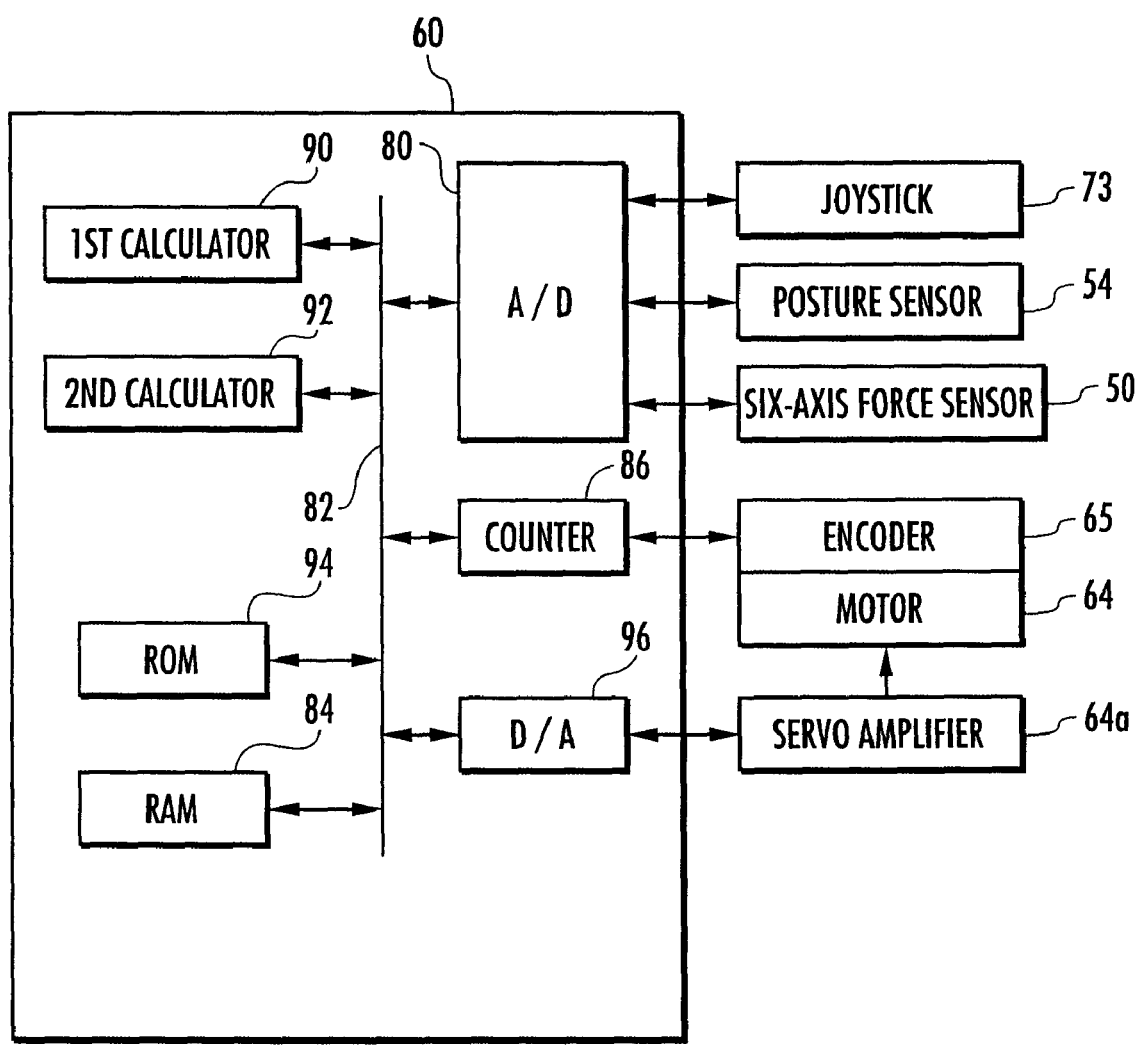
FIG. 3 is a block diagram showing the construction of a control unit provided in the robot shown in FIG. 1.
Figure 4:
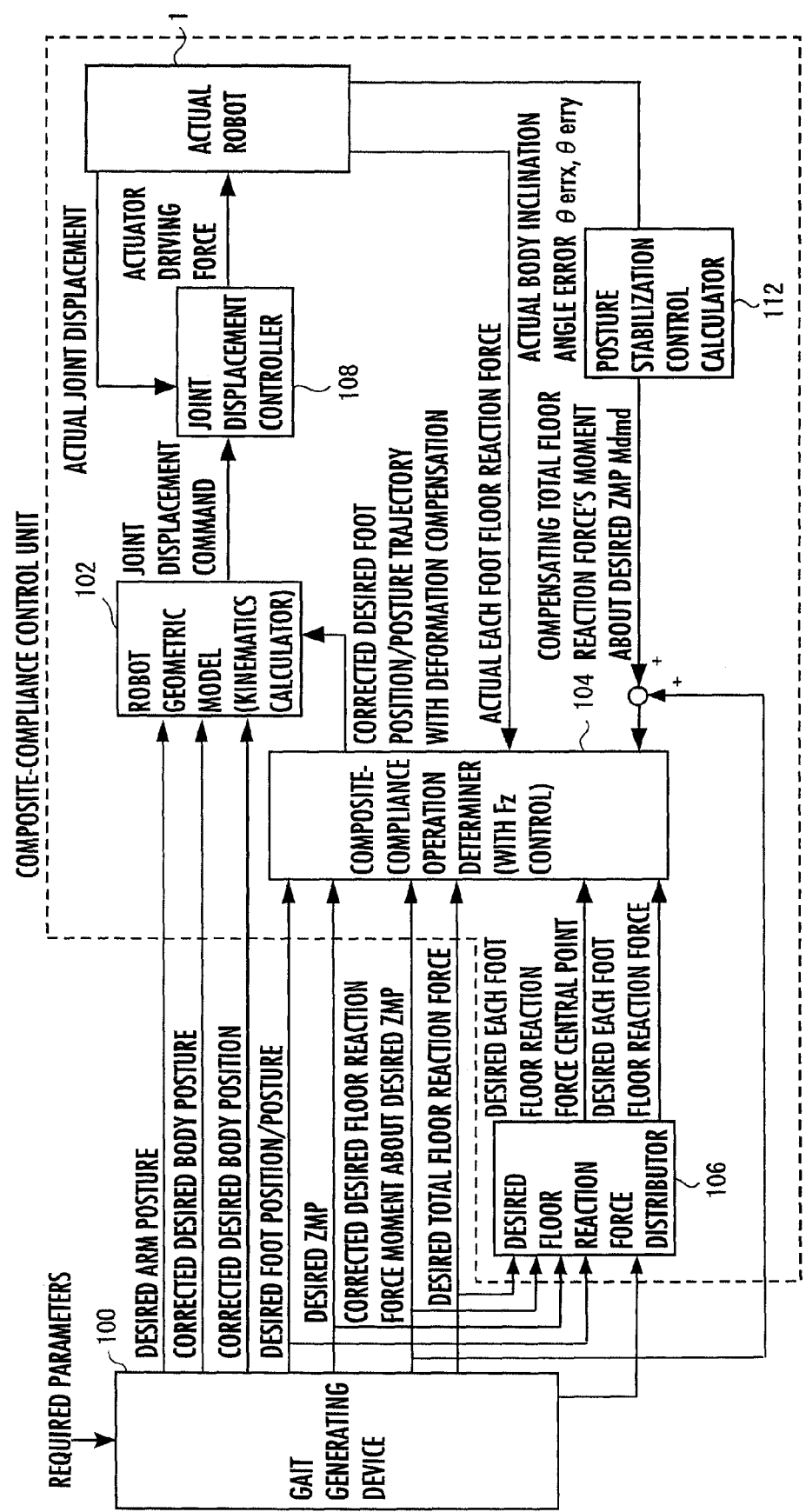
FIG. 4 is a block diagram showing the functional construction of the control unit shown in FIG. 3.
Figure 5:
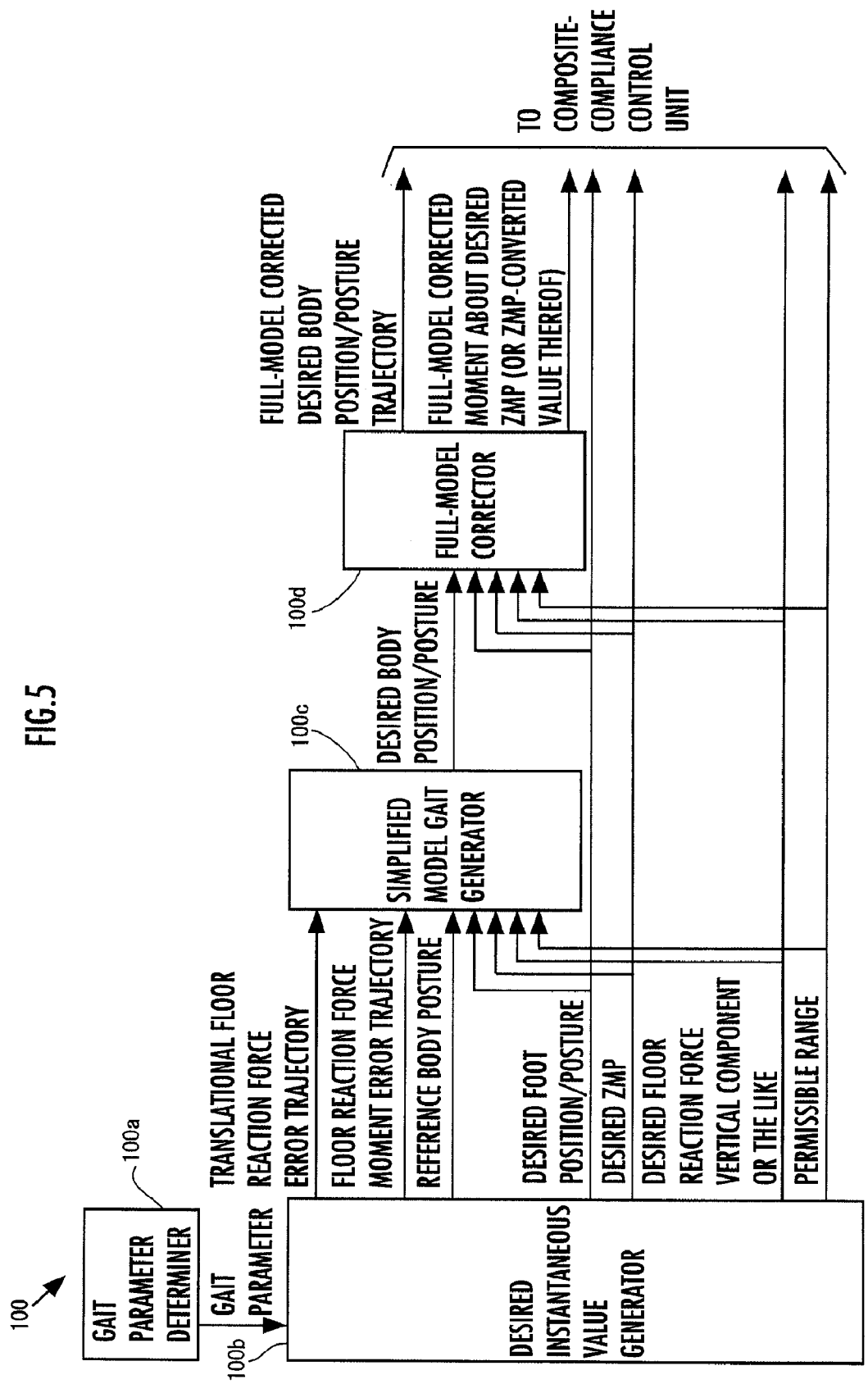
FIG. 5 is a block diagram showing the functions of a gait generating device shown in FIG. 4.
Figure 6A:
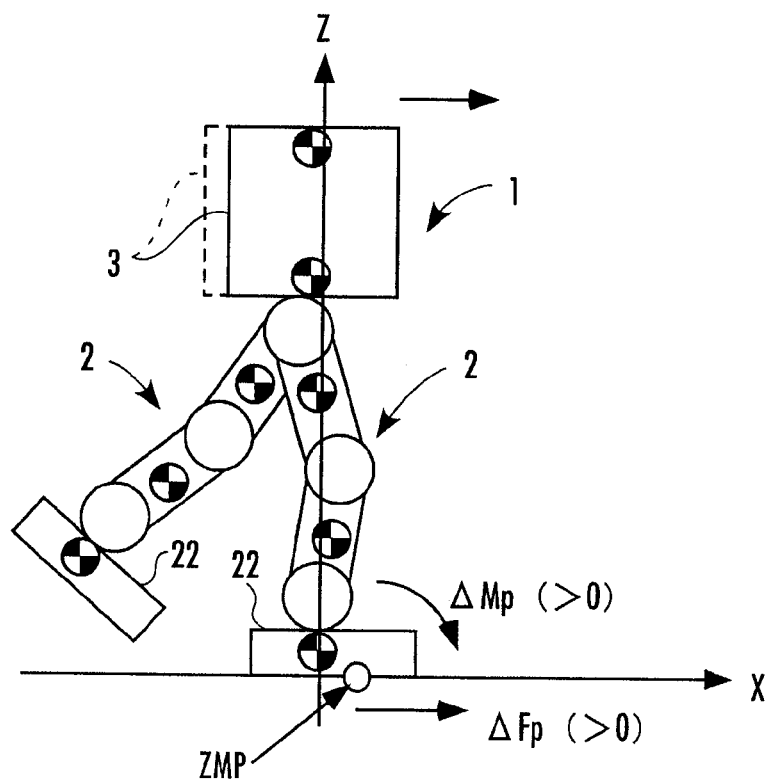
FIGS. 6(a) and (b) are diagrams for explaining the motion modes (a body translational mode and a body rotational mode), respectively, of the robot.
Figure 6B:
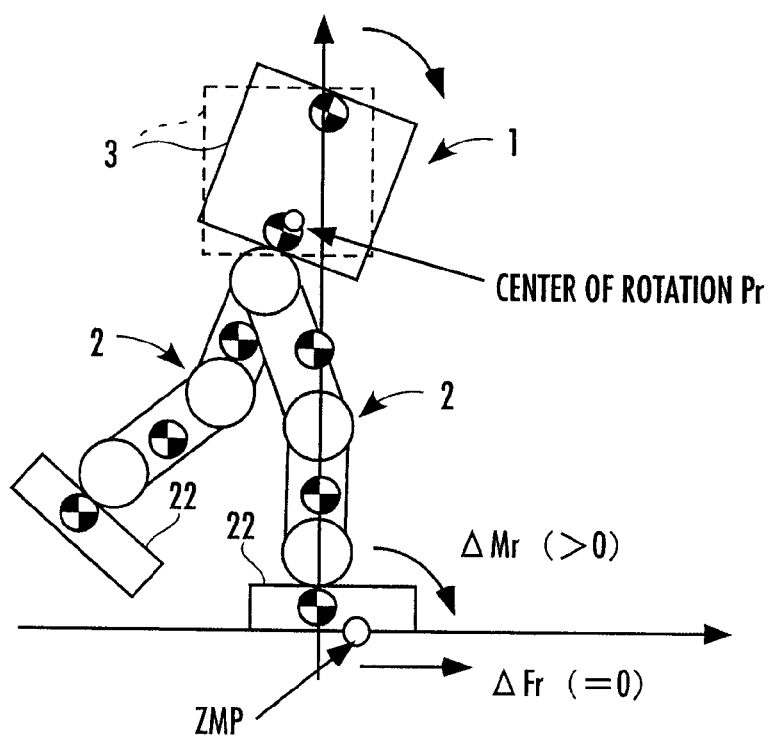
Figure 7:
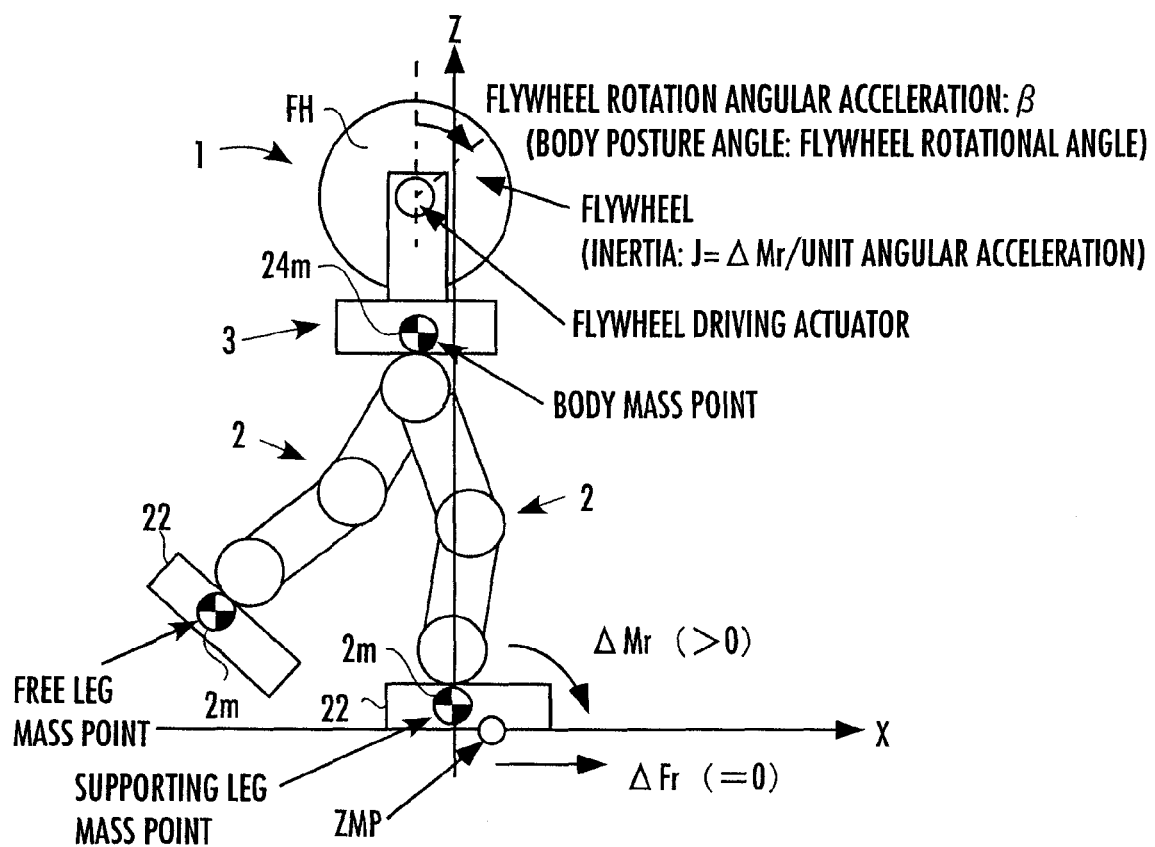
FIG. 7 is a diagram showing the structure of a first dynamic model (simplified model) used for generating gaits.
Figure 8:
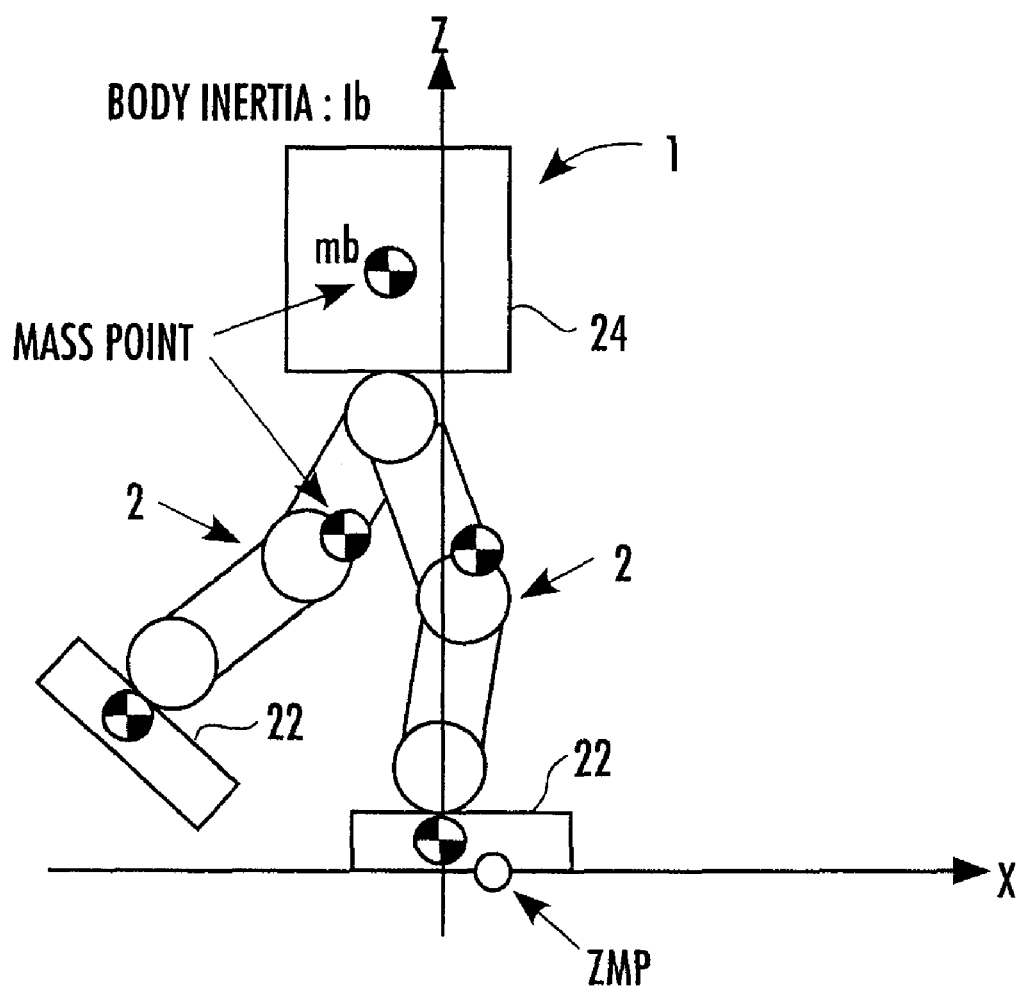
FIG. 8 is a diagram showing the structure of a second dynamic model (semi-full model) used for generating gaits.
Figure 9:
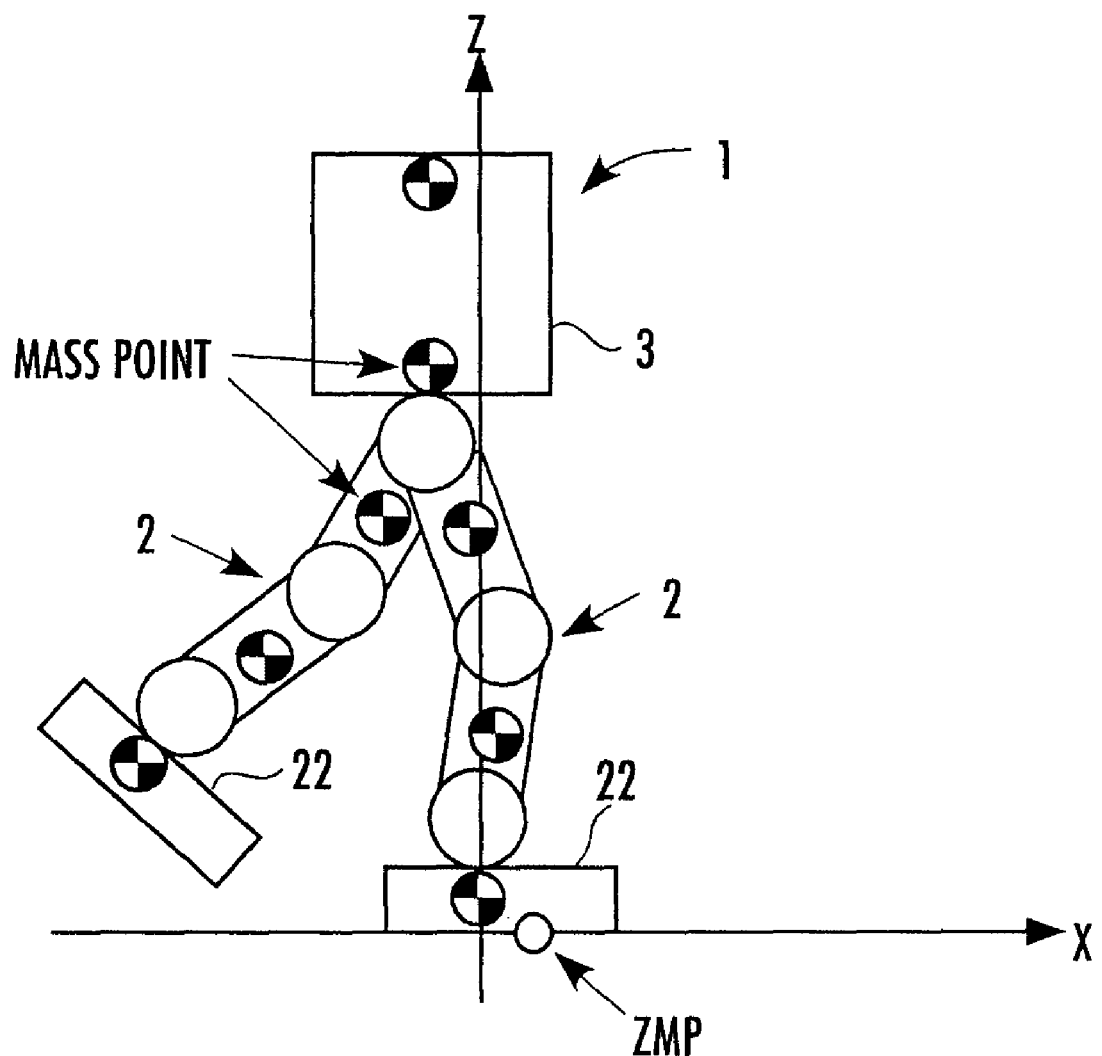
FIG. 9 is a diagram showing the structure of a full model used for generating gaits.
Figure 10:
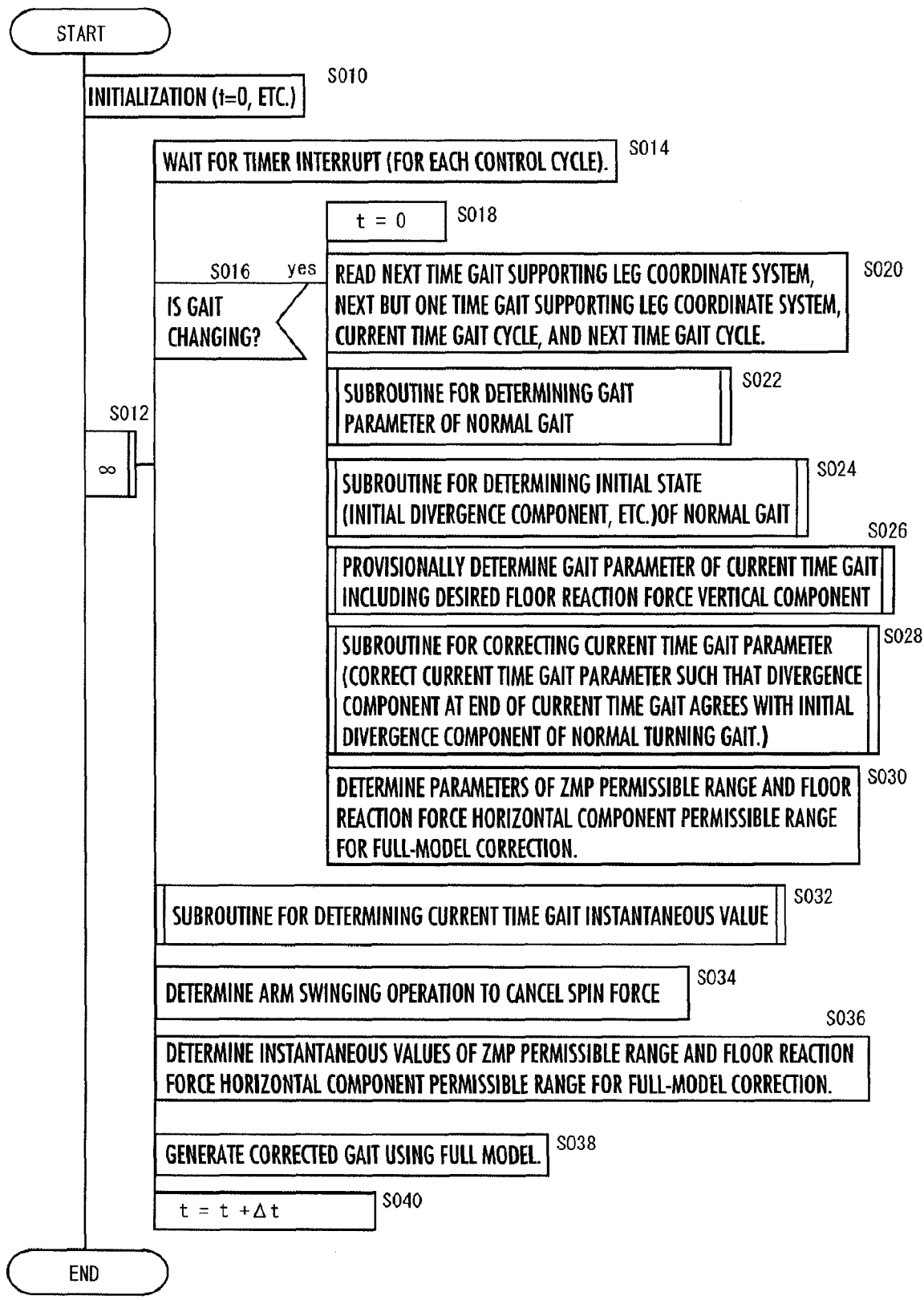
FIG. 10 is a flowchart showing the main routine processing of the gait generating device in the embodiment.
Figure 11:
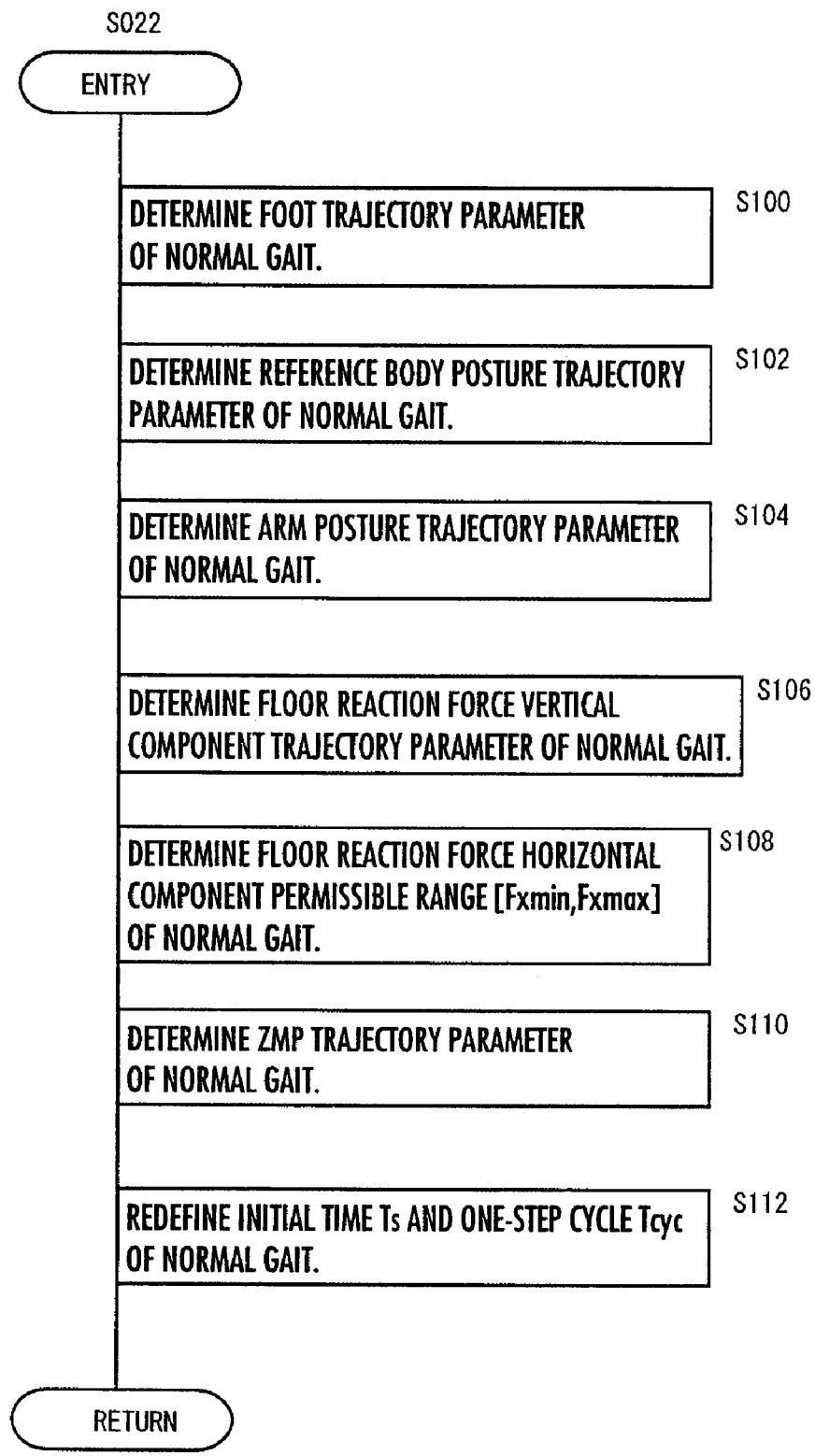
FIG. 11 is a flowchart showing the subroutine processing of FIG. 10.
Figure 13:
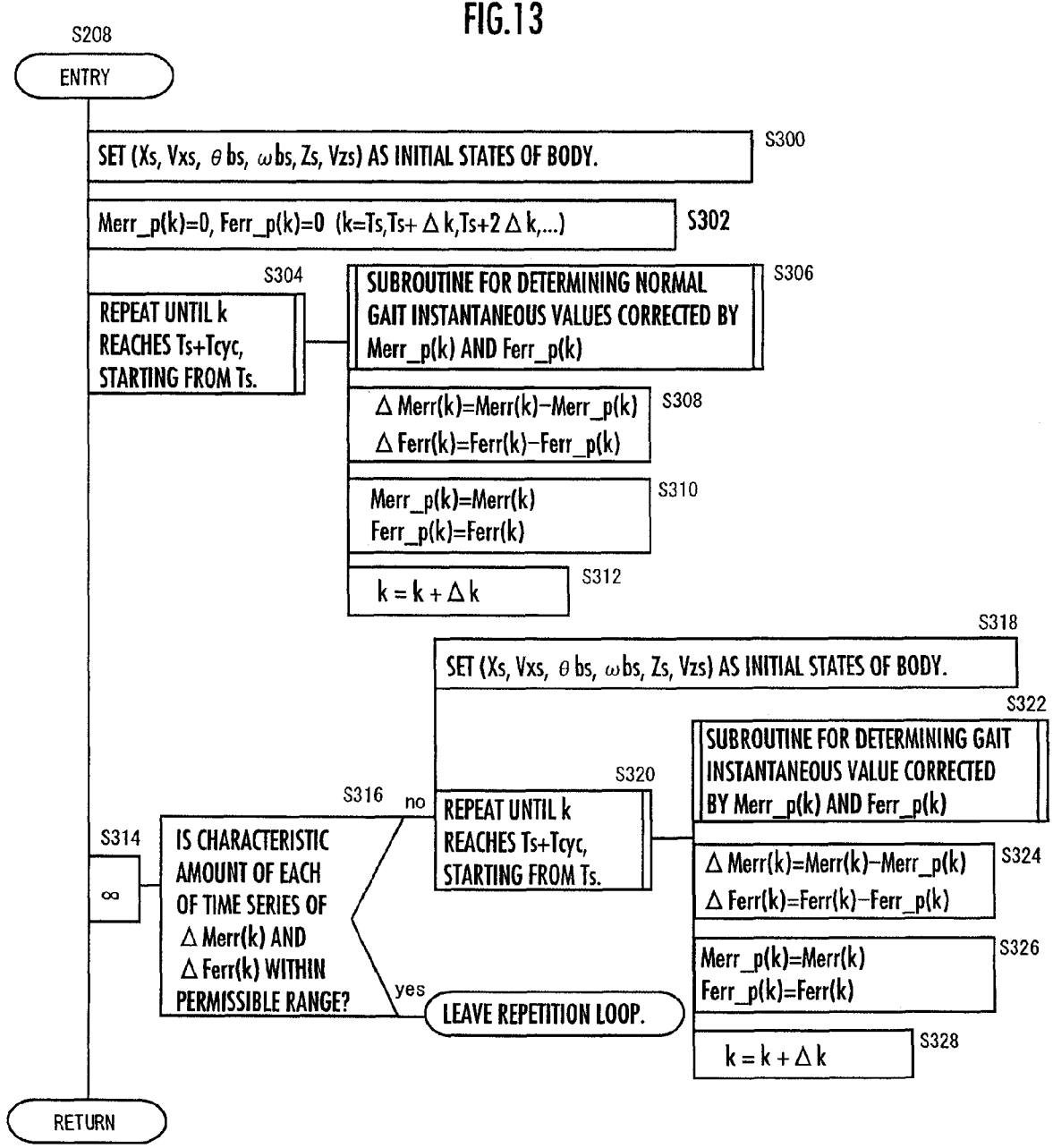
FIG. 13 is a flowchart showing the subroutine processing of FIG. 12.
Figure 15:
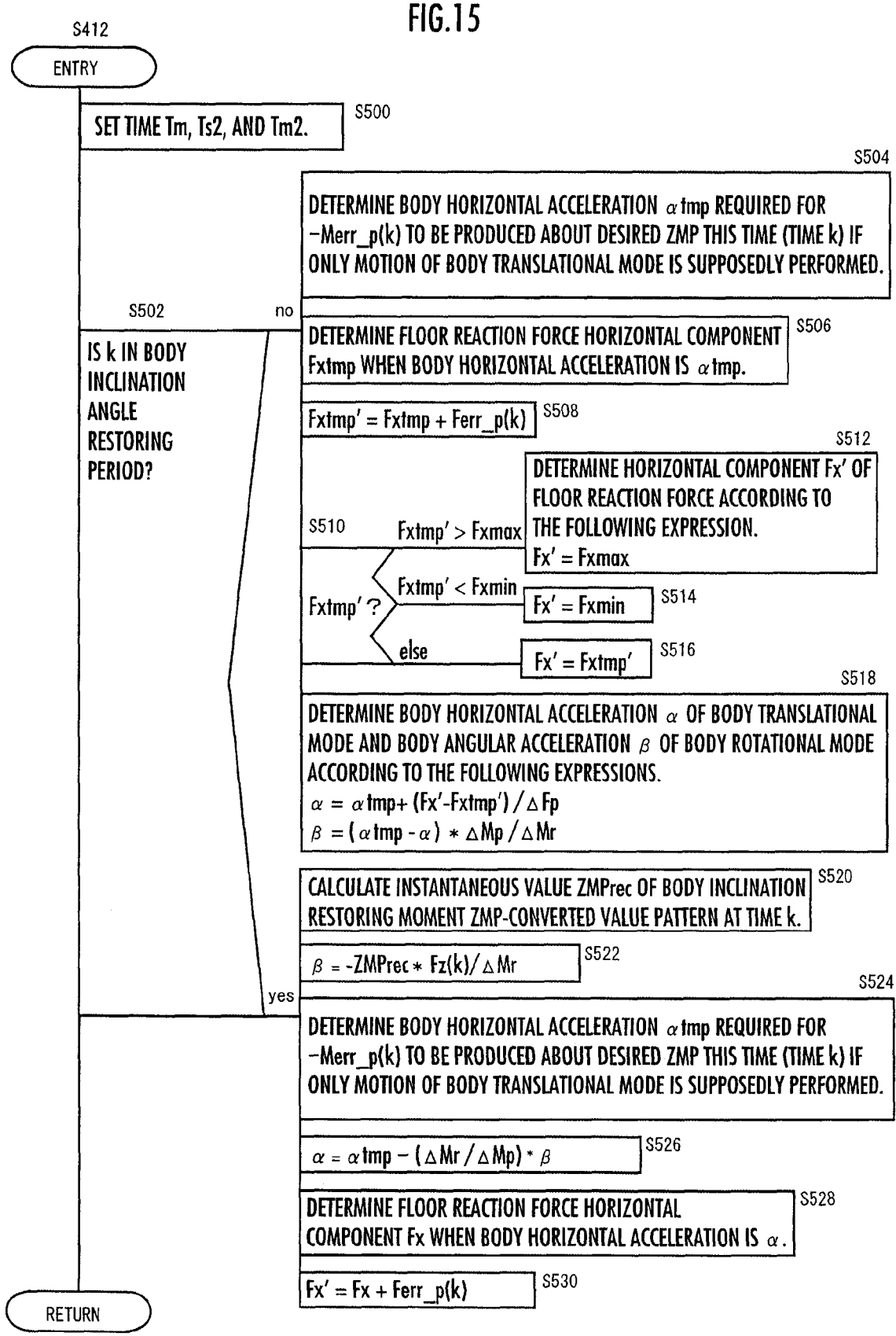
FIG. 15 is a flowchart showing the subroutine processing of FIG. 14.
Figure 16:
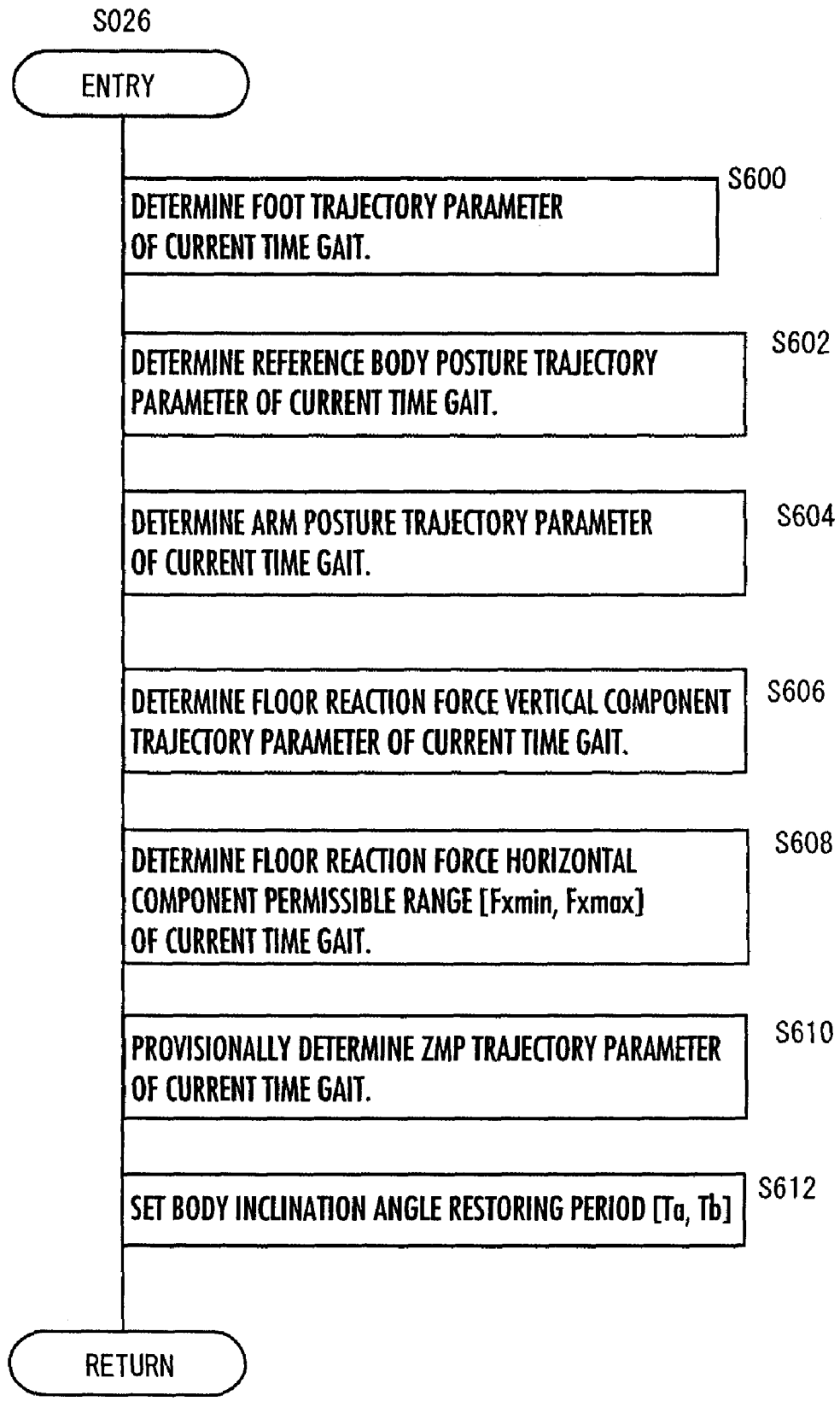
FIG. 16 is a flowchart showing the subroutine processing of FIG. 10.
Figure 17:
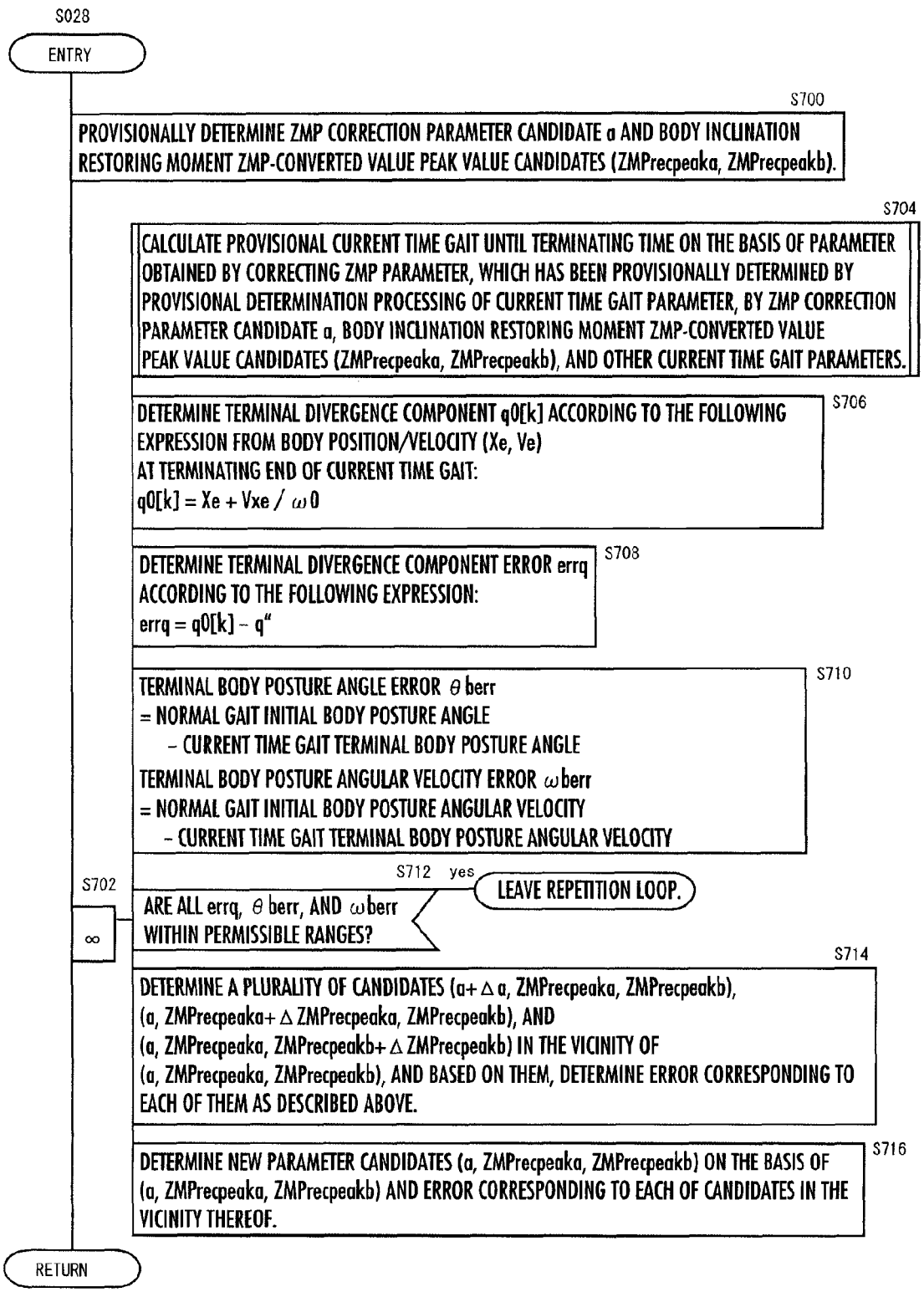
FIG. 17 is a flowchart showing the subroutine processing of FIG. 10.
Figure 18:
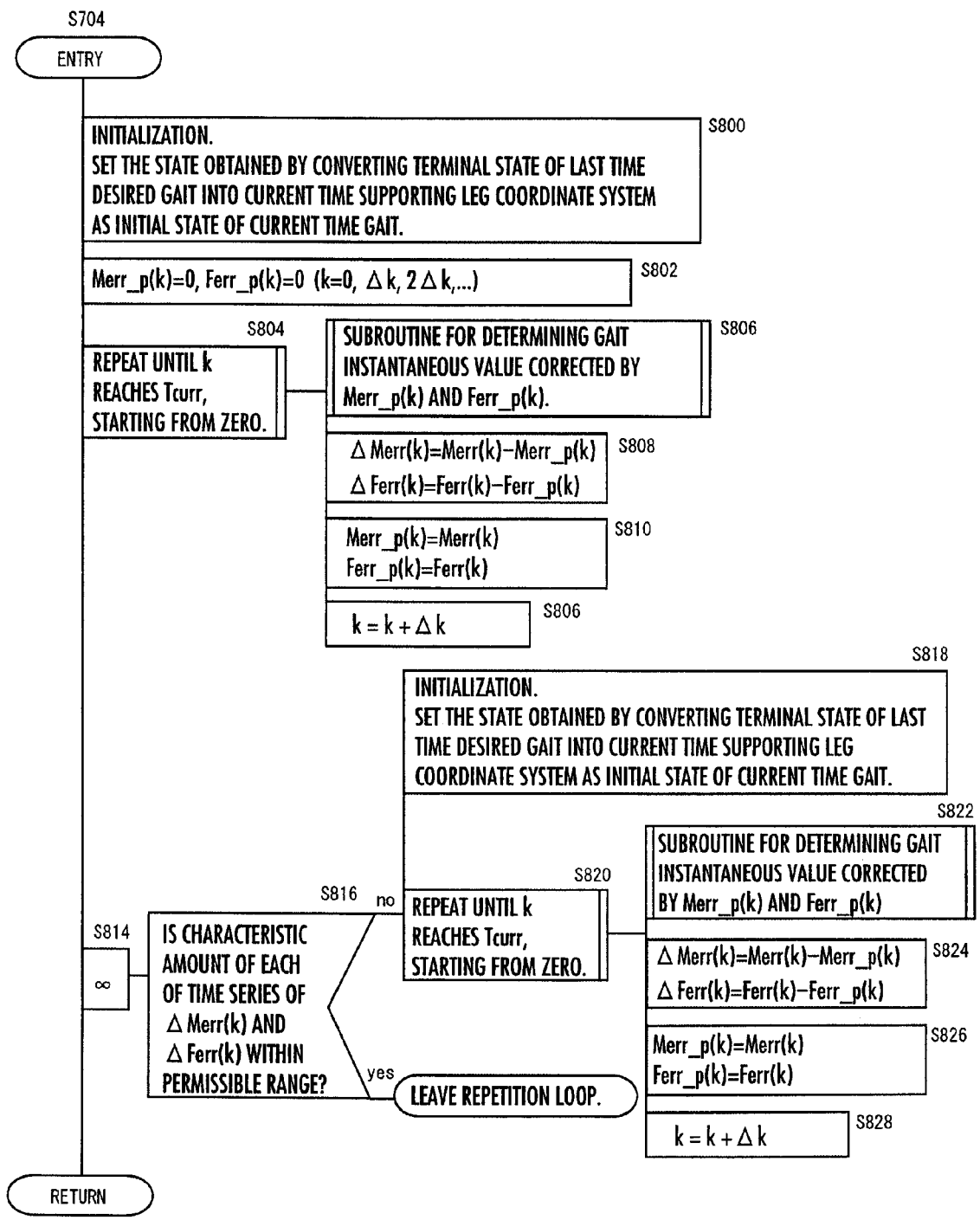
FIG. 18 is a flowchart showing the subroutine processing of FIG. 17.
Figure 19:
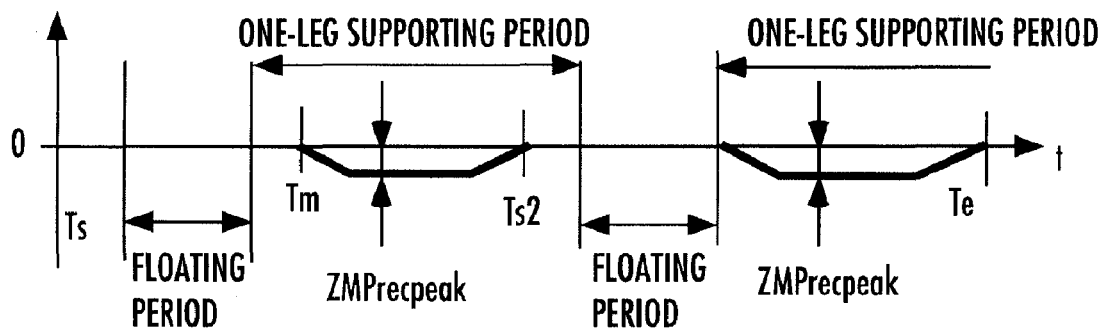
FIG. 19 is a graph showing examples of body inclination restoring moment ZMP-converted values in a normal gait.
Figure 20:
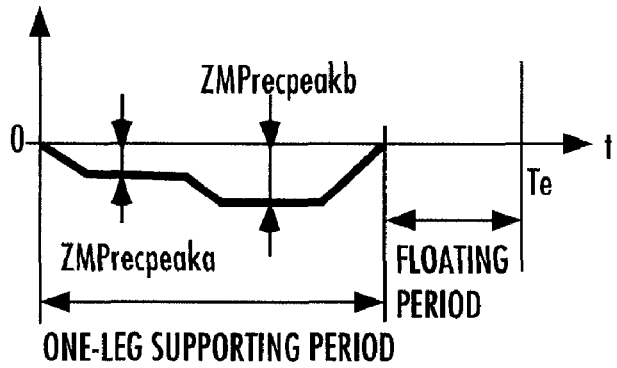
FIG. 20 is a graph showing examples of body inclination restoring moment ZMP-converted values in a current time's gait.
Figure 21:
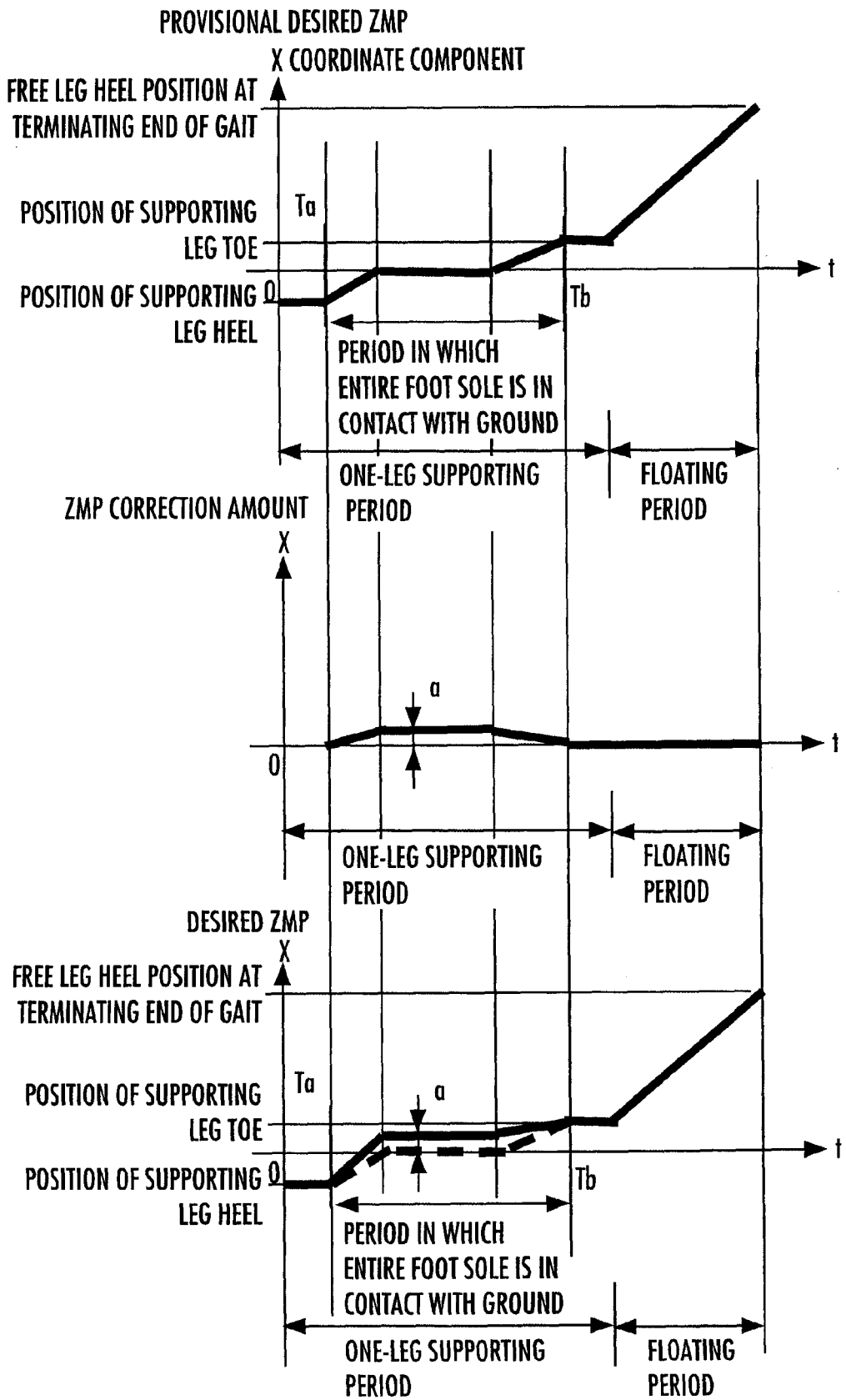
FIG. 21 is a graph showing examples of a provisional desired ZMP, a ZMP correction amount, and a desired ZMP in a current time's gait.

The invention claimed is:

1. A gait generating system for a mobile robot that sets a permissible range of a predetermined floor reaction force component of a floor reaction force generated by a motion of the mobile robot and generates a desired gait that includes at least a desired motion of the mobile robot such that the permissible range is satisfied, comprising:

a provisional desired motion creating means for creating a provisional motion, which indicates a provisional value of the desired motion, by using a predetermined first dynamic model of the mobile robot such that the floor reaction force component satisfies the permissible range;

a floor reaction force component error calculating means for determining, on an arbitrary motion of the mobile robot, by using the first dynamic model and a predetermined second dynamic model having a dynamic accuracy that is higher than that of the first dynamic model, a floor reaction force component error, which is a difference between the floor reaction force component generated on the second dynamic model by the motion and the floor reaction force component generated on the first dynamic model by the motion;

an evaluating means for evaluating whether the floor reaction force component error determined by the floor reaction force component error calculating means from the created provisional motion falls within a predetermined permissible error range; and a desired motion determining means for determining the provisional motion as the desired motion if the floor reaction force component error associated with the provisional motion in the evaluation by the evaluating means falls within the permissible error range, or for determining the desired motion by correcting the provisional motion at least once or more if the floor reaction force component error associated with the provisional motion deviates from the permissible error range, wherein in a case where the floor reaction force component error associated with the provisional motion deviates from the permissible error range, if a corrected motion determined by the desired motion determining means by the n-th (n: integer satisfying $n \geq 1$) correction of the provisional motion is defined as a motion after an n-th correction, the floor reaction force component error determined by the floor reaction force component error calculating means from the motion after the n-th correction is defined as the n-th floor reaction force component error, the provisional motion is defined as the motion after an 0-th correction, and the floor reaction force component error associated with the provisional motion is defined as an 0-th floor reaction force component error, then the desired motion determining means repeats corrected motion determination processing for determining a motion after an n-th correction such that a result obtained by adding either the (n−1)th floor reaction force component error or a floor reaction force correction amount determined on the basis of at least the (n−1)th floor reaction force component error to the floor reaction force component produced on the first dynamic model by the motion after the n-th correction satisfies the permissible range and convergence discrimination processing for discriminating whether a floor reaction force component error change amount $\Delta FM$ defined as either a difference between the n-th floor reaction force component error associated with the determined motion after the n-th correction and the (n−1)th floor reaction force component error associated with a motion after the (n−1)th correction or a difference between the n-th floor reaction force component error and the floor reaction force correction amount determined on the basis of at least the (n−1)th floor reaction force component error has converged to zero until the desired motion determining means determines at least that the floor reaction force component error change amount ΔFM has converged to zero, and determines a corrected motion determined by last corrected motion determination processing in the repetitive processing as the desired motion.

2. The gait generating system for a mobile robot according to claim 1, wherein the floor reaction force component is a translational floor reaction force horizontal component of a floor reaction force acting on the mobile robot.

3. The gait generating system for a mobile robot according to claim 1, wherein
the desired motion, the provisional motion, and the corrected motion are composed of time series of the instantaneous values of motions of the mobile robot during a predetermined period,
the m-th floor reaction force component error (m: integer satisfying m≧0) determined by the floor reaction force component error calculating means is composed of a time series of the difference in the predetermined period between an instantaneous value of the floor reaction force component produced on the second dynamic model at each time of a motion after an m-th correction by the motion after the m-th correction and an instantaneous value of the floor reaction force component produced on the first dynamic model at the time by the motion after the m-th correction,
the predetermined permissible error range of the evaluating means is a permissible error range for a predetermined first characteristic amount in a pattern of the time series constituting the 0-th floor reaction force component error,
the corrected motion determination processing by the desired motion determining means is the processing for determining, at each time t of the motion after the n-th correction, the instantaneous value of a motion after an n-th correction at the time t such that a result obtained by adding either a value at the time t of the (n−1)th floor reaction force component error or a value of a floor reaction force correction amount determined on the basis of at least the value to an instantaneous value FM(t) of the floor reaction force component produced on the first dynamic model at time t by the motion after the n-th correction satisfies the permissible range at the time t,
the floor reaction force component error change amount ΔFM is composed of a time series, in the predetermined period, of either a difference between a value of the n-th floor reaction force component error at each time and the value of an (n−1)th floor reaction force component error at the time or a difference between a value of the n-th floor reaction force component error at each time and a value of the floor reaction force correction amount determined on the basis of at least a value of the (n−1)th floor reaction force component error at the time, and
the convergence discrimination processing of the desired motion determining means is the processing for determining that the floor reaction force component error change amount ΔFM has converged to zero when a predetermined second characteristic amount in a pattern of the time series constituting the floor reaction force component error change amount ΔFM falls within a predetermined permissible change amount range.

4. A gait generating system for a mobile robot that sets a permissible range of a predetermined floor reaction force component of a floor reaction force generated by a motion of the mobile robot and generates a desired gait that includes at least a desired motion of the mobile robot such that the permissible range is satisfied, comprising:
a provisional desired motion creating means for creating a provisional motion, which indicates a provisional value of the desired motion;
a floor reaction force component error calculating means for determining, on an arbitrary motion of the mobile robot, by using a predetermined first dynamic model of the mobile robot and a predetermined second dynamic model having a dynamic accuracy that is higher than that of the first dynamic model, a floor reaction force component error, which is a difference between the floor reaction force component generated on the second dynamic model by the motion and the floor reaction force component generated on the first dynamic model by the motion; and
a desired motion determining means for determining the desired motion by correcting the provisional motion at least once or more,
wherein provided that a corrected motion determined by the desired motion determining means by an n-th (n: integer satisfying n≧1) correction of the provisional motion is defined as a motion after the n-th correction, the floor reaction force component error determined by the floor reaction force component error calculating means from the motion after the n-th correction is defined as an n-th floor reaction force component error, the provisional motion is defined as the motion after the 0-th correction, and the floor reaction force component error determined by the floor reaction force component error calculating means from the provisional motion is defined as the 0-th floor reaction force component error, then
the desired motion determining means repeats corrected motion determination processing for determining a motion after the n-th correction such that a result obtained by adding either an (n−1)th floor reaction force component error or a floor reaction force correction amount determined on the basis of at least the (n−1)th floor reaction force component error to the floor reaction force component produced on the first dynamic model by the motion after the n-th correction satisfies the permissible range and convergence discrimination processing for discriminating whether a floor reaction force component error change amount ΔFM defined as either a difference between the n-th floor reaction force component error associated with the determined motion after the n-th correction and the (n−1)th floor reaction force component error associated with a motion after the (n−1)th correction or a difference between the n-th floor reaction force component error and the floor reaction force correction amount determined on the basis of at least the (n−1)th floor reaction force component error has converged to zero until the desired motion determining means determines at least that the floor reaction force component error change amount ΔFM has converged to zero, and determines a corrected motion determined by last corrected motion determination processing in the repetitive processing as the desired motion.

5. The gait generating system for a mobile robot according to claim 4, wherein the desired motion, the provisional motion, and the corrected motion are composed of time series of the instantaneous values of motions of the mobile robot during a predetermined period, the m-th floor reaction force component error (m: integer satisfying m≧0) determined by the floor reaction force component error calculating means is composed of a time series of a difference in the predetermined period between an instantaneous value of the floor reaction force component produced on the second dynamic model at each time of a motion after an m-th correction by the motion after the m-th correction and an instantaneous value of the floor reaction force component produced on the first dynamic model at the time by the motion after the m-th correction, the corrected motion determination processing by the desired motion determining means is the processing for determining, at each time t of the motion after the n-th correction, the instantaneous value of a motion after an n-th correction at the time t such that a result obtained by adding either a value at the time t of the (n−1)th floor reaction force component error or a value of the floor reaction force correction amount determined on the basis of at least the value to an instantaneous value FM(t) of the floor reaction force component produced on the first dynamic model at time t by the motion after the n-th correction satisfies the permissible range at the time t, the floor reaction force component error change amount ΔFM is composed of a time series in the predetermined period of either a difference between a value of the n-th floor reaction force component error at each time and a value of the (n−1)th floor reaction force component error at the time or a difference between a value of the n-th floor reaction force component error at each time and a value of the floor reaction force correction amount determined on the basis of at least a value of the (n−1)th floor reaction force component error at the time, and the convergence discrimination processing of the desired motion determining means is the processing for determining that the floor reaction force component error change amount ΔFM has converged to zero when a predetermined characteristic amount in a pattern of the time series constituting the floor reaction force component error change amount ΔFM has fallen within a predetermined permissible change amount range.

6. The gait generating system for a mobile robot according to claim 4, wherein the floor reaction force component is a translational floor reaction force horizontal component of a floor reaction force acting on the mobile robot.

7. A gait generating system for a mobile robot that sets a desired value of a predetermined first floor reaction force component of a floor reaction force generated by a motion of the mobile robot and a permissible range of a predetermined second floor reaction force component, which is different from the first floor reaction force component, and generates a desired gait that includes at least a desired motion of the mobile robot such that the desired value of the first floor reaction force component and the permissible range of the second floor reaction force component are satisfied, comprising:

a provisional desired motion creating means for creating a provisional motion, which indicates a provisional value of the desired motion, by using a predetermined first dynamic model of the mobile robot such that the first floor reaction force component agrees with the desired value and the second floor reaction force component satisfies the permissible range;

a floor reaction force component error calculating means for determining, on an arbitrary motion of the mobile robot, by using the first dynamic model and a predetermined second dynamic model having a dynamic accuracy that is higher than that of the first dynamic model, a floor reaction force component error Aerr, which is a difference between the first floor reaction force component generated on the second dynamic model by the motion and the first floor reaction force component generated on the first dynamic model by the motion, and for determining a floor reaction force component error Berr, which is a difference between the second floor reaction force component generated on the second dynamic model by the motion and the second floor reaction force component generated on the first dynamic model by the motion;

an evaluating means for evaluating whether the floor reaction force component error Aerr out of the floor reaction force component errors Aerr and Berr determined by the floor reaction force component error calculating means from the created provisional motion falls within a predetermined first permissible error range and whether the floor reaction force component error Berr falls within a predetermined second permissible error range; and a desired motion determining means for determining the provisional motion as the desired motion if the floor reaction force component errors Aerr and Berr associated with the provisional motion in the evaluation by the evaluating means both fall within the first permissible error range and the second permissible error range, respectively, associated therewith or for determining the desired motion by correcting the provisional motion at least once or more if at least one of the floor reaction force component errors Aerr and Berr associated with the provisional motion deviates from the first permissible error range or the second permissible error range associated therewith, wherein in case where at least one of the floor reaction force component errors Aerr and Berr associated with the provisional motion deviates from the first permissible error range or the second permissible error range associated therewith, if a corrected motion determined by the desired motion determining means by an n-th (n: integer satisfying n≧1) correction of the provisional motion is defined as a motion after the n-th correction, the floor reaction force component errors Aerr and Berr determined by the floor reaction force component error calculating means from the motion after the n-th correction are respectively defined as n-th floor reaction force component errors Aerr(n) and Berr(n), the provisional motion is defined as a motion after a 0-th correction, and the floor reaction force component errors Aerr and Berr associated with the provisional motion are respectively defined as 0-th floor reaction force component errors Aerr(0) and Berr(0), then the desired motion determining means repeats corrected motion determination processing for determining a motion after the n-th correction such that a result obtained by adding either an (n−1)th floor reaction force component error Aerr(n−1) or a first floor reaction force correction amount determined on the basis of at least the (n−1)th floor reaction force component error Aerr(n−1) to the first floor reaction force component produced on the first dynamic model by the motion after the n-th correction agrees with the desired value, and a result obtained by adding either an (n−1)th floor reaction force component error Berr(n−1) or a second floor reaction force correction amount determined on the basis of at least the (n−1)th floor reaction force component error Berr(n−1) to the second floor reaction force component produced on the first dynamic model by the motion after the n-th correction satisfies the permissible range, and convergence discrimination processing for discriminating whether a floor reaction force component error change amount ΔAerr defined as either a difference between the n-th floor reaction force component error Aerr(n) associated with the determined motion after the n-th correction and the (n−1)th floor reaction force component error Aerr(n−1) associated with a motion after the (n−1)th correction or a difference between the n-th floor reaction force component error Aerr(n) and the first floor reaction force correction amount determined on the basis of at least the (n−1)th floor reaction force component error Aerr(n−1) and a floor reaction force component error change amount ΔBerr defined as either a difference between an n-th floor reaction force component error Berr(n) associated with the determined motion after the n-th correction and an (n−1)th floor reaction force component error Berr(n−1) associated with a motion after the (n−1)th correction or a difference between the n-th floor reaction force component error Berr(n) and the second floor reaction force correction amount determined on the basis of at least the (n−1)th floor reaction force component error Berr(n−1) have respectively converged to zero or not until the desired motion determining means determines at least that the floor reaction force component error change amounts ΔAerr and ΔBerr have both converged to zero, and determines a corrected motion determined by the last corrected motion determination processing in the repetitive processing as the desired motion.

8. The gait generating system for a mobile robot according to claim 7, wherein the first floor reaction force component is a floor reaction force moment horizontal component about a predetermined point of action of a floor reaction force acting on the mobile robot, and the second floor reaction force component is a translational floor reaction force horizontal component of a floor reaction force acting on the mobile robot.

9. The gait generating system for a mobile robot according to claim 7, wherein the floor reaction force component error calculating means calculates, relative to the provisional motion, the floor reaction force component error Aerr associated with the provisional motion by using the desired value as the first floor reaction force component produced on the first dynamic model by the provisional motion, while the floor reaction force component error calculating means calculates, relative to a motion after the n-th correction other than the provisional motion, the floor reaction force component error Aerr associated with the motion after the n-th correction by using a result obtained by subtracting either the (n−1)th floor reaction force component error Aerr(n−1) or the first floor reaction force correction amount determined on the basis of at least the (n−1)th floor reaction force component error Aerr (n−1) from the desired value, as the first floor reaction force component produced on the first dynamic model by the motion after the n-th correction.

10. The gait generating system for a mobile robot according to claim 7, wherein
the desired motion, the provisional motion, and the corrected motion are composed of time series of the instantaneous values of motions of the mobile robot during a predetermined period, the m-th floor reaction force component error Aerr out of the m-th floor reaction force component errors Aerr and Berr (m: integer satisfying $m \geq 0$) determined by the floor reaction force component error calculating means is composed of a time series of a difference in the predetermined period between an instantaneous value of the first floor reaction force component produced on the second dynamic model at each time of a motion after an m-th correction by the motion after the m-th correction and an instantaneous value of the first floor reaction force component produced on the first dynamic model at the time by the motion after the m-th correction, and the m-th floor reaction force component error Berr is composed of a time series of a difference in the predetermined period between an instantaneous value of the second floor reaction force component produced on the second dynamic model at each time of a motion after the m-th correction and an instantaneous value of the second floor reaction force component produced on the first dynamic model at the time by the motion after the m-th correction, the predetermined first permissible error range of the evaluating means is a permissible error range for a predetermined first characteristic amount out of a time series pattern constituting the 0-th floor reaction force component error Aerr(0) and the predetermined second permissible error range is a permissible error range for a predetermined second characteristic amount out of a time series pattern constituting the 0-th floor reaction force component error Berr(0), the corrected motion determination processing by the desired motion determining means is the processing for determining, at each time t of the motion after the n-th correction, an instantaneous value of a motion after the n-th correction at the time t such that a result obtained by adding either a value of the (n−1)th floor reaction force component error Aerr(n−1) at the time t or a value of the first floor reaction force correction amount determined on the basis of at least the value to an instantaneous value of the first floor reaction force component produced on the first dynamic model at time t by the motion after the n-th correction satisfies the desired value at the time t, and a result obtained by adding either a value of the (n−1)th floor reaction force component error Berr(n−1) at the time t or a value of the second floor reaction force correction amount determined on the basis of at least the value to an instantaneous value of the second floor reaction force component produced on the first dynamic model at the time t by the motion after the n-th correction satisfies the permissible range at the time t, the floor reaction force component error change amount ΔAerr is composed of a time series, in the predetermined period, of either a difference between a value of the n-th floor reaction force component error Aerr(n) at each time and a value of an (n−1)th floor reaction force component error Aerr(n−1) at the time or a difference between a value of the n-th floor reaction force component error Aerr(n) at each time and a value of the first floor reaction force correction amount determined on the basis of at least a value of the (n−1)th floor reaction force component error Aerr(n−1) at the time, and the floor reaction force component error change amount ΔBerr is composed of a time series, in the predetermined period, of either a difference between a value of the n-th floor reaction force component error Berr(n) at each time and a value of the (n−1)th floor reaction force component error Berr(n−1) at the time or a difference between a value of the n-th floor reaction force component error Berr(n) at each time and a value of the second floor reaction force correction amount determined on the basis of at least a value of the (n−1)th floor reaction force component error Berr(n−1) at the time, and the convergence discrimination processing of the desired motion determining means is the processing for determining that the floor reaction force component error change amount ΔAerr has converged to zero when a predetermined third characteristic amount in a pattern of the time series constituting the floor reaction force component error change amount ΔAerr has fallen within a predetermined permissible change amount range for the third characteristic amount and also for determining that the floor reaction force component error change amount ΔBerr has converged to zero when the fourth characteristic amount in a pattern of the time series constituting the floor reaction force component error change amount ΔBerr has fallen within a predetermined permissible change amount range for the fourth characteristic amount.

11. The gait generating system for a mobile robot according to claim 7, wherein the desired motion, the provisional motion, and the corrected motion are composed of time series of the instantaneous values of motions of the mobile robot during a predetermined period, the m-th floor reaction force component error Aerr out of the m-th floor reaction force component errors Aerr and Berr (m: integer satisfying m≧0) determined by the floor reaction force component error calculating means is composed of a time series of a difference, in the predetermined period, between an instantaneous value of the first floor reaction force component produced on the second dynamic model at each time of a motion after an m-th correction by the motion after the m-th correction and an instantaneous value of the first floor reaction force component produced on the first dynamic model at the time by the motion after the m-th correction, and the m-th floor reaction force component error Berr is composed of a time series of a difference, in the predetermined period, between an instantaneous value of the second floor reaction force component produced on the second dynamic model at each time of a motion after the m-th correction and an instantaneous value of the second floor reaction force component produced on the first dynamic model at the time by the motion after the m-th correction, the corrected motion determination processing of the desired motion determining means is the processing for determining, at each time t of the motion after the n-th correction, an instantaneous value of a motion after an n-th correction at the time t such that a result obtained by adding either a value of the (n−1)th floor reaction force component error Aerr(n−1) at the time t or a value of the first floor reaction force correction amount determined on the basis of at least the value to an instantaneous value of the first floor reaction force component produced on the first dynamic model at time t by the motion after the n-th correction satisfies the desired value at the time t, and a result obtained by adding either a value of the (n−1)th floor reaction force component error Berr(n−1) at the time t or a value of the second floor reaction force correction amount determined on the basis of at least the value to an instantaneous value of the second floor reaction force component produced on the first dynamic model at the time t by the motion after the n-th correction satisfies the permissible range at the time t, the floor reaction force component error change amount ΔAerr is composed of a time series, in the predetermined period, of either a difference between a value of the n-th floor reaction force component error Aerr(n) at each time and a value of the (n−1)th floor reaction force component error Aerr(n−1) at the time or a difference between a value of the n-th floor reaction force component error Aerr(n) at each time and a value of the first floor reaction force correction amount determined on the basis of at least a value of the (n−1)th floor reaction force component error Aerr(n−1) at the time, and the floor reaction force component error change amount ΔBerr is composed of a time series, in the predetermined period, of either a difference between a value of the n-th floor reaction force component error Berr(n) at each time and a value of the (n−1)th floor reaction force component error Berr(n−1) at the time or a difference between a value of the n-th floor reaction force component error Berr(n) at each time and a value of the second floor reaction force correction amount determined on the basis of at least a value of the (n−1)th floor reaction force component error Berr(n−1) at the time, and the convergence discrimination processing of the desired motion determining means is the processing for determining that the floor reaction force component error change amount ΔAerr has converged to zero when a predetermined third characteristic amount in a pattern of the time series constituting the floor reaction force component error change amount ΔAerr has fallen within a predetermined permissible change amount range for the third characteristic amount and also for determining that the floor reaction force component error change amount ΔBerr has converged to zero when the fourth characteristic amount in a pattern of the time series constituting the floor reaction force component error change amount ΔBerr has fallen within a predetermined permissible change amount range for the fourth characteristic amount.

12. A gait generating system for a mobile robot that sets a desired value of a predetermined first floor reaction force component of a floor reaction force generated by a motion of the mobile robot and a permissible range of a predetermined second floor reaction force component, which is different from the first floor reaction force component, and generates a desired gait that includes at least a desired motion of the mobile robot such that the desired value of the first floor reaction force component and the permissible range of the second floor reaction force component are satisfied, comprising:

a provisional desired motion creating means for creating a provisional motion, which indicates a provisional value of the desired motion;

a floor reaction force component error calculating means for determining, on an arbitrary motion of the mobile robot, by using a predetermined first dynamic model of the mobile robot and a predetermined second dynamic model having a dynamic accuracy that is higher than that of the first dynamic model, a floor reaction force component error Aerr, which is the difference between the first floor reaction force component generated on the second dynamic model by the motion and the first floor reaction force component generated on the first dynamic model by the motion, and for determining a floor reaction force component error Berr, which is the difference between the second floor reaction force component generated on the second dynamic model by the motion and the second floor reaction force component generated on the first dynamic model by the motion; and a desired motion determining means for determining the desired motion by correcting the provisional motion at least once or more, wherein provided that a corrected motion determined by the desired motion determining means by an n-th (n: integer satisfying n≧1) correction of the provisional motion is defined as a motion after the n-th correction, the floor reaction force component errors Aerr and Berr determined by the floor reaction force component error calculating means from the motion after the n-th correction are respectively defined as n-th floor reaction force component errors Aerr(n) and Berr(n), the provisional motion is defined as a motion after a 0-th correction, and the floor reaction force component errors Aerr and Berr determined by the floor reaction force component error calculating means from the provisional motion are respectively defined as 0-th floor reaction force component errors Aerr(0) and Berr(0), then the desired motion determining means repeats corrected motion determination processing for determining a motion after the n-th correction such that a result obtained by adding either an (n−1)th floor reaction force component error Aerr(n−1) or a first floor reaction force correction amount determined on the basis of at least the (n−1)th floor reaction force component error Aerr(n−1) to the first floor reaction force component produced on the first dynamic model by the motion after the n-th correction agrees with the desired value, and a result obtained by adding either an (n−1)th floor reaction force component error Berr(n−1) or a second floor reaction force correction amount determined on the basis of at least the (n−1)th floor reaction force component error Berr(n−1) to the second floor reaction force component produced on the first dynamic model by the motion after the n-th correction satisfies the permissible range, and convergence discrimination processing for discriminating whether a floor reaction force component error change amount ΔAerr defined as either a difference between the n-th floor reaction force component error Aerr(n) associated with the determined motion after the n-th correction and the (n−1)th floor reaction force component error Aerr(n−1) associated with a motion after the (n−1)th correction or a difference between the n-th floor reaction force component error Aerr(n) and the first floor reaction force correction amount determined on the basis of at least the (n−1)th floor reaction force component error Aerr(n−1) and a floor reaction force component error change amount ΔBerr defined as either a difference between an n-th floor reaction force component error Berr(n) associated with the determined motion after the n-th correction and an (n−1)th floor reaction force component error Berr(n−1) associated with a motion after the (n−1)th correction or a difference between the n-th floor reaction force component error Berr(n) and the second floor reaction force correction amount determined on the basis of at least the (n−1)th floor reaction force component error Berr(n−1) have respectively converged to zero or not until the desired motion determining means determines at least that the floor reaction force component error change amounts ΔAerr and ΔBerr have both converged to zero, and determines a corrected motion determined by the last corrected motion determination processing in the repetitive processing as the desired motion.

13. The gait generating system for a mobile robot according to claim 12, wherein the provisional motion creating means is a means for creating the provisional motion such that at least the desired value of the first floor reaction force component is satisfied on the first dynamic model, and the floor reaction force component error calculating means calculates, relative to the provisional motion, the floor reaction force component error Aerr associated with the provisional motion as the first floor reaction force component, which is produced on the first dynamic model by the provisional motion, by using the desired value, while the floor reaction force component error calculating means calculates, relative to a motion after the n-th correction other than the provisional motion, the floor reaction force component error Aerr associated with the motion after the n-th correction as the first floor reaction force component produced on the first dynamic model by the motion after the n-th correction, by using a result obtained by subtracting either the (n−1)th floor reaction force component error Aerr(n−1) or the first floor reaction force correction amount determined on the basis of at least the (n−1)th floor reaction force component error Aerr(n−1) from the desired value.

14. The gait generating system for a mobile robot according to claim 12, wherein the first floor reaction force component is a floor reaction force moment horizontal component about a predetermined point of action of a floor reaction force acting on the mobile robot, and the second floor reaction force component is a translational floor reaction force horizontal component of a floor reaction force acting on the mobile robot.

15. A gait generating system for a mobile robot that sets a desired ZMP of the mobile robot and the permissible range of the translational floor reaction force horizontal component produced by a motion of the mobile robot, and generates a desired gait that includes at least a desired motion of the mobile robot such that the desired ZMP and the permissible range of the translational floor reaction force horizontal component are satisfied, comprising:

a provisional desired motion creating means for creating a provisional motion, which indicates a provisional value of the desired motion, by using a predetermined first dynamic model of the mobile robot such that the desired ZMP is satisfied and the translational floor reaction force horizontal component satisfies the permissible range;

an error calculating means for determining, on an arbitrary motion of the mobile robot, by using the first dynamic model and a predetermined second dynamic model having a dynamic accuracy that is higher than that of the first dynamic model, a ZMP error ZMPerr, which is a difference between the ZMP calculated on the second dynamic model in response to the motion and the ZMP calculated on the first dynamic model in response to the motion, and for determining a translational floor reaction force horizontal component error Ferr, which is the difference between the translational floor reaction force horizontal component generated on the second dynamic model by the motion and the translational floor reaction force horizontal component generated on the first dynamic model by the motion;

an evaluating means for evaluating whether the ZMP error ZMPerr determined by the error calculating means from the created provisional motion and the ZMP error ZMPerr out of the translational floor reaction force horizontal component error Ferr fall within a predetermined first permissible error range and for evaluating whether the translational floor reaction force horizontal component error Ferr falls within a predetermined second permissible error range; and a desired motion determining means for determining, in the evaluation by the evaluating means, the provisional motion as the desired motion if both the ZMP error ZMPerr and the translational floor reaction force horizontal component error Ferr associated with the provisional motion respectively fall within the first permissible error range and the second permissible error range associated therewith, or for determining the desired motion by correcting the provisional motion at least once or more if at least either the ZMP error ZMPerr or the translational floor reaction force horizontal component error Ferr associated with the provisional motion deviates from the first permissible error range or the second permissible error range associated therewith, wherein in a case where at least either the ZMP error ZMPerr or the translational floor reaction force horizontal component error Ferr associated with the provisional motion deviates from the first permissible error range or the second permissible error range associated therewith, if a corrected motion determined by the desired motion determining means by an n-th (n: integer satisfying $n \geq 1$) correction of the provisional motion is defined as a motion after the n-th correction, the ZMP error ZMPerr and the translational floor reaction force horizontal component error Ferr determined by the floor reaction force component error calculating means from the motion after the n-th correction are defined as an n-th ZMP error ZMPerr(n) and an n-th translational floor reaction force horizontal component error Ferr(n), respectively, the provisional motion is defined as a motion after a 0-th correction, and the ZMP error ZMPerr and the translational floor reaction force horizontal component error Ferr associated with the provisional motion are defined as a 0-th ZMP error ZMPerr(0) and a 0-th translational floor reaction force horizontal component error Ferr(0), respectively, then the desired motion determining means repeats corrected motion determination processing for determining a motion after the n-th correction such that a result obtained by adding either an (n−1)th ZMP error ZMPerr(n−1) or a ZMP correction amount determined on the basis of at least the (n−1)th ZMP error ZMPerr(n−1) to the ZMP calculated on the first dynamic model by the motion after the n-th correction agrees with the desired ZMP, and the result obtained by adding either an (n−1)th translational floor reaction force horizontal component error Ferr(n−1) or a floor reaction force correction amount determined on the basis of at least the (n−1)th translational floor reaction force horizontal component error Ferr(n−1) to the translational floor reaction force horizontal component produced on the first dynamic model by the motion after the n-th correction satisfies the permissible range, and convergence discrimination processing for discriminating whether a ZMP error change amount $\Delta$ZMPerr defined as either a difference between an n-th ZMP error ZMPerr(n) associated with the determined motion after the n-th correction and the (n−1)th ZMP error ZMPerr(n−1) associated with a motion after an (n−1)th correction or a difference between the n-th ZMP error ZMPerr(n) and the ZMP correction amount determined on the basis of at least the (n−1)th ZMP error ZMPerr(n−1), and a translational floor reaction force horizontal component error change amount $\Delta$Ferr defined as either a difference between the n-th translational floor reaction force horizontal component error Ferr(n) associated with the determined motion after the n-th correction and the (n−1)th translational floor reaction force horizontal component error Ferr(n−1) associated with a motion after an (n−1)th correction or a difference between the n-th translational floor reaction force horizontal component error Ferr(n) and the floor reaction force correction amount determined on the basis of at least the (n−1)th translational floor reaction force horizontal component error Ferr(n−1) have respectively converged to zero or not until the desired motion determining means determines at least that both the ZMP error change amount $\Delta$ZMPerr and the translational floor reaction force horizontal component error change amount $\Delta$Ferr have converged to zero, and determines, as the desired motion, a corrected motion determined by the last corrected motion determination processing in the repetitive processing.

16. The gait generating system for a mobile robot according to claim 15, wherein the floor reaction force component error calculating means calculates, relative to the provisional motion, the ZMP error ZMPerr associated with the provisional motion as the ZMP, which is calculated on the first dynamic model in response to the provisional motion, by using the desired ZMP, while the floor reaction force component error calculating means calculates, relative to a motion after the n-th correction other than the provisional motion, the ZMP error ZMPerr associated with the motion after the n-th correction as the ZMP calculated on the first dynamic model in response to the motion after the n-th correction, by using a result obtained by subtracting either the (n−1)th ZMP error ZMPerr(n−1) or the ZMP correction amount determined on the basis of at least the (n−1)th ZMP error ZMPerr(n−1) from the desired ZMP.

17. The gait generating system for a mobile robot according to claim 15, wherein the desired motion, the provisional motion, and the corrected motion are composed of time series of the instantaneous values of motions of the mobile robot during a predetermined period, out of the m-th ZMP error ZMPerr and a translational floor reaction force horizontal component error Ferr (m: integer satisfying $m \geq 0$) determined by the floor reaction force component error calculating means, the m-th ZMP error ZMPerr is composed of a time series of a difference, in the predetermined period, between an instantaneous value of a ZMP calculated on the second dynamic model at each time of a motion after an m-th correction in response to the motion after the m-th correction and an instantaneous value of a ZMP calculated on the first dynamic model at the time in response to the motion after the m-th correction, and the m-th translational floor reaction force horizontal component error Ferr is composed of a time series of a difference, in the predetermined period, between an instantaneous value of the translational floor reaction force component produced on the second dynamic model at each time of a motion after the m-th correction and an instantaneous value of the translational floor reaction force horizontal component produced on the first dynamic model at the time by the motion after the m-th correction, the predetermined first permissible error range of the evaluating means is a permissible error range for a predetermined first characteristic amount in a pattern of a time series constituting the 0-th ZMP error ZMPerr(0) and the predetermined second permissible error range is a permissible error range for a predetermined second characteristic amount in a pattern of a time series constituting the 0-th translational floor reaction force horizontal component error Ferr(0), the corrected motion determination processing of the desired motion determining means is the processing for determining, at each time t of the motion after the n-th correction, an instantaneous value of a motion after an n-th correction at the time t such that a result obtained by adding either a value of the (n−1)th ZMP error ZMPerr(n−1) at time t or a value of the ZMP correction amount determined on the basis of at least the value to an instantaneous value of the ZMP calculated on the first dynamic model at time t in response to the motion after the n-th correction satisfies the desired ZMP at the time t, and a result obtained by adding either a value of the (n−1)th translational floor reaction force horizontal component error Ferr(n−1) at the time t or a value of the floor reaction force correction amount determined on the basis of at least the value to an instantaneous value of a translational floor reaction force horizontal component produced on the first dynamic model at the time t by the motion after the n-th correction satisfies the permissible range at the time t, the ZMP error change amount ΔZMPerr is composed of a time series, in the predetermined period, of either a difference between a value of the n-th ZMP error ZMPerr(n) at each time and a value of an (n−1)th ZMP error ZMPerr(n−1) at the time or a difference between a value of the n-th ZMP error ZMPerr(n) at each time and a value of the ZMP correction amount determined on the basis of at least a value of the (n−1)th ZMP error ZMPerr(n−1) at the time, and the translational floor reaction force horizontal component error change amount ΔFerr is composed of a time series, in the predetermined period, of either a difference between a value of the n-th translational floor reaction force horizontal component error Ferr(n) at each time and a value of an (n−1)th translational floor reaction force horizontal component error Ferr(n−1) at the time or a difference between a value of the n-th translational floor reaction force horizontal component error Ferr(n) at each time and a value of the floor reaction force correction amount determined on the basis of at least the value of the (n−1)th translational floor reaction force horizontal component error Ferr(n−1) at the time, and the convergence discrimination processing of the desired motion determining means is the processing for determining that the ZMP component error change amount ΔZMPerr has converged to zero when a predetermined third characteristic amount in a pattern of the time series constituting the ZMP error change amount ΔZMPerr has fallen within a predetermined permissible change amount range for the third characteristic amount and also for determining that the translational floor reaction force horizontal component error difference ΔFerr has converged to zero when a predetermined fourth characteristic amount in a pattern of the time series constituting the translational floor reaction force horizontal component error change amount ΔFerr has fallen within a predetermined permissible change amount range for the fourth characteristic amount.

18. A gait generating system for a mobile robot that sets a desired ZMP of the mobile robot and a permissible range of a translational floor reaction force horizontal component produced by a motion of the mobile robot, and generates a desired gait that includes at least a desired motion of the mobile robot such that the desired ZMP and the permissible range of the translational floor reaction force horizontal component are satisfied, comprising:

a provisional desired motion creating means for creating a provisional motion, which indicates a provisional value of the desired motion;

an error calculating means for determining, on an arbitrary motion of the mobile robot, by using a predetermined first dynamic model of the mobile robot and a predetermined second dynamic model having a dynamic accuracy that is higher than that of a first dynamic model, a ZMP error ZMPerr, which is the difference between the ZMP calculated on the second dynamic model in response to the motion and the ZMP calculated on the first dynamic model in response to the motion, and for determining a translational floor reaction force horizontal component error Ferr, which is a difference between the translational floor reaction force horizontal component generated on the second dynamic model by the motion and the translational floor reaction force horizontal component generated on the first dynamic model by the motion; and a desired motion determining means for determining the desired motion by correcting the provisional motion at least once or more, wherein provided that a corrected motion determined by the desired motion determining means by an n-th (n: integer satisfying n≧1) correction of the provisional motion is defined as a motion after the n-th correction, the ZMP error ZMPerr and the translational floor reaction force horizontal component error Ferr determined by error calculating means from the motion after the n-th correction are defined as an n-th ZMP error ZMPerr(n) and an n-th translational floor reaction force horizontal component error Ferr(n), respectively, the provisional motion is defined as a motion after an 0-th correction, and the ZMP error ZMPerr and the translational floor reaction force horizontal component error Ferr determined by the floor reaction force component error calculating means from the provisional motion are defined as an 0-th ZMP error ZMPerr(0) and an 0-th translational floor reaction force horizontal component error Ferr(0), respectively, then the desired motion determining means repeats corrected motion determination processing for determining a motion after the n-th correction such that a result obtained by adding either an (n−1)th ZMP error ZMPerr(n−1) or a ZMP correction amount determined on the basis of at least the (n−1)th ZMP error ZMPerr(n−1) to a ZMP calculated on the first dynamic model by the motion after the n-th correction agrees with the desired ZMP, and the result obtained by adding either an (n−1)th translational floor reaction force horizontal component error Ferr(n−1) or a floor reaction force correction amount determined on the basis of at least the (n−1)th translational floor reaction force horizontal component error Ferr(n−1) to the translational floor reaction force horizontal component produced on the first dynamic model by the motion after the n-th correction satisfies the permissible range, and convergence discrimination processing for discriminating whether a ZMP error change amount ΔZMPerr defined as either a difference between the n-th ZMP error ZMPerr(n) associated with the determined motion after the n-th correction and the (n−1)th ZMP error ZMPerr(n−1) associated with a motion after an (n−1)th correction or a difference between the n-th ZMP error ZMPerr(n) and the ZMP correction amount determined on the basis of at least the (n−1)th ZMP error ZMPerr(n−1), and a translational floor reaction force horizontal component error change amount ΔFerr defined as either a difference between the n-th translational floor reaction force horizontal component error Ferr(n) associated with the determined motion after the n-th correction and an (n−1)th translational floor reaction force horizontal component error Ferr(n−1) associated with a motion after an (n−1)th correction or a difference between the n-th translational floor reaction force horizontal component error Ferr(n) and the floor reaction force correction amount determined on the basis of at least the (n−1)th translational floor reaction force horizontal component error Ferr(n−1) have respectively converged to zero or not until the desired motion determining means determines at least that both the ZMP error change amount ΔZMPerr and the translational floor reaction force horizontal component error change amount ΔFerr have both converged to zero, and determines, as the desired motion, a corrected motion determined by last corrected motion determination processing in the repetitive processing.

19. The gait generating system for a mobile robot according to claim 18, wherein
the provisional motion creating means is a means for creating the provisional motion such that at least a desired ZMP is satisfied on the first dynamic model, and
the floor reaction force component error calculating means calculates, relative to the provisional motion, the ZMP error ZMPerr associated with the provisional motion as the ZMP, which is calculated on the first dynamic model in response to the provisional motion, by using the desired ZMP, while the floor reaction force component error calculating means calculates, relative to a motion after the n-th correction other than the provisional motion, the ZMP error ZMPerr associated with the motion after the n-th correction as the ZMP calculated on the first dynamic model in response to the motion after the n-th correction, by using a result obtained by subtracting either the (n−1)th ZMP error ZMPerr(n−1) or the ZMP correction amount determined on the basis of at least the (n−1)th ZMP error ZMPerr(n−1) from the desired ZMP.

20. The gait generating system for a mobile robot according to claim 18, wherein
the desired motion, the provisional motion, and the corrected motion are composed of time series of the instantaneous values of motions of the mobile robot during a predetermined period,
out of the m-th ZMP error ZMPerr and a translational floor reaction force horizontal component error Ferr (m: integer satisfying m≧0) determined by the floor reaction force component error calculating means, the m-th ZMP error ZMPerr is composed of a time series of a difference, in the predetermined period, between an instantaneous value of the ZMP calculated on the second dynamic model at each time of a motion after an m-th correction in response to the motion after the m-th correction and an instantaneous value of the ZMP calculated on the first dynamic model at the time in response to the motion after the m-th correction, and the m-th translational floor reaction force horizontal component error Ferr is composed of a time series of a difference, in the predetermined period, between an instantaneous value of the translational floor reaction force horizontal component produced on the second dynamic model at each time of a motion after the m-th correction and an instantaneous value of the translational floor reaction force horizontal component produced on the first dynamic model at the time by the motion after the m-th correction,
the corrected motion determination processing of the desired motion determining means is the processing for determining, at each time t of the motion after the n-th correction, an instantaneous value of a motion after the n-th correction at the time t such that a result obtained by adding either a value of the (n−1)th ZMP error ZMPerr(n−1) at time t or a value of the ZMP correction amount determined on the basis of at least the value to an instantaneous value of the ZMP calculated on the first dynamic model at time t in response to the motion after the n-th correction satisfies the desired ZMP at the time t, and a result obtained by adding either a value of the (n−1)th translational floor reaction force horizontal component error Ferr(n−1) at time t or a value of the floor reaction force correction amount determined on the basis of at least the value to an instantaneous value of a translational floor reaction force horizontal component produced on the first dynamic model at the time t by the motion after the n-th correction satisfies the permissible range at the time t,
the ZMP error change amount ΔZMPerr is composed of a time series, in the predetermined period, of either a difference between a value of the n-th ZMP error ZMPerr(n) at each time and a value of the (n−1)th ZMP error ZMPerr(n−1) at the time or a difference between a value of the n-th ZMP error ZMPerr(n) at each time and a value of the ZMP correction amount determined on the basis of at least a value of the (n−1)th ZMP error ZMPerr(n−1) at the time, and the translational floor reaction force horizontal component error change amount ΔFerr is composed of a time series, in the predetermined period, of either a difference between a value of the n-th translational floor reaction force horizontal component error Ferr(n) at each time and a value of the (n−1)th translational floor reaction force horizontal component error Ferr(n−1) at the time or a difference between a value of the n-th translational floor reaction force horizontal component error Ferr(n) at each time and a value of the floor reaction force correction amount determined on the basis of at least the value of the (n−1)th translational floor reaction force horizontal component error Ferr(n−1) at the time, and
the convergence discrimination processing of the desired motion determining means is the processing for determining that the ZMP component error change amount ΔZMPerr has converged to zero when a predetermined third characteristic amount in a pattern of the time series constituting the ZMP error change amount ΔZMPerr has fallen within a predetermined permissible change amount range for the third characteristic amount and also for determining that the translational floor reaction force horizontal component error difference ΔFerr has converged to zero when a predetermined fourth characteristic amount in a pattern of the time series constituting the translational floor reaction force horizontal component error change amount ΔFerr has fallen within a predetermined permissible change amount range for the fourth characteristic amount.

* * * * *

UNITED STATES PATENT AND TRADEMARK OFFICE
CERTIFICATE OF CORRECTION

PATENT NO. : 7,774,098 B2
APPLICATION NO. : 10/597933
DATED : August 10, 2010
INVENTOR(S) : Takenaka et al.

It is certified that error appears in the above-identified patent and that said Letters Patent is hereby corrected as shown below:

In Column 79, Line 41, in Claim 3, after "correction," delete "the" and insert -- an --

In Column 79, Line 54, in Claim 3, after "value of" delete "an" and insert -- the --

In Column 81, Line 19, in Claim 5, after "correction," delete "the" and insert -- an --

In Column 81, Line 19, in Claim 5, after "after" delete "an" and insert -- the --

In Column 83, Line 19, in Claim 7, after "between" delete "an" and insert -- the --

In Column 83, Line 21, in Claim 7, after "and" delete "an" and insert -- the --

In Column 84, Line 55, in Claim 10, after "value of" delete "an" and insert -- the --

In Column 87, Line 52, in Claim 12, after "between" delete "an" and insert -- the --

In Column 87, Line 54, in Claim 12, after "and" delete "an" and insert -- the --

In Column 88, Line 34, in Claim 15, after "robot and" delete "the" and insert -- a --

In Column 88, Line 35, in Claim 15, before "translational" delete "the" and insert -- a --

In Column 89, Line 59, in Claim 15, after "between" delete "an" and insert -- the --

In Column 90, Line 41, in Claim 17, after "and" delete "a"

In Column 91, Line 7, in Claim 17, after "after" delete "an" and insert -- the --

In Column 91, Line 17, in Claim 17, delete "floor reaction force" and insert -- ZMP --

Signed and Sealed this
Eighth Day of February, 2011

David J. Kappos
*Director of the United States Patent and Trademark Office*

CERTIFICATE OF CORRECTION (continued)
U.S. Pat. No. 7,774,098 B2

In Column 92, Line 31, in Claim 18, after "by" insert -- the --

In Column 92, Line 49, in Claim 18, before "ZMP" delete "a" and insert -- the --

In Column 93, Line 6, in Claim 18, after "and" delete "an" and insert -- the --

In Column 93, Line 8, in Claim 18, after "after" delete "an" and insert -- the --

In Column 93, Line 49, in Claim 20, after "and" delete "a"